US011735919B2

(12) United States Patent
Cruickshank, III

(10) Patent No.: US 11,735,919 B2
(45) Date of Patent: Aug. 22, 2023

(54) OPTIMIZED LOAD SHAPING SYSTEM, METHOD AND APPARATUS FOR OPTIMIZING PRODUCTION AND CONSUMPTION OF ENERGY

(71) Applicant: Robert F. Cruickshank, III, Big Indian, NY (US)

(72) Inventor: Robert F. Cruickshank, III, Big Indian, NY (US)

( * ) Notice: Subject to any disclaimer, the term of this patent is extended or adjusted under 35 U.S.C. 154(b) by 0 days.

(21) Appl. No.: 17/774,943

(22) PCT Filed: Nov. 26, 2020

(86) PCT No.: PCT/US2020/062467
§ 371 (c)(1),
(2) Date: May 6, 2022

(87) PCT Pub. No.: WO2021/108745
PCT Pub. Date: Jun. 3, 2021

(65) Prior Publication Data
US 2022/0385064 A1 Dec. 1, 2022

Related U.S. Application Data

(60) Provisional application No. 62/940,922, filed on Nov. 27, 2019, provisional application No. 62/940,920, filed on Nov. 27, 2019.

(51) Int. Cl.
H02J 3/00 (2006.01)
G05B 15/02 (2006.01)
(Continued)

(52) U.S. Cl.
CPC ............. *H02J 3/003* (2020.01); *G05B 15/02* (2013.01); *H02J 3/14* (2013.01); *H02J 3/381* (2013.01);
(Continued)

(58) Field of Classification Search
CPC ... G05B 15/02; H02J 3/003; H02J 3/14; H02J 3/381; H02J 2300/20; H02J 2310/60; H02J 2310/64
See application file for complete search history.

(56) References Cited

U.S. PATENT DOCUMENTS

2011/0231028 A1   9/2011  Ozog
2014/0039710 A1*  2/2014  Carter ...................... G05F 1/67
                                                         700/291
(Continued)

FOREIGN PATENT DOCUMENTS

| CN | 109347152 A | * | 2/2019 | ....... G06Q 10/06312 |
| CN | 109615125 A | * | 4/2019 | ............ G06Q 10/04 |
| WO | 2012013690 A1 | | 2/2012 | |

OTHER PUBLICATIONS

CN-109615125-A, machine translation.*
CN-109347152-A, machine translation.*

*Primary Examiner* — M. N. Von Buhr
(74) *Attorney, Agent, or Firm* — Invention To Patent Services; Alex Hobson

(57) ABSTRACT

A method, system and apparatus are provided for optimized load shaping for optimizing production and consumption of energy. Information signals indicative of a first load shape signal are obtained corresponding to a total load, a renewable energy load of one or more renewable energy sources and a non-renewable energy load of one or more non-renewable energy sources. The first load shape signal corresponding to renewable energy load is removed from a non-renewable energy load to obtain a resulting load shape signal. The resulting load shape is flattened signal by apportioning the resulting load shape signal across time intervals to obtain a flattened load shape signal. At least a portion of the first component corresponding to the renewable energy load is added to the flattened load shape signal to create an (Continued)

optimized load shape signal. The optimized load shape signal is provided to modulate electric loads of energy-consuming devices.

28 Claims, 28 Drawing Sheets

(51) Int. Cl.
   *H02J 3/14* (2006.01)
   *H02J 3/38* (2006.01)
(52) U.S. Cl.
   CPC ....... *H02J 2300/20* (2020.01); *H02J 2310/60* (2020.01); *H02J 2310/64* (2020.01)

(56) References Cited

U.S. PATENT DOCUMENTS

| | | |
|---|---|---|
| 2014/0200723 A1 | 7/2014 | Roy et al. |
| 2016/0013652 A1 | 1/2016 | Li et al. |
| 2016/0020608 A1 | 1/2016 | Carrasco et al. |
| 2021/0296897 A1* | 9/2021 | Cruickshank, III .... H02J 3/381 |

* cited by examiner

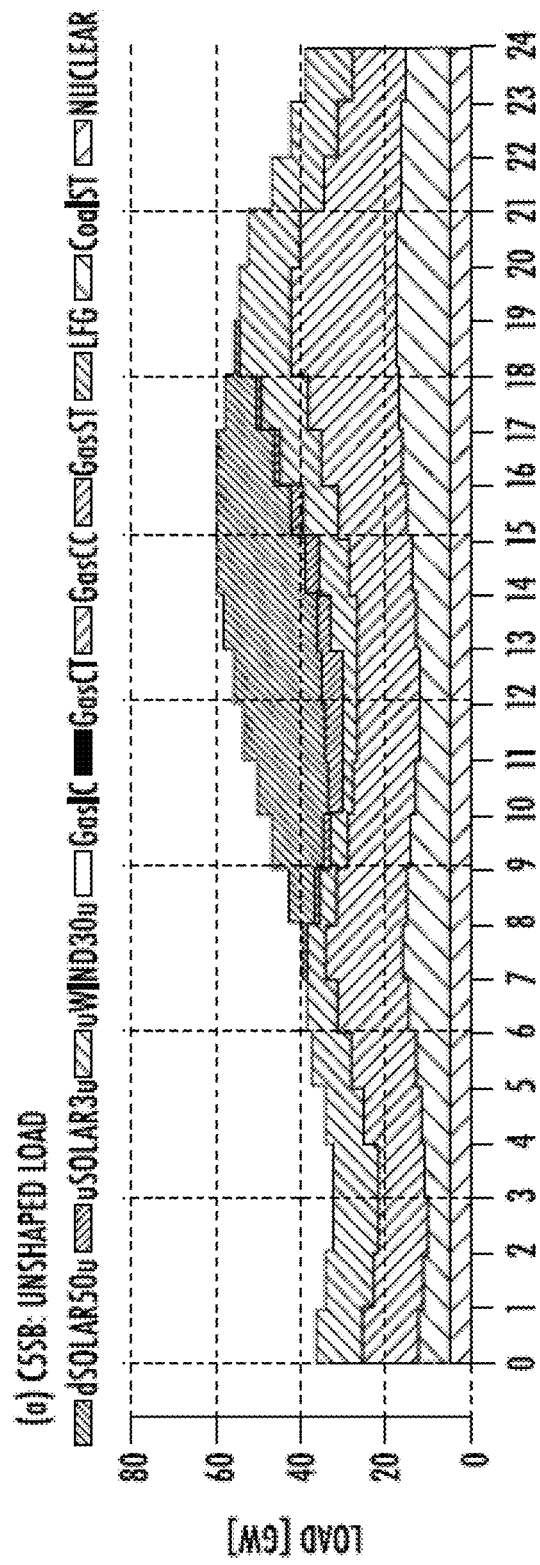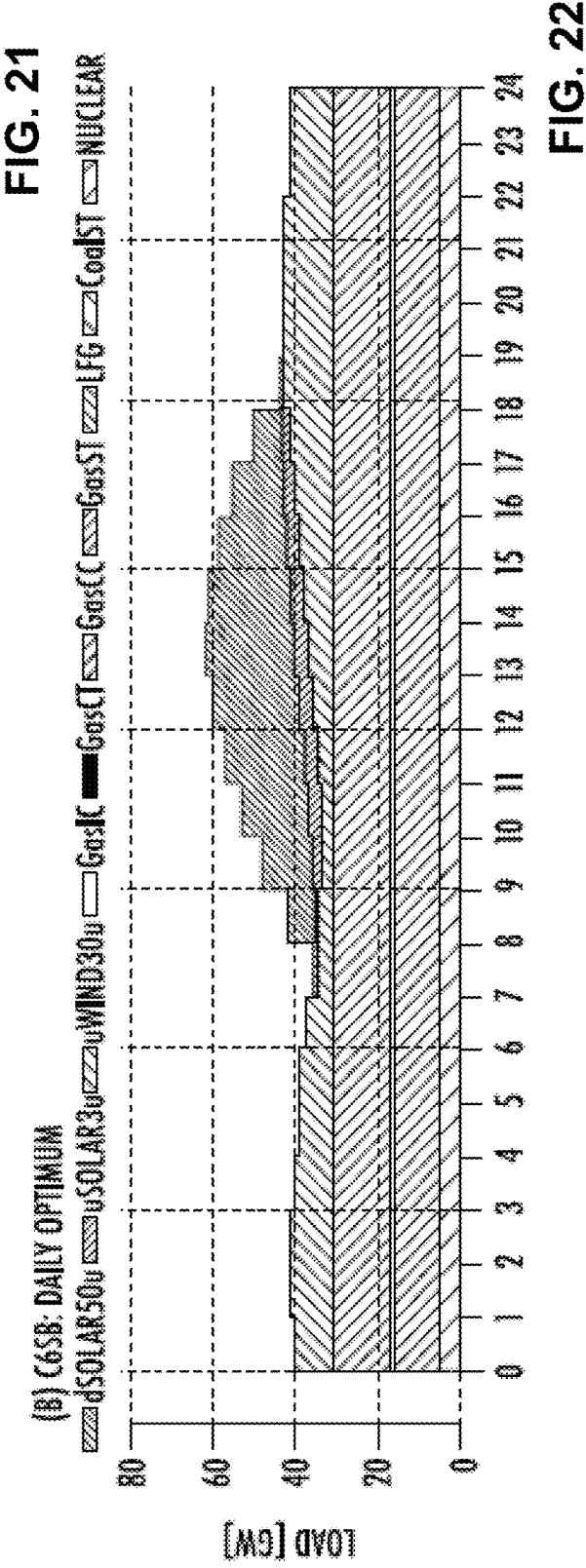

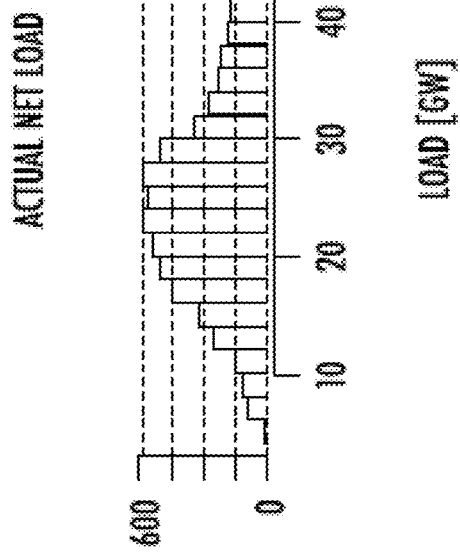
FIG. 25
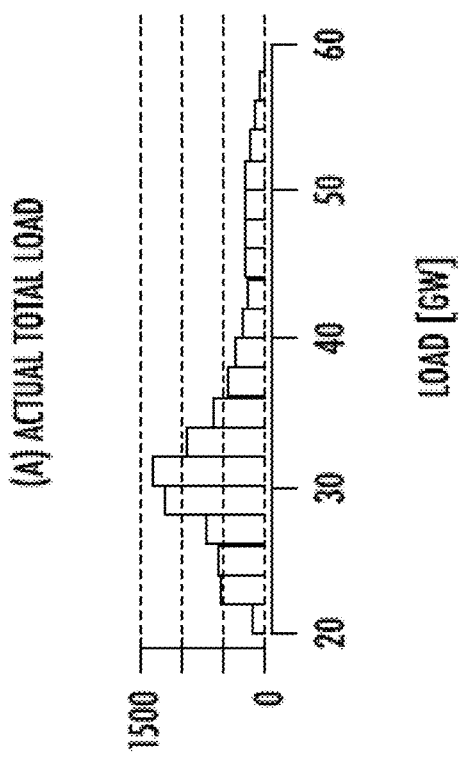
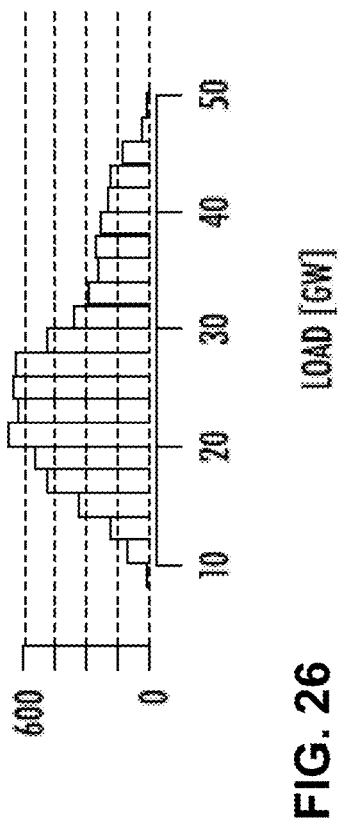
FIG. 26
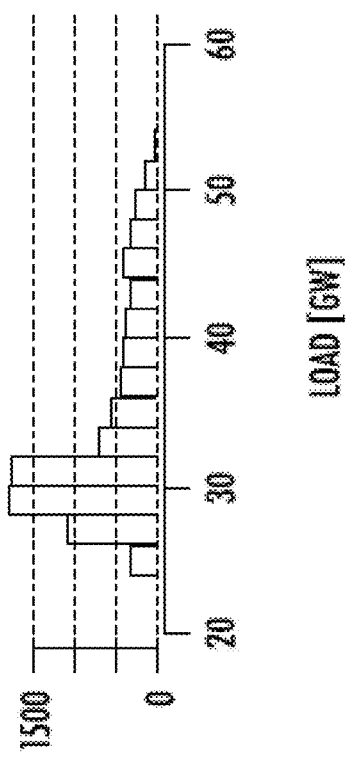

| | Supply-side uses forecasts (GWh) and Optimum Load Shape (OLS) Creator | | | | | Demand-side loads (kWh) have OLS Interpreter | | |
|---|---|---|---|---|---|---|---|---|
| | Forecast Load | − Forecast Renewables | = Net Generation | Flat Net Generation | Optimum Load Shape | EV Optimum Load Shape | Shaped EV Load | Unshaped EV Load |
| Midnight | 36.1 | 6.0 | 30.1 | 35.2 | 3.7% | 7.3% | 0.73 | - |
| 1 | 34.6 | 5.8 | 28.8 | 35.2 | 3.6% | 7.3% | 0.73 | - |
| 2 | 33.7 | 5.4 | 28.3 | 35.2 | 3.6% | 7.2% | 0.72 | - |
| 3 | 33.4 | 4.6 | 28.8 | 35.2 | 3.5% | 7.1% | 0.71 | - |
| 4 | 34.7 | 4.3 | 30.4 | 35.2 | 3.5% | 7.0% | 0.70 | - |
| 5 | 37.5 | 6.7 | 30.8 | 35.2 | 3.7% | 7.5% | 0.75 | - |
| 6 | 38.2 | 4.6 | 33.6 | 35.2 | 3.5% | 7.1% | 0.71 | - |
| 7 | 40.0 | 0.4 | 39.6 | 35.2 | 3.2% | | | |
| 8 | 43.2 | 4.5 | 38.7 | 35.2 | 3.5% | The vehicle is in use and unavailable for charging from 0700 - 1800 hours. The charger takes unavailability into consideration and autonomously adjusts the Optimum Load Shape that it received from the supply-side. | | |
| 9 | 47.0 | 7.8 | 39.2 | 35.2 | 3.8% | | | |
| 10 | 50.7 | 14.2 | 36.5 | 35.2 | 4.4% | | | |
| 11 | 53.8 | 18.0 | 35.8 | 35.2 | 4.7% | | | |
| Noon | 56.5 | 23.6 | 32.9 | 35.2 | 5.2% | | | |
| 13 | 58.4 | 25.0 | 33.4 | 35.2 | 5.3% | | | |
| 14 | 59.7 | 24.7 | 35.0 | 35.2 | 5.3% | | | |
| 15 | 60.2 | 23.5 | 36.7 | 35.2 | 5.2% | | | |
| 16 | 59.7 | 20.0 | 39.7 | 35.2 | 4.9% | | | |
| 17 | 58.0 | 17.8 | 40.3 | 35.2 | 4.7% | | | |
| 18 | 55.9 | 11.6 | 44.4 | 35.2 | 4.1% | 8.3% | 0.83 | 7.00 |
| 19 | 55.0 | 16.7 | 38.3 | 35.2 | 4.6% | 9.2% | 0.92 | 3.00 |
| 20 | 52.3 | 14.8 | 37.4 | 35.2 | 4.4% | 8.9% | 0.89 | - |
| 21 | 47.5 | 11.5 | 36.1 | 35.2 | 4.1% | 8.3% | 0.83 | - |
| 22 | 43.0 | 6.2 | 36.7 | 35.2 | 3.7% | 7.4% | 0.74 | - |
| 23 | 39.5 | 6.0 | 33.6 | 35.2 | 3.6% | 7.3% | 0.73 | - |
| Totals → | 1,128.7 | 283.6 | 845.1 | 845.1 | 100% | 100% | 10.00 | 10.00 |
| | GWh | GWh | GWh | GWh | Unitless | Unitless | kWh | kWh |

Deliver Optimum Load Shape Over Any Network

FIG. 34

OPTIMIZED LOAD SHAPING SYSTEM, METHOD AND APPARATUS FOR OPTIMIZING PRODUCTION AND CONSUMPTION OF ENERGY

CROSS REFERENCE TO RELATED APPLICATIONS

The instant patent application benefits from the priority of U.S. provisional patent applications 62/940,920 and 62/940,922 both filed on Nov. 27, 2019, the contents of which are incorporated herein by reference for every purpose.

BACKGROUND OF THE INVENTION

The application relates to managing or the management of energy resources, and more particularly to a power grid, from the supply side, to the demand side and/or the distributor side. The innovative solution(s) in this application particularly are applicable but not limited to managing or management of all energy resources including renewable energy resources in the power grid.

SUMMARY OF THE INVENTION

A method, system and apparatus are provided for optimized load shaping for optimizing production and consumption of energy. Information signals indicative of a first load shape signal are obtained corresponding to a total load, a renewable energy load of one or more renewable energy sources and a non-renewable energy load of one or more non-renewable energy sources. The first load shape signal corresponding to renewable energy load is removed from a non-renewable energy load to obtain a resulting load shape signal. The resulting load shape is flattened signal by apportioning the resulting load shape signal across time intervals to obtain a flattened load shape signal. At least a portion of the first component corresponding to the renewable energy load is added to the flattened load shape signal to create an optimized load shape signal. The optimized load shape signal is provided to modulate electric loads of energy-consuming devices.

BRIEF DESCRIPTION OF SEVERAL VIEWS OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 21 and 22 are plots of unshaped and optimum power generation or load shaping;
FIGS. 25 and 26 are charts of the actual/simulated total load versus actual/simulated net load.

DETAILED DESCRIPTION OF THE ILLUSTRATED EMBODIMENTS

Figure 1:
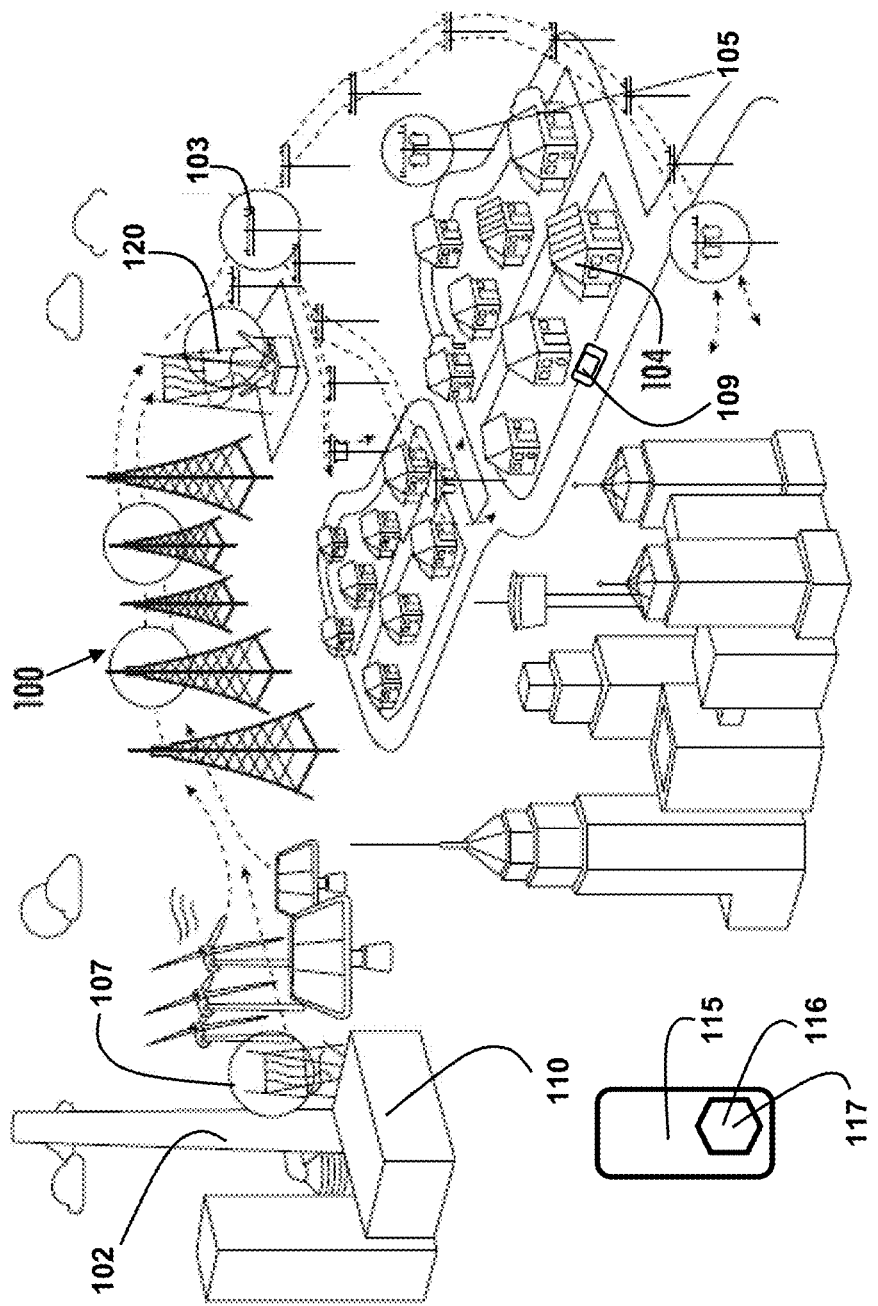
FIG. 1 illustrates and end-to-end power grid.

Automatic electric load shaping and subsequent modulation of power based on shaping the load can increase the efficiency of existing thermal power plants and facilitate a transition to carbon-free generation from renewables. The ongoing digitization of buildings, industry, and transportation presents an ever-expanding set of opportunities to use the Internet of Things to introduce load elasticity and alter the traditional electricity supply-follows-demand paradigm. The solution addressed here is to create a globally applicable framework to model the value of flexible residential load across a range of geographies in terms of electricity production cost and carbon dioxide emissions and develop a method system and apparatus to provide a load shaping signal, modify the load, and in so doing modulate the power generated by thermal power plants and further to renewable energy sources. This invention models an optimal supervisory control of residential building thermal masses taking into account the complementary aspects of the model predictive control (MPC) of multiple degrees of freedom including air-conditioning, electric domestic hot water heating, and battery storage, and optimizes the load on the supply side.

The framework of the invention is capable of using, for example, historical load, weather, building stock attributes, operating schedules of electrical devices, distribution feeder models, and generator constraints to quantify the value of residential load shaping for decision and policymakers. Three phases or steps to complete the model: Phase or Step 1 is a data-driven model that analyzes, synthesizes, and/or statistically simulates diversity in residential load observed in empirical data associated with home appliances. Phase or Step 2 quantifies feeder-wide electric grid benefits resulting from the aggregation of flexible loads, with time-of-day sensitivities investigated across electrical distribution networks, seasons, and U.S. climate regions. Phase or Step 3 estimates the system-wide impacts likely to result from jointly optimizing residential load with existing generation fleets and feasible penetrations of renewable generation in an annual case study of the large electric grid managed by the Electric Reliability Council of Texas. With the present invention a ⅓ reduction in annual generation costs and a ⅕ reduction in $CO_2$ emissions at high renewable energy penetrations results are possible.

As global agreements seek to reduce emissions and provide the world's population with access to electricity produced without the combustion of fossil fuels, a rapidly evolving set of generation, transmission, distribution, communications, and load management technologies are poised to remake the energy landscape, creating a 'new energy paradigm.' Indeed, history shows that new forms of energy enable human developments. Now more than ever, clean energy can deliver tangible advancements addressing the issues raised in Agenda 21 of the 1992 United Nations Conference on Environment and Development and in following climate summits through the present day. Moreover, actions taken today can bring much-needed innovation and security to the world's energy systems, thereby offering opportunities for nations to provide geo-political and socio-economic leadership.

Specifically, increasing the penetration of clean and efficient RES (Renewable Energy Sources) can increase opportunities among the planet's impoverished, with low-cost energy for the masses helping to erase the dividing lines between energy haves and have-nots, thus raising productivity and longevity. On an energy utility's supply side, electricity production costs vary as wind, solar, hydroelectric, conventional generators, and storage systems come on- and off-line to meet customer demands. Variable generation cost is the primary driver in production cost, is directly proportional to the cost of fuel consumed, and is calculated based on a unit of electricity produced, e.g., a megawatt-hour.

On an energy utility's demand side, customers have costs associated with consumption. For some uses, such as air-conditioning and heating domestic hot water (DHW), high energy costs may discourage consumption. For other uses, such as preparing a meal, the cost of energy may not influence consumption because people would rather pay higher energy costs even during peak times to feed themselves and family. Depending on end-use, cost and consumption may be correlated or may vary independently as a function of time-of-day, day-of-week, season, desired comfort levels, and load management strategies such as the scheduling and control of appliances. Successful load management requires customer effort be minimal or better yet, non-existent, mostly seamless to the users while saving them money.

Decreasing capital and operational costs are anticipated to drive solar and wind to further dominate the electricity generation mix. Accommodations for their variable and uncertain production of power will require new forms of system flexibility to assist in maintaining the critical operational balance between generation supply and user demand. At low to medium penetration levels, in most countries, solar and wind are the least expensive forms of marginal generation and drive costs down by offsetting more expensive power from conventional generators. Conventional generators are still needed to provide base-load capacity and to cover periods of no sun or wind, along with the flexibility to follow varying load.

At annual penetration levels of 7% to 27%, somewhat counter-intuitively, researchers at the National Renewable Energy Laboratory have shown that geographically dispersed multi-resource RES combined with (part-load) thermal generation has inherent flexibility which can help balance supply and demand. At extremely high penetrations of RES, however, the amount of required system flexibility rises dramatically, potentially making the marginal cost of 100% solar and wind generation prohibitively expensive.

Buildings are likely contributors of grid flexibility and are significant users of energy, responsible for more than 73% of the total electricity usage in the U.S., with about 50% of that consumption occurring in residential buildings. In addition to buildings, the flexibility that can bolster the penetration and reach of RES is a spatiotemporal function of the types, location, and timing of user loads and the grid resources that make up the 'balance of system.' As shown in FIG. 1, the balance of system refers to the types of conventional and RES generators, types of storage, types of loads, and the geographic locations and connections of each to the grid.

FIG. 1 illustrates end-to-end generation-to-load system architecture reveals the balance of system when observed from any location. For example, when looking from a house, the balance of system is everything beyond the house. In FIG. 1, there is shown a power grid 100 with a supply side 102 that may include electric power generation plants, so called power plants 110, which include traditional carbon based power generation units such as oil, gas, coal and nuclear as well as renewable energy resources including hydroelectric, solar, and wind power generation units. The supply side 102 may also be considered to include the infrastructure, including power distribution lines 103, such as high-tension lines, power lines or so-called transmission lines, transformers and substations (step up substations 107/step down substations 120 which may include a step down transformer 105). There are also distributors (not shown) that purchase power from traditional power generation firms to distribute power to consumers on the demand side or those that lease infrastructure and provide power from their own power generation equipment. There are also infrastructure firms that provide the infrastructure on the supply or demand side, such as those that provide software or apps to either test or regulate transmission of power or provide equipment such as smart meters or smart appliances, or network boxes that measure or regulate the amount of power consumed by a consumer or appliance. The supply side may also be referred to as upstream from the demand side. The demand side may provide power to electric vehicles (EV) 109.

The demand side 104 is the consumer end that includes either residential or private homes or business or company facilities or buildings, which can be considered as everything after the power leaves the transmission lines. The demand side may also generate power, for example, from solar panels or electric cars and can upload power into the power grid. In a sense, these demand side power generation entities become suppliers of power. However, for purposes of this discussion we will refer to those as being on the demand side. Demand side entities and equipment shall be referred herein as downstream of the supply side. As shown in FIG. 1, a load sharing apparatus may comprise a computing device 115, such as a computer, having a processor 116 to run a computer readable medium 117, such as a computer program. The processor may be included in a computing device such as a smart switch, smart meter, thermostat, smart phone, an internet router, a graphical user interface (GUI), cloud-based energy controller, cloud appliance, data center, dashboard, home energy management system, a battery, an electric vehicle/electric vehicle charger, an energy transformation device, water boiler, air conditioner, and an appliance Many possible combinations of generation and load resources can achieve flexibility across the system. An essential requirement is the ability of each to ramp up and down in concert with the others, within the capacity constraints of the transmission and distribution or power grid. Exponential advances in the reach of telecommunications networks and the number of connected Internet of Things (IoT) devices together enable the smart grid ever more capable of benefiting from residential load flexibility; this long-held promising concept was the primary subject of this invention.

Using Internet-enabled distributed control, the evolving grid should be able to jointly optimize its own end-to-end efficiency. Through automatic residential load shaping (ARLS) that goes beyond traditional peak shaving demand response (DR), so that electric loads can be encouraged and discouraged throughout the day in order to modulate demand and optimize the mix of available generation while maximizing the use of RES and the security and reliability of the grid.

For over a decade, Internet-based feeds of the future costs of electricity have been used by commercial and industrial entities to modulate demand, though have not been widely used at the residential level. In the future, ARLS and home energy management systems (HEMS) could be critical for managing demand; for example, when spikes in load occur as many commuters begin charging their electric vehicles upon arriving at home or work. While communications networks and HEMS are not the focus of this research, their increasing ubiquity and ease of use are assumed. Note that in the presence of intermittent Internet connectivity, any HEMS must continue providing comfort and needed services while attempting to reestablish communications with the grid.

Homeowners, in the absence of automatic load shaping, can manually manage electric loads, for example, vacuuming carpets when the sun was shining to avoid the inefficiencies of battery charging and discharging. A software-based controller is needed that could maximize efficient use of energy by orchestrating user demand in concert with renewable energy supply, a battery, and a standby generator. On the news of high curtailment of wind energy in Denmark and other countries, the vision of the software-based controller was extended to orchestrating supply and demand on the electric grid.

To accelerate humankind's progress in replacing thermal power plants with RES, the envisioned controller was further envisaged as part of a telecommunications-based system that would use the pricing of electricity to orchestrate energy supply and demand in order to maximize the use of RES and the efficiency of power plants. Energy efficiency is critical because, despite all renewable energy sources (RES), approximately 75% of the world's electricity is still generated using variants of the steam-electric Rankine Cycle first implemented in the 18th century that is on average only 35-40% efficient. Thermal power plants are expensive to operate, are the largest consumers of fresh water on the planet, and are among the largest producers of heat, producing nearly twice as much heat as they do electricity along with greenhouse gas emissions that trap heat.

Modeling and simulating supply and demand in the electric grid is a complex task. A simulation framework was created to analyze weather forecasts, predict future electricity needs, and then prescribe future electricity prices that 1) favored RES, and 2) delayed the start-up of thermal generators until they could operate at their maximum efficiency. As the Internet grew and software modeling tools became available it became possible to develop the necessary simulation framework to estimate the financial and emissions impacts expected by deploying dynamic electricity pricing over broad geographies and multiple climate zones. Dynamic pricing experiments provided excellent results in a deterministic model with three generators, but iterative approaches to maximize the efficiency of the fleet of the 263 generators in Texas suffered from price-maker versus price-taker instabilities resulting in increasing oscillatory load behavior. Generating feeder reference demands ultimately inspired the development of an optimum load shape that 1) met the objective of favoring RES, and 2) stabilized the load on thermal power plants so that they could operate most efficiently. With the possibility of highly penetrated utility-scale and distributed RES, savings in billions of dollars and trillions of pounds of $CO_2$ emissions are at stake worldwide on an annual basis.

As clean generation begets clean buildings, transportation, and industry and mitigates climate change, the simulation framework can identify the additional savings attributable to ARLS supporting the increased penetration of RES. In layman's terms, what is missing in electric power generation and residential electrical use is something akin to the miles per gallon displays in automobiles that help drivers use fuel efficiently, in this case, an optimum load shape signal to help generate and use electricity efficiently. Also, missing are methods to estimate the financial and emissions impacts attributable to jointly optimizing supply and demand. These missing items were the motivation behind this invention. Through simulation, this invention investigated minimizing utilities' production costs by reducing the operation of the more costly thermal generators via centrally directed, distributed control of residential electric loads. Given Internet connectivity between supply and demand, broadcast messages informed devices of electricity pricing or optimal load shapes based on generation constraints and the availability of RES. In so doing, the traditional electric supply and demand relationship was altered for devices participating in ARLS, with supply no longer relegated to following demand, but rather, demand attempting to follow the lowest-cost forms of supply. That said, could a compelling financial case be made for ARLS, and if so, under what conditions? Further, how might homes and appliances behave when adding or shedding electric load?

In the context of model predictive control (MPC), the on and off duty cycles of residential air-conditioning, domestic hot water (DHW) heating, and the charging and discharging of battery storage were orchestrated to operate in concert with the balance of system in a distributed control paradigm that lowered the cost of generation while meeting user needs and maintaining user comfort. In addition to empirical data which helped inform DHW control opportunities essential to facilitating the transition to demand following supply, were end-to-end physical models that aided in exploring and quantifying the financial and emissions impacts through the programmatic exploration of least cost operating strategies across the distribution grids of an entire state.

As a proxy for the time-varying availability of low-cost electricity, load modulation either: 1) discouraged loads until lower-cost RES were available or until conventional generation could operate most efficiently, or 2) encouraged loads when RES was available. In different experiments, electricity pricing and load shape signals introduced elasticity into the traditionally inelastic residential electricity supply and demand relationship in order to minimize the overall financial and environmental costs of generating electricity.

In combining generation, distribution, and load models, this research estimated 1) the temporal upper and lower limits of ARLS for a summer day across the U.S., and 2) the annual impact on electricity producers in Texas in terms of variable generation costs and carbon dioxide emissions. Texas was chosen for this study as it is a multi-climate, large geographic area that can be modeled as an electrical island due to its limited imports and exports of electricity. Models based on hourly and 5-minute intervals were used. Depending on the responsiveness of residential load, to a greater or lesser extent, top-down objectives to reduce generation costs and emissions were met by bottom-up load shaping.

Out of the scope of this research, though included in the literature review, were: 1) Wholesale electricity markets and bidding mechanisms. 2) Retail electricity tariffs and the associated processes that might govern end-user participation in ARLS. 3) Distribution of participation-based credits or refunds, i.e., approaches for compensating customers participating in ARLS. 4) Constraints on the transmission grid that limited the flow of electric power. 5) The design, operation, and integration of HEMS into ARLS.

Included in this chapter are reviews of the impact of RES penetration and integration, power systems optimization in the face of variability and uncertainty, the importance of electricity financial market models, bottom-up dynamic pricing models, residential dynamic pricing behavior, residential DR load management, and model predictive control of residential electricity demand.

2.1 Impact of RES Penetration and Integration

This section starts with a review of forecast wind and solar penetration and financial estimates and finishes with technical studies on integrating RES. By some estimates, continuing deep declines in the costs of wind, solar, and battery technologies will result in the global grid nearly half-powered on an annual basis by renewable energy sources by 2050. Some areas of the world are expected to have even higher penetrations of RES due to advancements and deployments in transmission infrastructure. In 2019, the Bloomberg New Energy Finance (BNEF), New Energy Outlook estimated $13.3 trillion to be invested in new power generation capacity worldwide to 2050. Of this, 77% or $10.2 billion is expected to go to renewables. Solar is expected to take $4.2 trillion and wind $5.3 trillion. Investment in renewable energy is expected to increase to approximately $416 billion per year through 2050. Forecasts for future penetration of RES suggest wind and solar will dominate the generation market. To put this in perspective, in 2018, two-thirds of electricity was generated by fossil fuels; by 2050 approximately two-thirds of electricity is expected to come from carbon-free generation.

The primary driver of change most often cited is the levelized cost of electricity (LCOE), which is a measure of lifetime costs divided by energy production. The LCOE from solar PV and wind continues to decline and is already lower than from conventional generation for two-thirds of the world's population. In the last year, the mean LCOE from utility-scale PV technologies was down approximately 13%, the mean LCOE from onshore wind was down almost 7%, and the mean LCOE from offshore wind fell faster. The LCOE from PV is expected to fall 63% by 2050, to around $25/MWh, module costs are down 89% since 2010 and are expected to decline another 34% by 2030. Underpinning declines in LCOE from PV are cost declines in solar technology. In addition, the levelized cost of storage is expected to decline across most use cases and technologies, especially for shorter duration applications. Lithium-ion remains the least expensive storage technology and continues to decrease in cost due to improved efficiencies and a maturing supply chain. To maximize benefits to energy supply chain stakeholders and avoid issues such as overgeneration, there will be an increasing need to develop microgrid control paradigms that programmatically optimize financial opportunities regarding when and how to buy, sell or curtail distributed PV, and how to maximize consumer savings by participating in ARLS.

In 2010, the first Western Wind and Solar Integration Study (WWSIS-1), prepared by General Electric for the NREL, was a landmark analysis of the operational impacts of high penetrations of wind and solar power on the U.S. Western Interconnection. The study concluded that it was feasible for the region to accommodate 30% wind and 5% solar energy penetration with the caveat that 89 hours of the year had contingency reserve shortfalls. A recommendation suggested that a DR program which required the load to participate would be more cost-effective than increasing the spinning generation for each of the 8,760 hours of the year.

While it is more difficult to explicitly calculate integration costs for wind and solar, total system costs with and without RES could be calculated with reasonably high confidence. In 2013, Phase 2 of the Western Wind and Solar Integration Study (WWSIS-2) furthered the WWSIS-1 study by calculating the wear-and-tear costs and emissions impacts of frequent cycling of fossil-fueled generators caused by thermal and pressure stresses during startup, load following, and shutdown. The authors concluded that wind and solar increased the annual cycling costs of fossil-fueled generators by $35-$57 million, or 13%-24%, across the Western Interconnection, but paled in comparison to the annual savings in fuel displaced by wind and solar of approximately $7 billion.

More recently, Phase 3 of the Western Wind and Solar Integration Study (WWSIS-3) furthered the WWSIS-1 and WWSIS-2 studies by investigating frequency response and transient stability of the North American grids. Of particular interest was the presence of wind and solar energy penetration that resulted in substantial changes to the characteristics of the bulk power system, including different power flow patterns, different commitment and dispatch of existing synchronous generation, and different dynamic behavior of wind and solar generation. WWSIS-3 did not identify any fundamental reasons why the Western Interconnection could not meet transient stability and frequency response objectives with 33% wind and solar generation on an annual basis.

Given the learnings in WWSIS-1, WWSIS-2, and WWSIS-3, how might buildings effectively participate in balancing the supply and demand of electricity in the presence of much higher penetration of RES? All indicators in the literature were that wind and solar would continue to grow and would become the primary sources of power generation. With the present and future roles of wind and solar energy examined, a logical follow-up area of research was ascertaining the value of the flexibility and optimization provided by ARLS in supporting increased penetration of RES.

2.2 Power Systems Optimization in the Face of Variability and Uncertainty

Power flow is the numerical analysis of the flow of electric power in an interconnected system. Power flow analysis includes various aspects of electric power parameters, such as voltages, voltage angles, real power, and reactive power. Three operational power flow (OPF) models were reviewed.

A stochastic programming approach solved a multi-period OPF problem under renewable generation uncertainty. The approach consisted of two stages. In the first stage, operating points for conventional power plants were determined. The second stage incorporated the generation from renewable resources and optimally accommodated it by relying on demand-side flexibility. The model used one generator along with wind as the only RES, included a numerical solution, and was based on an hourly timescale. Load DR was modeled as having 0 to 50% flexibility. The model indicated a maximum reduction in mean wind spillage [MWh] as load flexibility approached 20%.

An OPF model was used that determined power schedules for controllable devices in a power network, such as generators, storage, and curtailable loads, which minimized expected short-term operating costs under various device and network constraints. Schedules were chosen in a multistage decision framework to include planned power output adjustments, or reserve policies, which tracked errors in the forecast of power requirements as they were revealed, and which could be time-coupled. The model used two generators along with wind as the only RES, included a numeric solution and a 2-bus network, though it did not specify a timescale. The model indicated a relative benefit of time-coupled response to uncertainty observed under different approximate treatments of the chance constraint, for different risk parameters. A real-time distributed deferrable load control algorithm was proposed to reduce the variance of net load (i.e., load minus renewable generation) by shifting the power consumption of deferrable loads to periods with high renewable generation. At every time step, the algorithm minimized the expected variance based on updated predictions. The model used wind as the only RES, included a system-level numeric solution, and used a 10-minute timescale though did not include distributed generation or storage. The algorithm incorporated updated predictions about deferrable loads and renewable generation to minimize the expected load variance going forward. Qualitative insights from the analytic results were validated using trace-based simulations, which confirmed that the algorithm had significantly smaller sub-optimality than optimal static control. The literature included coordinating electricity demand to meet supply, but at limited scale and complexity. Missing were large models of the end-to-end generation-to-load system incorporating multiple weather zones, thermal models of buildings, hundreds of generators, thousands of homes, time-synchronous empirical load and RES data, and the construction attributes of building stock.

2.3 Importance of Electricity Financial Market Models

Local retail markets vary across states and utilities. Wholesale markets vary across interconnect regions. Two market-based models were reviewed, and load adjustment was allocated to multiple consumers. They proposed and analyzed a simple uniform-price market mechanism where every consumer submitted a single bid to choose a supply function from a group of parameterized ones. The parameterized supply functions were designed to ensure that every consumer's load adjustment was within an exogenous capacity limit that was determined by the current power system operating condition. The model included a system-level numeric solution, though it did not include RES, distributed generation or storage, and did not specify a timescale. The proposed uniform-pricing mechanism achieved social optimality at a competitive equilibrium.

Coordination of a population of residential electric thermostatically controlled loads (TCLs) with unknown parameters, was studied to achieve group objectives. The problem addressed involved designing the device bidding and market clearing strategies to motivate self-interested users to realize efficient energy allocation subject to a peak energy constraint. The model did not include a numeric solution, RES, distributed generation or storage, and did not specify a timescale. A mechanism was proposed to implement the desired social choice function in a dominant strategy equilibrium. It was shown that under the proposed mechanism, the coordinator could not only maximize the social welfare but could also realize the team optimal solution. From the literature, it was concluded that electricity financial markets could make or break business cases for increasing penetration of RES.

2.4 Bottom-Up Dynamic Pricing Models

While top-down models can provide important insight, they are a complement to and not a replacement for bottom-up data-driven models. Two studies from University College Dublin were explored to assess the benefits of bottom-up modeling. McKenna and Keane presented a bottom-up load model coupled with a novel methodology to capture the discrete, bounded, and uncertain consumer response to variable prices. The model used Monte Carlo simulation techniques and price elasticity matrices to affect the probability of consumption, taking into account detailed consumer characteristics and appliance operation. The model ran a high-resolution simulation of residential load response and quantified behavioral changes using standard load metrics. The model included self-elasticity and cross-elasticity coefficients at different time intervals. A step-change in electricity price resulted in both intra- and inter-temporal changes in electricity demand, illustrating that DR can be a reaction to current, upcoming, and past prices. Model aggregation was limited to the distribution network with a note that transmission and distribution peaks on each are independent and not necessarily coincident (though often are coincident in the U.S. and elsewhere).

In their subsequent paper, McKenna and Keane presented a comprehensive low-voltage residential load model of price-based DR. High-resolution load models were developed by combining Monte Carlo Markov Chain bottom-up demand models, hot water demand models, discrete state-space representation of thermal appliances, and composite time-variant electrical load models. Price-based DR was then modeled through control algorithms for thermostatically controlled loads, optimal scheduling of wet appliances, and price elasticity matrices for the inherently elastic response of the consumer. The developed model was used in a case study to examine the potential distribution network impacts of the introduction of dynamic pricing schemes. The effects of cold load pick-up, rebound peaks, decrease in electrical and demand diversity, and impacts on loading and voltage were presented. From the literature, it was concluded that changes in electricity demand due to dynamic pricing can be difficult to model.

2.5 Residential Dynamic Pricing Behavioral Review

It was found utilities were showing increasing interest in residential DR. It was posited that residential DR can be treated as an energy resource which can be assessed and commercially developed while recognizing there are still some issues that remain to be addressed for DR to be successful. These included the price unresponsiveness of some residential consumers, equity issues, and the high cost of the metering infrastructure. It was investigated and presented some of the challenges in achieving effective voluntary demand reduction based on reviews of literature in residential DR and energy use behavior. The use of a hybrid engineering approach was considered using social psychology and economic behavior models to overcome these challenges and to realize the benefits of supply security and cost management.

Lessons on how to encourage households to adjust energy end use through dynamic tariffs were also looked at. They identified four hypotheses related to fostering DR through dynamic tariff schemes and examined whether these hypotheses could be accepted or rejected based on a review of published findings from a range of European pilot projects. They qualitatively concluded that dynamic pricing schemes have the power to adjust energy consumption behavior within households (this is not a surprise) but did not provide quantitative estimates. In order to work effectively, they recommended that a dynamic tariff should be simple to understand for the end-users, have timely notifications of price changes, and have a considerable effect on their energy bill. Additionally, if the tariff was complex, that the burden for the consumer should be removed by introducing automated control. Although sometimes the mere introduction of a dynamic tariff was proven to be effective, often the success of the pricing scheme also depended on other factors influencing the behavior of end-users. An essential condition to make dynamic tariffs work successfully was that the end-users should be engaged with them.

A review of North American studies of DR strategies suggested that the most effective strategy to date was a critical peak price CPP) program with enabling technology to automatically curtail loads on event days. The authors found there was little evidence that automated CPP causes substantial hardship for occupants, especially if they had input into which loads were controlled, understood how they were controlled, and had an override option. In such cases, a peak load reduction of at least 30% was a reasonable expectation, though the calculation was unclear. The authors posited that it might be possible to attain such load reductions without enabling technology by focusing on household types that are more likely to respond and providing them with excellent support. Per the authors, in comparison to CPP, which would only be used a few days per year, a simple time-of-use daily program could only expect to realize on-peak reductions of 5%.

An overview of the literature on residential DR systems, load scheduling techniques, and the latest information and communication technologies that support residential DR applications was also looked at. Challenges were highlighted, analyzed, and were likely to become relevant research topics concerning residential DR. Their literature review showed that most DR schemes suffer from a price-maker versus price-taker externality problem that involves the effect of high-level customer consumption on the price rates of other customers, especially during peak periods. A recommendation for using an adaptive multi-consumption level pricing scheme was presented to overcome this challenge.

In summary, for several decades, there has been much discussion and debate of the appropriateness and effectiveness of dynamic residential pricing of electricity. Popular questions have included 1) Are automated HEMS necessary? 2) What incremental price changes and absolute prices are fair to consumers and result in optimal system performance? 3) While reacting to price changes, will all appliances become synchronized in turning on and off, and if so, how severe are synchronization and rebound effects?

2.6 Residential Demand Response Load Management

Typically, DR is sparsely deployed and only used a few times a year, for example in high-risk transmission-constrained geographies, such as the Florida mainland peninsula where coastlines limit transmission of electricity to a relatively narrow corridor for hundreds of miles. Despite most customers saying they want the ability to control their environment, and most reacting negatively to the thought of the draconian "Big Brother" intrusions described by Orwell, today, millions of homeowners in Florida and elsewhere accept monetary incentives in exchange for allowing utilities to shut off their appliances. The net effect is that customers give up control at unknown times regarding the relative priorities and timing of specific appliance operations. The remainder of this section is an illustrative example of a current DR program that has remained mostly unchanged since the author visited and studied DR programs at Florida Power and Light Company (FPL) in 1990 while contracting to jointly provide FPL and Bell South Communications with next-generation energy management gateway technology.

Then and now, approximately 52% of the total demand for energy throughout the FPL service territory comes from the residential sector, of which approximately 30-40% is directly related to air-conditioning. FPL is a U.S. energy utility that offers DR through their 'On Call' direct load control program which started in the 1980s and has over a million customers currently enrolled. Customers who volunteer to participate in On Call assist FPL in meeting the energy needs of all customers when demand for electricity is highest. In exchange for their willingness to shed load without notice, participating customers receive a credit on their electric bill when they agree to let FPL turn off the equipment that each customer specified when enrolling in the On-Call program. How On-Call works: An FPL electrician installs a small energy-management device (a radio-controlled relay) on equipment that customers' select, including swimming pool filtration pumps, water heaters, and air conditioners. FPL may occasionally switch-off selected equipment remotely for short periods during extremely high electricity demand such as a summer afternoon with higher than forecasted temperatures. Customers receive a monthly credit on their bill even if FPL never switches off their equipment totaling up to $137 annually, depending on the equipment and program options that customers selected.

The real-time disabling of appliances used by FPL, Duke Power Corporation, Potomac Electric Power Company and others, typically uses one-way (utility to home) radio frequency communication systems to remotely control appliances. Existing systems have at least two shortcomings: 1) Perhaps because of fear of occurring like Big Brother, they are rarely used and hence only provide benefit during extreme crises when customers' demand for electricity is expected to exceed the power utility's supply. 2) They are limited in function because they only defer customer loads to a later time. These systems can neither anticipate individual customer loads nor schedule such loads to operate "ahead of time" to favor RES and improve the efficiency of generation. While numerous forms of customer load management have been developed and deployed over many decades, relatively crude DR programs have endured and remain the norm in modern times. Despite the rapid growth of in-home Internet-connected devices, residential DR load management remains a relative niche solution to the increasing threat of utility brownouts, blackouts, and escalating costs. Given the recent rapid growth of IoT-enabled home security and home automation, it is conceivable that grid-tied HEMS offerings may significantly expand the geographic footprint of DR programs. While it remains unclear when this might happen, drivers of change likely include increasing grid failures due to aging infrastructure and severe climate conditions, such as extreme heat and storms.

Several outstanding questions remain when looking toward the future. What potential migration paths enable much more frequent (intra-day) use of DR? What evaluation strategies might make sense in order to include appliances other than pool pumps, air conditioners, and DHW heaters? How might emergency systems be used, for example during Hurricanes, in conjunction with real-time load flexibility? Additional models discussed in the literature section of Chapter 4 include modeling residential demand and DR. Based on the needs identified during a review of the literature, the directed distributed control paradigms proposed in this invention seeks to provide continuous load shaping that overcomes the shortcomings of existing DR load management systems.

2.7 Model Predictive Control of Residential Electrical Demand

In this section are results of searching the literature for frequent, transactive, intraday, consumer-configurable load shaping for batteries and storage-capable TCLs including heating, ventilation, and air-conditioning (HVAC), refrigerators, freezers, and DHW heaters. A stochastic model predictive control strategy for the climate control of buildings that takes into account weather predictions to increase energy efficiency while respecting constraints resulting from desired occupant comfort was studied. For selected cases, the stochastic model predictive control approach was analyzed in detail and shown to outperform current control practice significantly. This work was extended by adding MPC-based window blind positioning and electric lighting such that the room temperature, as well as CO2 and luminance levels, stayed within given comfort ranges. What is missing in their papers are the controls of additional degrees of freedom such as TCL appliances and battery storage.

Predictive control solutions reduce the energy usage of buildings, improve occupant comfort, and reduce peak electricity demand. The focus was on the automated optimal control of blinds, electric lighting, heating, cooling, and ventilation in individual building zones. Project results were: software, models, and data sets for the simulation-based assessment of building control; new algorithms for improved weather predictions at a building's location; analysis of energy-saving potentials related to control; novel control algorithms; and preparation of a demonstration project in a representative office building.

Coordinating regulation and DR in electric power grids uses multirate model predictive control and a framework for reducing supply-demand imbalances in the grid by jointly controlling both the supply-side electric power regulation together with the demand-side energy consumption by residential and commercial consumers' DR. Their focus was on performance improvements that arise from the complementary dynamics: Regulation allows for frequent control updates but suffers from slower dynamics; DR has faster dynamics but does not allow as frequent control updates. They proposed a multirate MPC approach for coordinating the two services and referred to this coordinator as an aggregator. Multirate MPC captured the varying dynamics and update rates, and nonlinearities due to saturation and ramp rate limits, and a total variation constraint limited the switching of the DR signal. Their approach could operate with both direct reference or an indirect market price-based imbalance signal. Numerical examples were presented to show the efficacy of this joint control approach.

The impact of large-scale distributed residential HVAC control optimization on electricity grid operation and renewable energy integration was assessed. They concluded that using distribution network power flow simulation, the results of the controller's actions could be assessed at the distribution feeder level to evaluate the aggregate impact on feeder demand. Three combinations of feeders and climates, representing several typical of those found in the United States, were studied. The work further considered the ability of the methodology to address feeder demand variability introduced when large amounts of solar and wind generation were present. Their work is a point of departure for this invention.

Building-to-grid integration was investigated through commercial building portfolios simultaneously participating in both energy and frequency regulation markets. A model predictive control framework was proposed to determine optimal operating strategies in consideration of energy use, energy expense, peak demand, economic DR revenue, and frequency regulation revenue. The methodology was demonstrated through simulation for medium office and large office building applications, highlighting its ability to merge revenue-generating opportunities with traditional demand and cost-reducing objectives. This did not include grid modeling. MPC research has been informed by research in commercial building dynamics, sensitivity analysis, and load profiles was performed. Foresee™, a user-centric home energy management system could help optimize how a home operates to concurrently meet users' needs, achieve energy efficiency and commensurate utility cost savings, and reliably deliver grid services based on utility signals. Foresee was built on a multi-objective model predictive control framework, wherein the objectives consisted of minimizing energy cost and carbon emissions while maximizing thermal comfort and user convenience. Foresee learned user preferences on different objectives and acted on their behalf to operate building equipment, such as home appliances, photovoltaic systems, and battery storage. In this work, machine-learning algorithms were used to derive data-driven appliance models and usage patterns to predict the home's future energy consumption. This approach enabled highly accurate predictions of comfort needs, energy costs, environmental impacts, and grid service availability. Simulation studies were performed on a subset of field data from a residential building stock data set collected in the Pacific Northwest. Results indicated that foresee generated up to 7.6% in whole-home energy savings without requiring substantial behavioral changes. When responding to DR events, foresee was able to provide load forecasts upon receipt of event notifications and delivered the committed DR services with 10% or fewer errors. Foresee fully utilized the potential of battery storage and controllable building loads and delivered up to 7.0-kW load reductions and 13.5-kW load increases. These benefits were provided while maintaining the occupants' thermal comfort and convenience in using their appliances. The exciting work neither included grid modeling nor the results of aggregating multiple homes.

A methodology to integrate both the building occupants and behavior-based approaches into the design of the energy management system was considered. Occupant behavior was modeled using random variables and influenced energy management via a disturbance feedback policy. For the future investigation, other aspects of behavior beyond temperature bounds, e.g., controlling occupancy or other internal gains, humidity, lighting, could be considered. The statistical approach adopted could be replaced with a more sophisticated user-specific data-driven approach.

In summary, MPC is an advanced control technique which, when applied to buildings, employs a model of the building dynamics and solves an optimization problem to determine the optimal control inputs. Though much of the work on model predictive control has focused on commercial buildings, some research has focused on residential applications, the subject of this research. While industrial and commercial-scale load shaping and modulation are more developed and mature, to date, literature searches have returned a scarcity of system-level models covering the end-to-end impact and value of residential applications on generation and distribution. No models were found estimating the value of whole-house load shaping to generation when coupled with highly penetrated utility-scale RES, distributed PV generation, and battery storage. Instead, found were a plethora of subsystem models with a limited or unspecified spatial and temporal resolution. Some of the more relevant work included efforts to simulate the drivers of residential demand (i.e., the loads) that could be managed by ARLS. Of particular interest was literature covering the modeling of utility transmitters and residential receivers operating together in a distributed control paradigm. A primary goal of reviewing the literature was finding models that quantified how residential thermal and electrical storage could contribute to raising or lowering aggregate demand when responding to load shaping signals intended to raise the utilization of variable renewable generation and increase overall system efficiency. Results of the review suggested that nascent developments in modeling paradigms that leverage a combination of applications such as PLEXOS, GAMS, GridLAB-D, and GridMPC, held promise in assessing the system-level impact of residential load flexibility.

Chapter 3

Methodology Development

This chapter extends the review of past work and relevant topics. Included are the research points of departure, differences from cited work, research hypotheses, and an outline of the research performed. The primary goal in methodology development was the assembly of a simulation framework for estimating the potential impacts and value of ARLS across a range of geographies and climates in order to provide results of interest to decision and policymakers and to an those with interest in funding further development of this work.

3.1 Research Point of Departure

Much of the research cited in the literature review collectively provided a point of departure for the work described in this invention. From the perspective of choosing physical models, the work on GridMPC provided a basis for a thermal building model and a solar model. The work on GridLAB-D and on grid taxonomy provided a basis for the distribution grid model. The NREL buildings group provided a basis for the electric DHW heater model. The work provided a basis for developing a battery storage model from first principles.

Specifically, a point of departure in the following areas 1) From a spatial perspective, in order to simulate a large geographic area, an opportunity existed to extend the prior analysis from one electrical distribution feeder in each of three cities to a full complement of 48 feeders across eight cities. 2) From a temporal perspective, in order to provide annual estimates, an opportunity existed to extend the prior analysis from one month to an entire year. 3) From a weather perspective, in order to provide historical estimates and future based scenarios, an opportunity existed to include an alternative weather input mechanism for importing actual or simulated weather station data. 4) From a degree of control perspective, in order to simulate the MPC of other significant uses of residential electricity, an opportunity existed to extend the GridMPC particle swarm optimization (PSO) control algorithm from air conditioning to include electric DHW heating and battery charging. 5) From the perspective of evaluating the impact of increasing RES, in order to model high penetrations of wind and solar energy, an opportunity existed to leverage the methods of in calculating house and feeder level energy uses and flows. 6) From a metrics perspective, in order to include measures of load shaping effectiveness, an opportunity existed to add a new percent load shaped metric for analysis of houses, feeders, and larger geographies. 7) From a load shaping perspective, in order to evaluate the efficacy of alternative shaping strategies, an opportunity and working environment existed to experiment with electricity pricing and optimal load shapes.

In order to inform GridMPC of the usage diversity observed in empirical data, the RBSA dataset provided opportunities for data-driven analysis of over two-years of 15-minute observations of significant uses of residential electricity. Note that disagreement between RBSA observations and GridLAB-D usage schedules resulted in adjustments to improve the fidelity of the electric DHW heater energy usage model.

From the perspective of evaluating the state of the art in residential DR and price response mechanisms, literature reviews provided perspectives in DR capabilities vis-à-vis the continuous ARLS approach. From the perspective of evaluating practical implementations of residential DR, in addition to behavioral review, the Florida Power and Light Company 'On Call' program provided a typical example of an enduring residential DR program. From the perspective of creating and widely deploying a paradigm shift in DR capabilities, it is interesting to note that 1) over 30 years, little has changed in the On-Call program, and 2) DR programs are not commonplace. From the perspective of calculating variable generation cost and CO2 emissions, the GAMS software and methods provided the basis of a model for simulating the unit commitment of the Texas electric power generation fleet. After much discussion and consideration, the methods considered provided the inspiration and underpinnings for the concept of a daily optimum load shape.

3.2 Research Hypotheses

The objective of this research was to estimate the value of load flexibility in support of maximizing the use of low-cost RES and minimizing the present worth life-cycle costs of generating electricity for residential customers. The orchestration of fossil and RES generators and distributed thermal and battery storage operating in concert with the balance of system were explored. The core concepts behind this research were formulated into three hypotheses that provided direction and structure to investigating the value of jointly optimizing electric power generation and residential electricity use.

3.2.1 Hypothesis 1: Data-driven models improve load simulation.

Data-driven analysis of empirical electricity usage data from air-conditioning and appliances can aid in quantifying and simulating diversity in residential electric loads. While studying Probability and Statistical Methods for Natural and Engineered Systems, and Advanced Data Analysis Techniques, unsatisfying results were obtained from applying data-driven stochastic approaches to quantify and simulate the energy usage diversity observed in the empirical data from the Northwest Energy Efficiency Alliance (NEEA), Residential Building Stock Analysis metering study (RBSA). Specifically, traditional regression techniques failed to reflect both diversity and non-stationarity in energy usage among homes and appliances. This hypothesis was motivated by the need to understand the level of diversity in energy usage as observed in real-life situations, a critical requirement for realistic simulation of the benefits of load flexibility. Please see Chapter 4 for further details.

3.2.2 Hypothesis 2: MPC models, informed by diversity, can aid in quantifying end-to-end system benefits of load flexibility.

Model predictive control that reflects the diversity observed in empirical data-driven models can aid in quantifying the end-to-end generation-to-load system benefits of automatic residential load shaping and modulation. While studying the foregoing and examining load add and shed curves as a function of time of day for the MPC-based control of air-conditioning, the following sub-hypothesis was also developed: The MPC of distributed energy resources can be complementary in supporting the grid at different times of the day. While analyzing load add and shed for RBSA appliances, an early morning state synchronization was observed across electric domestic hot water (DHW) heaters. As DHW heaters cycled on, the ability to shed load increased. After heating, as hot water tank temperatures declined, the ability to add load increased. In addition, when analyzing cycling behavior of air-conditioning in the context of MPC, opportunities to shed load increased in the afternoon, prompting the hypothesis of complementary behavior among loads. This hypothesis and sub-hypothesis were motivated by the possibility of modeling complementary flexibility among multiple degrees of control. Further motivation was the possibility to provide insight to improve a) efficiency of generation unit commitment and economic dispatch, and b) appliance designs so that they might provide greater flexibility by, for example, DHW heaters and refrigerators incorporating phase change materials or greater thermal mass.

3.2.3 Hypothesis 3: Combining models through co-simulation can aid in estimating the value of ARLS.

Combining the MPC of distributed energy resources with production cost models, through co-simulation, can aid in estimating temporal value across a range of climate zones and geographic areas. To the best of the author's knowledge, this co-simulation had not been accomplished by others, and could possibly inform the economic justification of demand flexibility. The basic premise to be explored was: Could a residential load model be combined with a production cost model in order to determine variable generation costs and $CO_2$ emissions for different MPC cases and RES penetration scenarios? This hypothesis was developed to further the work in U.S. Pat. No. 19,944,995 to superimpose time series curves of generation supply and user demand from the Platte River Power Authority. Overlaying capacities of generation supply, e.g., X MW of nuclear+Y MW of coal+Z MW of natural gas, against the rising and falling user demand, exposed many periods when marginal generation output was low or nil, and hence very expensive on a per unit (e.g., MWh) basis. Motivation to explore this hypothesis came from recent availability of building, distribution, and production cost modeling tools.

3.3 Outline of Remainder of Invention

The three-phase research approach conducted in this invention included Phase 1, Quantifying and preserving, as necessary, the observed instantaneous load add and shed diversity in empirical appliance electricity usage data. Phase 2, Developing physical models and MPC-based simulations that aggregated homes while reflecting the diversity in energy usage observed in the empirical data, particularly electric DHW heater usage data. Phase 3, Estimating the impact of ARLS on variable generation costs and carbon dioxide emissions. The goals in Phase 1 were to apply statistical methods to quantify the diversity observed in real-world empirical appliance measurements at varying spatiotemporal scales in order to inform simulation. The experiments in Phase 1 were chosen to capture the energy usage diversity related to unknowns that would be costly or impractical to ascertain on a mass scale such as building size and construction, varying numbers of building occupants, occupant behaviors, and age of appliances. As they are significant drivers of residential load, the energy usage statistics for electric DHW heaters were used to inform the fidelity of the models developed in Phase 2, specifically around the timing of energy usage by DHW heaters. Chapter 4 completed the Phase 1 goals.

Phase 2 were to develop physical models that reflect the energy usage diversity observed in Phase 1, e.g., for the DHW heater, and then apply these models in the context of MPC to calculate instantaneous load add and shed opportunities at the electrical feeder level across all U.S. climate regions for a hot summer day. Phase 2 involved working with GridLAB-D, GridMPC, and creating physical models and simulations to estimate flexibility in electrical demand provided by the MPC of air-conditioning, battery storage, and electric DHW heating. The nationwide study in Chapter 5 completed the part of Phase 2 dealing with the MPC of air-conditioning and includes pricing-based control of an electrical distribution feeder. In order to estimate the value of ARLS, the flexibility models developed in Phase 2 were explored in the context of unit commitment of the Texas fleet of 263 thermal generators and nearly 20GW of wind and solar RES.

The goals in Phase 3 were to: 1) Create realistic models of utility generation, distributed generation, distribution grids, and load across the state of Texas. 2) Jointly optimize supply and demand by calculating and broadcasting optimum load shapes to appliances managed by MPC. 3) Calculate the maximum possible impact in variable generation costs and CO2 emissions and the subset thereof (if any) attributable to ARLS. Chapter 6 completed Phase 2 and Phase 3 goals. Chapter 7 completes this invention and is a discussion that includes suggestions for additional research.

Chapter 4 Data-driven Techniques that Quantify the Opportunity Limits of Automatic Residential Electric Load Shaping

4.1 Introduction

To provide insights into residential electricity consumption, this chapter begins by quantifying distributions of observed empirical energy usage over time for 101 homes and the appliances therein. Insights include times and durations of energy use along with reasonable ranges of power, in kW, and energy, in kWh, that were helpful when checking for reasonable behavior of modeled loads in Phases 2 and 3. Visualizations and numerical summaries of electricity usage are included for different types of appliances by hour, day, and year and provide a sense of the upper and lower limits of individual appliance-level contributions to load shaping. To quantify, visualize, and simulate diversity of electricity use across appliances and homes, results from traditional stochastic measures and univariate autoregressive techniques were compared with results from spectral methods. To overcome the limitations of traditional stochastic methods in quantifying diverse, non-Gaussian, non-stationary distributions of observed appliance behavior, recent developments in wavelet-based analysis were applied to capture time-frequency domain behavior. To overcome limitations in visualizing diverse energy usage using boxplots, heat maps, and spectrograms, a wavelet-based plot of time-frequency was applied. To overcome limitations in simulating diversity using traditional autoregressive techniques, a wavelet-based autoregressive method was applied, and performance characterizations were made.

In recent DR research, progress has been made in evaluating instantaneous opportunities to add and shed residential electric load. Residential DR programs are typically implemented as infrequent, utility-initiated, short-duration deferrals of peak demand through direct load control where customers allow their utility to remotely turn off appliances such as air-conditioning and water heating a few times a year for a credit on their electric bill. Despite the promise of load management through supervisory control of the Internet of Things (IoT), direct load control has remained the primary form of residential DR for several decades. However, direct load control was never designed to add and shed load to accommodate the ebb and flow of wind and solar energy. As an alternative to direct load control, in this chapter, automatic residential load shaping (ARLS) is explored as a load elasticity solution for maximizing the system-wide efficiency of electric power generation via intraday control of IoT devices while meeting the needs and comfort preferences of consumers.

To minimize consumers' cost of electricity, an increasing number of smart homes with IOT devices can transition from autonomous to orchestrated operation that shapes load to favor energy from lower-cost wind and solar generation and higher efficiency conventional generation. Today, loads are typically created by controllers that are based on fixed temperature or battery charging setpoints; as such, these loads are considered inelastic in time. In the future, new Internet connected loads such as heating, ventilation and air-conditioning (HVAC) systems, refrigerators, freezers, domestic hot water (DHW) heaters, and batteries could receive forecast dynamic pricing of electricity or other load shaping signals that introduce elasticity by allowing each to choose monetarily or environmentally advantageous times to add or shed load. For example, changes in pricing could be used to update setpoints, allowing IoT devices to continually implement least cost operating strategies. In doing so, instead of electrical supply meeting demand, load shaping would become increasingly important in encouraging elastic demand to enable the cheapest sources and times of supply, thereby reducing thermal and greenhouse gas emissions from power plants while maximizing the usage of clean energy from renewable energy sources (RES).

Understanding the limits of load add and shed opportunities would inform the design of generation, transmission, buildings, and appliances in support of joint optimization of power production and electric load. For example, this may support the business case for hot water heaters, refrigerators, and freezers to have increased thermal storage in order to maximize usage of wind and solar energy. Modeling diverse energy usage in residential loads can be problematic due to different models and ages of appliances. Furthermore, residential loads often exhibit non-stationary energy usage behavior based on the unknown needs of occupants that may vary by hour of the day, day of the week, seasons, holidays, shopping schedules, home cleaning schedules, and vacations. Non-stationary energy usage is difficult to quantify and simulate using traditional stochastic methods. Preserving energy usage diversity can raise the fidelity of electric load models, allowing for more realistic simulation of the generation-to-load system-level response to pricing signals intended to shape residential demand. The role of system-level response gains importance in the application of increasing penetration of wind and solar renewable energy sources (RES). Despite aging components and ever-increasing complexity, the evolving electric grid is highly reliable though expensive to operate. In order to accommodate spatiotemporal changes in inelastic load along with variable and uncertain generation from renewable energy sources (RES), expensive marginal generation and reserve capacity are kept online and dispatched as needed. To address environmental concerns and reduce the cost of generation, RES are becoming more prevalent with an increasing number of cities, counties, states and nations aspiring to high RES penetrations, some as high as 100% by 2030. Because RES are less forecastable and some are not dispatchable at all, there is a growing need for creating load elasticity that can accommodate increasingly volatile supply-demand mismatches.

This chapter extends the investigations of the opportunity limits of ARLS by quantifying load shaping opportunities and uncertainty across a varying number of homes and applying recent developments in spectral simulation techniques from hydrology research. The spectral techniques are applied to solve the research question of quantifying and simulating instantaneous load shaping opportunities based on empirical data that reflect non-stationary appliance energy usage. The novelty of this work is the evaluation of empirical in-home measurements as seeds for the creation and scaling of realistically diverse appliance demand profiles. Simulation of diversity in energy consumption without a priori knowledge of specific appliance and usage characteristics is significant as it provides building blocks for mimicking energy usage behavior in a subdivision of homes for DR planning and operational decision making. Section 4.2 presents an additional literature review on residential DR. Section 4.3 describes the methodology. Section 4.4 discusses results, and Section 4.5 presents conclusions and outlook for future work.

4.2 Domain-Specific Literature Review

Research in residential DR was reviewed with the goal of identifying: (1) State-of-the-art, system-level price response approaches involving time-elastic end uses, (2) Price-response modeling gaps, (3) Price-response human behavioral issues, and (4) Recommendations for future price-response research. There was an overall scarcity of system-level price-response models and a plethora of subsystem models with limited or unspecified spatiotemporal resolutions. Darby and McKenna suggested that new DR measures will be needed to shape load throughout the day. Likewise, based on recent experience in United States and Europe, the significantly less predictable and more volatile net load after renewable generation (i.e., total load less the generation from RES) will need to be smoothed by DR. Results of elasticity experiments by McKenna and Keane found the introduction of dynamic pricing reduced diversity of demand and increased coincidental response by promoting the same characteristics of response among (Internet-connected) automated appliances.

A review of 117 residential electricity demand models indicated significant variability across households and raised questions as to whether high-resolution stochastic modeling approaches provide an adequate representation of the real-world load characteristics of appliances. Adequate representation is important given the massive body of model-based time-of-use and real-time pricing assessments that have been used to address various aspects of residential DR behavior. Furthermore, coupling the inherent limits of stochastic models along with diversity being reduced by pricing-based response further raises the concern for adequately modeling appliance behavior. In a study of the most comprehensive data set of metered electricity demand in the United Kingdom, empirical and simulated consumption data were analyzed on an aggregated annual basis. The comparison used qualitative and quantitative methods between simulated and metered data sets, and discrepancies were found in overall household and individual appliances electricity consumption, where non-normality of the data was apparent.

A kernel density estimate of the distribution of empirical annual consumption data revealed the existence of a tri-modal underlying distribution, which makes intuitive sense at both the appliance and household level. For example, around the world, electric hot water heaters are 1) most often in standby mode drawing no power, 2) are less often in short recharge mode when recovering from standby losses or light usage activities such as washing hands, or 3) are in long recharge mode when recovering from high-usage activities such as dish and clothes washing. A different study, aggregating large numbers of residential appliances for DR applications, used a methodology based on a multi-class queuing system, where each class represented demand blocks of a specific power level, time duration, and a service delay requirement. The model minimized the cost of the appliances aggregated power consumption under day-ahead pricing. A shortcoming of the model was the randomization of demand data from a single consumer to represent the demand behavior of 1,000 consumers. Overall, review of the literature suggested that further empirical, bottom-up, end-to-end system models are lacking and needed to simulate and optimize the impact of DR on maximizing the efficient usage of RES and thermal generation, along with top-down policy measures that provide appropriate incentives.

4.3 Methodology 4.3.1 Data and Methods

All data in this study came from the Northwest Energy Efficiency Alliance, Residential Building Stock Analysis (NEEA RBSA): Metering Study, based on field data from a representative random sample of existing homes in WA, OR, ID and Western MT in the Northwest of the United States. The NEEA RBSA encompassed 29 months of energy usage in 15-minute observations of single-family homes and data readings were available for 90.5% of the intervals over this period. Observations included total per residence electricity usage at the service entrance along with up to 25 individually measured loads per home that were acquired and reported separately, including various types of HVAC systems, appliances, lighting, entertainment, home office, and plug loads. The first of two NEEA RBSA reports contained attributes of 1,400 single-family homes. In addition to building age, envelope dimensions, insulation values, etc., a cross section of vintage and type of appliances were available though not included in this study. The second NEEA RBSA report covered a subset of 101 homes and loads therein, which were the data used in this study. In particular, the thermostatically controlled load (TCL) appliance data revealed how each device could provide ARLS capability. The TCL energy usage per interval allowed for the creation of detailed load shapes that provided insights to the variability in whole-house load.

The NEEA RBSA data captured diversity in energy usage among homes and appliances likely due to occupancy patterns, hour of day, day of week, seasons, holidays, shopping and home cleaning cycles, vacations though none of these parameters are in the dataset. A continuum of short to long appliance run times were evident, reflecting the possibility that sickly or high-use appliances, some which operated nearly continuously, would not be able to participate in ARLS. Vigilance around data accuracy was critical during extraction, transformation, and loading of observations. Some data were missing time stamps, some were out of range (positive and negative), and others were missing. Data anomalies brought into question potential gaps or errors in acquisition, along with the possibility that some appliances, such as a secondary refrigerator or freezer, were intentionally turned off for days, weeks, or months. Energy units of kWh/15-min are referenced in this study due the unavailability of instantaneous power measurements.

Figure 2:
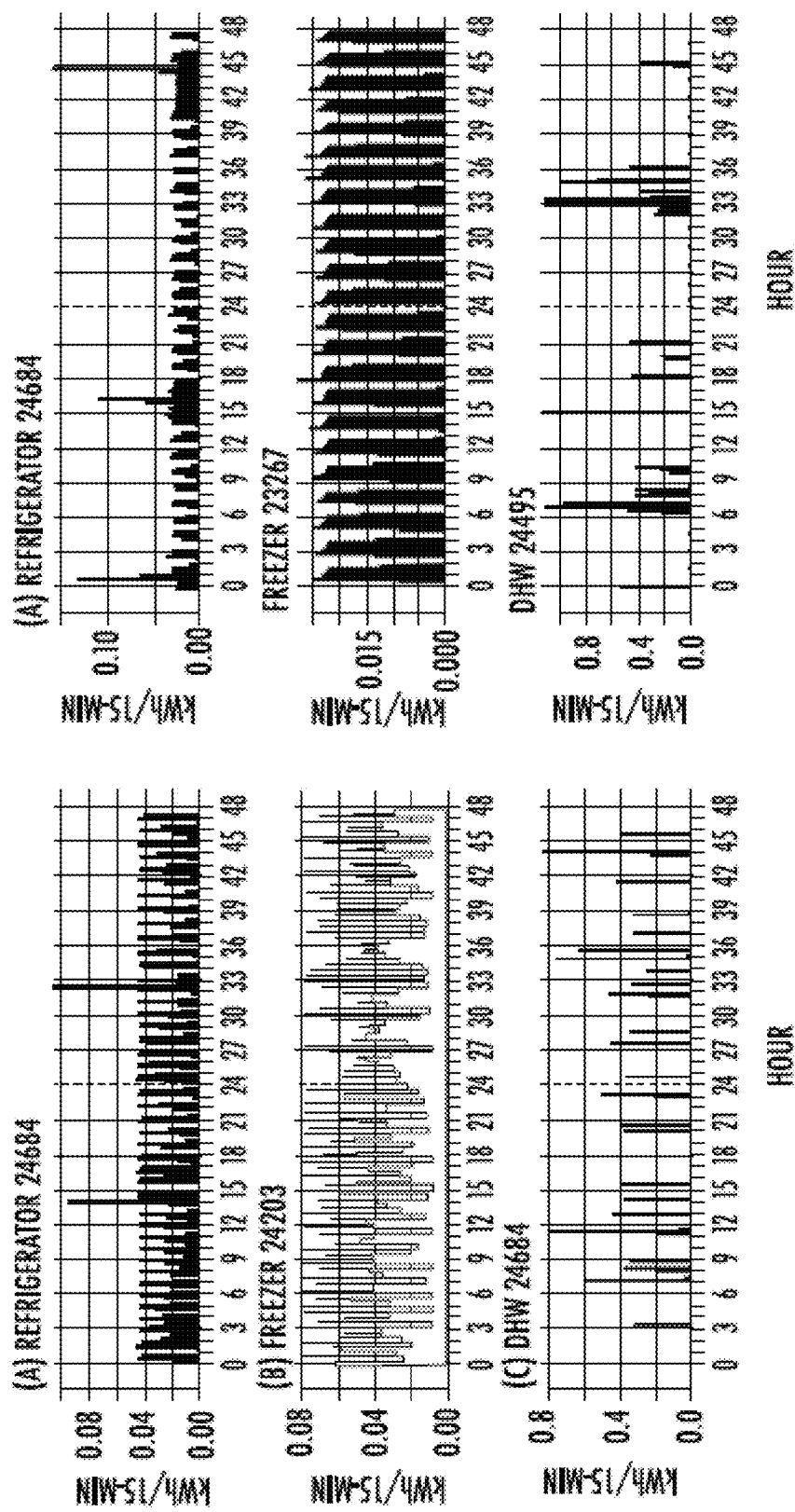
FIG. 2 are plots of the energy usage of different appliances.

FIG. 2 shows when an appliance was operating, particularly energy usage of TCL appliances on July 3-4, over a year, showing kWh per 15-minute interval. Individual bar width is 15 minutes, and the height of each bar denotes the kilowatt-hours of energy used in that 15 minutes. A large colored region indicates a long run time for example, a refrigerator cooling down after being refilled with groceries. House numbers appear after appliance names and vertical dashed lines separate days. Note the diversity in energy usage along axes: (a) two refrigerators, the one at right with a long run times in evenings and higher peak use; (b) two freezers, the one at right with nearly symmetric run times and lower peak use; and (c) two DHW heaters with typically low run times, the one at right with consistently higher peak usage.

Distributional statistics for NEEA RBSA TCL appliances were calculated and visualized using stochastic and spectral methods. Next, a binary conditional operational model was developed to accommodate appliance diversity in start time, frequency of use, duration of use, and energy consumption. Lastly, empirical data were simulated, and the probability density functions (PDFs) of resulting ensembles of simulations were compared to observations. 4.3.2 Modeling TCL Behavior Using NEEA RBSA Data To capture the energy usage diversity in the NEEA RBSA data set, each TCL appliance was viewed as a contributor to a desired load increase or decrease based upon its on or off state in time. Load shaping opportunities were estimated throughout the day wherein TCL appliances were assumed to have Internet connectivity and the ability to change setpoints automatically to execute financially beneficial on and off choices during periods of low and high energy costs. An extreme illustrative case assumed contiguous non-overlapping temperature control setpoints for a DHW heater, as shown in Table 1, wherein the on or off state of the appliance was used to calculate the load increase or decrease opportunity at any point in time given an electricity price change. To simplify calculation of the potential for load shaping, it was further assumed that TCLs always operated within their control differential dead band.

TABLE 1

Sample DHW heater non-overlapping setpoints. The 'Not modeled' entries reflect model constraints that limited operation between 120 and 130 F. inclusive.

| Temp. F. | High $/kWh | Low $/kWh |
| --- | --- | --- |
| 131 and above | Not modeled | Not modeled |
| 130 | Always OFF | Turn Off |
| 129 | Always OFF | Stay ON |
| 128 | Always OFF | Stay ON |
| 127 | Always OFF | Stay ON |
| 126 | Always OFF | Stay ON |
| 125 | Turn OFF | Turn ON |
| 124 | Stay ON | Always OFF |
| 123 | Stay ON | Always OFF |
| 122 | Stay ON | Always OFF |
| 121 | Stay ON | Always OFF |
| 120 | Turn ON | Always OFF |
| 119 and below | Not modeled | Not modeled |

Whenever the price of electricity changed, from high to low, or low to high, TCL appliances reacted as described in Table 1. This logic was applied to TCL appliances to create a time series of Load Add and Load Shed opportunities which were summed for a single house or group of houses, without regard for phenomena such as the inefficiency of preheating and the impacts of energy rebound. Ideally, load add and shed would be expressed in units of power (kW). That said, only units of energy (kWh) were available in the RBSA Metering study. At any point in time, an appliance was either on or off. Looking ahead over n time steps at an individual appliances energy use over time, a maximum load, Lmax, was determined. Likewise, at any time, t, the above logic was evaluated to calculate the load add or shed opportunity, OP. Given a high price of electricity, if an appliance was off, it was incentivized to turn on with a low price of electricity, and the turning on resulted in a load addition, Ladd, equal to Lmax, as in equation 4.1:

$$L_{add}^{appliance} = OP_{add\ load}^{OFF\ appliance} = L_{max(t,t+n)}^{appliance} \quad (4.1)$$

In this model, if a partial load was present, then no load addition was applied, even though Lt may have been less than Lmax.

Given a low price of electricity, if an appliance was on with a current load, Lt, it was incentivized to turn off with a high price of electricity, and the turning off resulted in a load shedding, as in equation 4.2:

$$L_{shed}^{appliance} = OP_{shed\ load}^{ON\ appliance} = -L_t^{appliance} \quad (4.2)$$

Summing among TCL appliances in a specific home yielded the upper and lower limits of aggregate load that could be added or shed as in equations 4.3 and 4.4:

$$L_{add}^{home} = \sum_{TCL\ appliances} L_{add}^{appliance} \quad (4.3)$$

$$L_{shed}^{home} = \sum_{TCL\ appliances} L_{shed}^{appliance} \quad (4.4)$$

Summing among a group of homes yielded an aggregate load that could be added or shed as in equation 4.5 and 4.6:

$$L_{add}^{homes} = \sum_{homes} L_{add}^{home} \quad (4.5)$$

$$L_{shed}^{homes} = \sum_{homes} L_{shed}^{home} \quad (4.6)$$

To simplify the above, the concept of a duty cycle was used to summarize the on and off behavior of a TCL appliance over time. Duty cycle, DC, described the behavior of a device that operated intermittently rather than continuously; it was the fraction of time a device was on divided by the total time, as in equation 4.7:

$$DC_{t,t+n} = (ON\ time)_{t,t+n}/(total\ time)_{t,t+n} \quad (4.7)$$

Over time, an appliance with a low duty cycle typically had a low opportunity to shed load as it was most likely already off. Likewise, somewhat counter-intuitively, a low duty cycle indicated a high opportunity to add load, albeit for perhaps only a short duration. Conversely, an appliance with a high duty cycle typically had a high opportunity to shed load and a low opportunity to add load, as in equations 4.8 and 4.9:

$$OP_{t,t+n}^{appliance\ add\ load} = 1 - DC_{t,t+n}^{applicance} \quad (4.8)$$

$$OP_{t,t+n}^{appliance\ shed\ load} = DC_{t,t+n}^{applicance} \quad (4.9)$$

The opportunity to add and shed load was summed among TCL appliances and homes as in equations 4.3, 4.4, 4.5, and 4.6 to yield the instantaneous aggregate upward and downward load-shaping opportunities. It is critically important to note that following an instantaneous load increase or decrease event, the future operation of a TCL appliance may be constrained, e.g., due to comfort constraints, and load add or shed cannot be controlled continuously. Out of scope of this chapter, though analyzed in following chapters, are the length, periodicity and resulting load add and shed opportunities after appliances participate in a load increase or decrease event.

4.3.3 Scaling Up the NEEA RBSA Dataset

Diverse profiles from thousands of homes are required for future applications of this work involving the joint optimization of generation and load. In simulating ensembles of synthetic appliance data, spectral decomposition and reconstruction were used to preserve the observed diversity in energy use. Spectral methods captured the non-normal, non-stationary energy usage of appliances and met the goal of specifying more realistic probability distribution functions than stochastic methods.

Traditional stochastic methods that were crafted to capture measures such as mean, variance, and skew can fail to reproduce significant spectral properties of the observed data. This failure to reproduce spectral properties can lead to an inaccurate estimation of load. As such, three variants of the wavelet auto-regressive method (WARM) were compared in their ability to capture and recreate appliance behavior involving the hour of day, the day of week, shopping cycles, the timing of house chores, seasonal weather patterns, family vacations, and varying numbers of occupants.

As a first step, the TCL appliance data was decomposed via continuous wavelet transform. Wavelets may be localized in both time and frequency whereas the standard Fourier transform is only localized in frequency. Components were identified based on the peaks in the global (time-averaged) wavelet spectrum. The approach decomposed a time series into various components at several frequencies via the wavelet transform; this provided the power (or variance) of the original data in both the frequency and time domains.

For a time-series, xt, the continuous wavelet transform was defined as equation 4.10:

$$X(a, b) = a^{1/2} \int_{-\infty}^{\infty} x_t \phi^*\left(\frac{t-b}{a}\right) dt \qquad (4.10)$$

where a was a scale parameter (2*dt=30 minutes), φ* was the wavelet function and b was the shift parameter (1*dt=15 minutes). The * denotes a complex conjugate. The Morlet wavelet was a reasonable first choice in wavelet analysis, was most often applied by others with success, and was given by equation 4.11:

$$\phi(\eta) = \pi^{-1/4} \exp(i\omega_o \eta) \exp\left(-\frac{\eta^2}{2}\right) \qquad (4.11)$$

where ω0 and η were nondimensional frequency and time parameters, respectively.

The shifted and dilated form of the mother wavelet was given by substituting (t−b)/a for η in equation 4.11. For a variety of wavelet scales, equation 4.10 can be thought of as a series of convolutions between the wavelet function 4.11 and the original time series at all points. The process was simplified as all convolutions were completed simultaneously at a given scale by the convolution theorem. By doing so, the wavelet transform was defined as the inverse Fourier transform of the product of the wave function in the Fourier space and the data.

The wavelet spectrum at different frequencies over time was depicted by a contour plot of the wavelet transform with a companion plot of the global spectrum that showed the average variance strength at each frequency. Lastly, to simulate the data, phase randomization, a recent development in wavelet-based simulation methods, was applied and compared to the auto-regressive and autoregressive integrated moving average (ARIMA) simulations of the wavelet decomposed energy usage of a DHW heater over the same hour of a day for an entire year. In an effort to fit the data as well as possible, the phase randomization method applied a cosine perturbation to the spectral fit to create an ensemble of DHW heater energy use. Alternative curve fitting techniques were tried and performance compared. A simple auto-regressive process was applied to determine if energy usage could be successfully regressed on its own lagged (i.e., prior) values. In an attempt to improve the auto-regressive fit to the observed energy use, the ARIMA process added a differencing step to accommodate non-stationarity and a linear combination of error terms for values that occurred contemporaneously and at various times in the past.

4.4 Results 4.4.1 Residential Appliance Load Profiles

Stochastic analysis of empirical data revealed diverse, non-normal distributions of energy usage for the studied TCL appliances. In addition, non-stationary usage was indicated by a nonconstant mean and variance in different time epochs. The empirical 15-minute observations were dominated by zero values and had long tail frequency distributions. Once zero values were removed, kernel density estimates provided insights to bimodal distributions of air conditioner and refrigerator behavior and trimodal distributions of freezer and hot water heater behavior. Lastly, spectral methods provided both visualizations of diverse and non-stationary energy usage as well as PDF ensembles of simulated hot water heater behavior. The observed energy usage of appliances varied by a factor of 2 or more, which assumed continual usage on an annual basis. As expected, all homes had a primary refrigerator. About a quarter of homes had a secondary refrigerator, and almost 40% of homes had a stand-alone freezer. A total of six homes had a secondary freezer and the low the number of samples for this appliance type indicate there were many NAs in the data, indicating missing observations, perhaps because secondary freezers were not operated year-round.

The diversity in empirical energy consumption impacted the bounds of energy usage for small sets of homes that are typically fed by a split-phase transformer. For example, depending on the number of homes, the mean energy used to heat hot water had wider bounds with fewer homes sampled. Looking at electric energy usage for heating DHW over the interval 00:00 to 00:15 on Apr. 1, 2012 it is observed that there is an uncertainty in adding or shedding load as a function of the number of participating houses. Simply put, an increase in participating homes resulted in greater certainty in the amount of load that could be added or shed.

Focusing on a single DHW heater, the distributional statistics of electric DHW heater energy usage varied per 15-minute interval and per day were observed and is representative of observations of electric DHW heaters in other homes. It was found that the spread in statistics provided insight into the diversity in the energy usage of a single appliance, in this case, a DHW heater. Note the daily sum varied by a factor of approximately eight. Summing DHW heater energy usage into 1-hour intervals, an annual distribution of usage by the hour of the day was determined.

Electric DHW heater energy usage in another home per hour of day revealed more outliers but lower interquartile variance in early morning hours. It was inferred from the usage chart that 5 AM is the start of increased hot water usage in the morning and is among the high-variance off-peak hours. Hours of high variance can result in difficulties in estimating instantaneous load add and shed opportunities. As such, the 5 AM hour was chosen as a difficult test case for evaluating curve fitting and creating simulation ensembles. If 5 AM daily energy usage could be simulated for one DHW heater, other hours, water heaters, homes and cities could be modeled similarly.

The limitations of conventional linear and quadratic curve fitting methods were evident when attempting to capture the energy usage variance and resulted in unsatisfactory curve fits to the time-varying, non-stationary empirical appliance usage data. As a solution test case, the spectral WARM method was applied to decompose and reconstruct the energy usage of DHW heating in the 5 AM hour over the course of a year and resulted in a nearly perfect curve fit as shown in FIG. 3 (six months are shown for visual clarity of chart).

Figure 3:
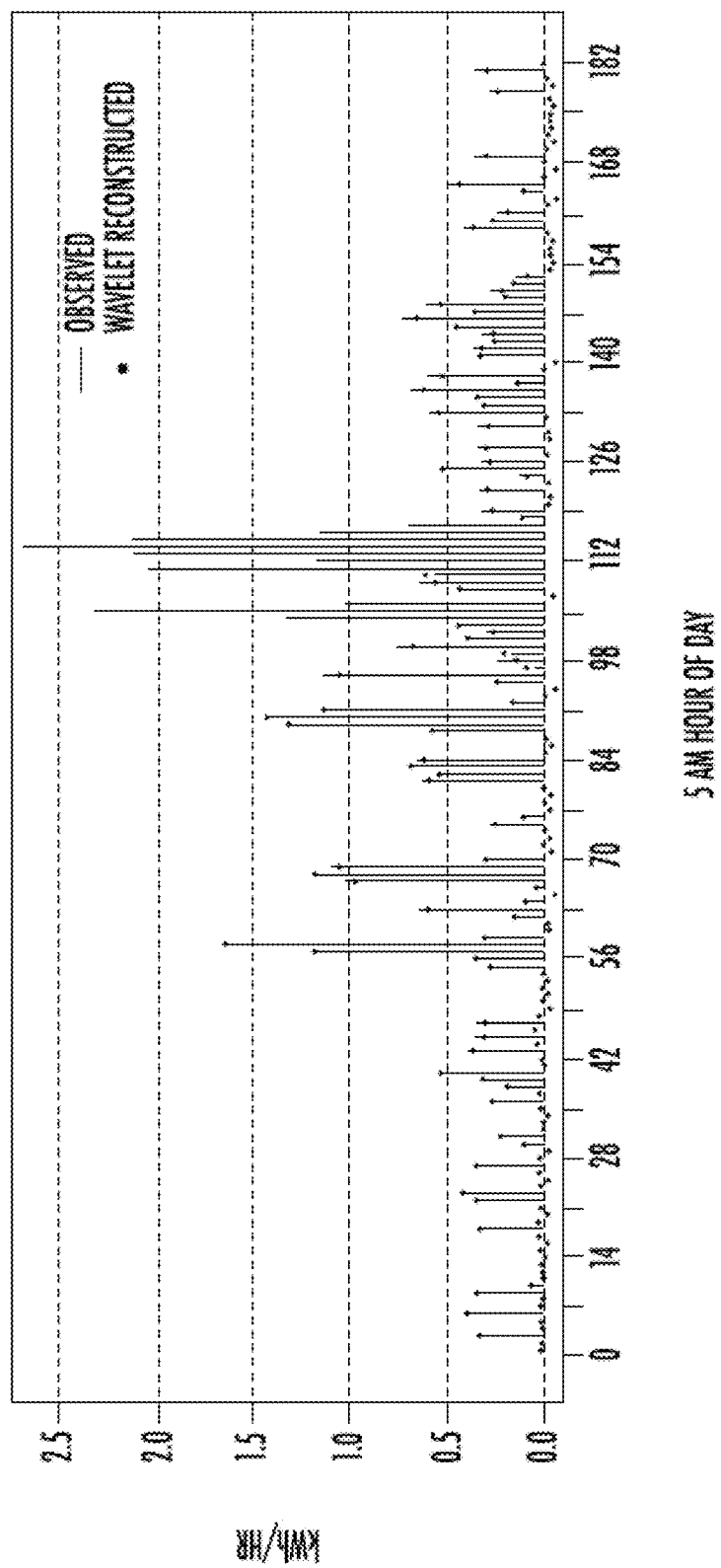
FIG. 3 is a plot of wavelet decompositions and aggregated WARM-based curves.

FIG. 3 shows a wavelet decomposition and aggregation in the enhanced WARM-based curve fit of 5 AM hourly energy usage of DHW heater in RBSA home 10388 from Q2-Q3 over a year inclusive. Prediction errors in the ON state are depicted by vertical offset between the observed value at top of each bar and its corresponding wavelet reconstructed value denoted as a dot; errors in the OFF states include non-zero values viewed along the day-axis.

4.4.2 Residential Load Shaping Opportunities

Figure 4:
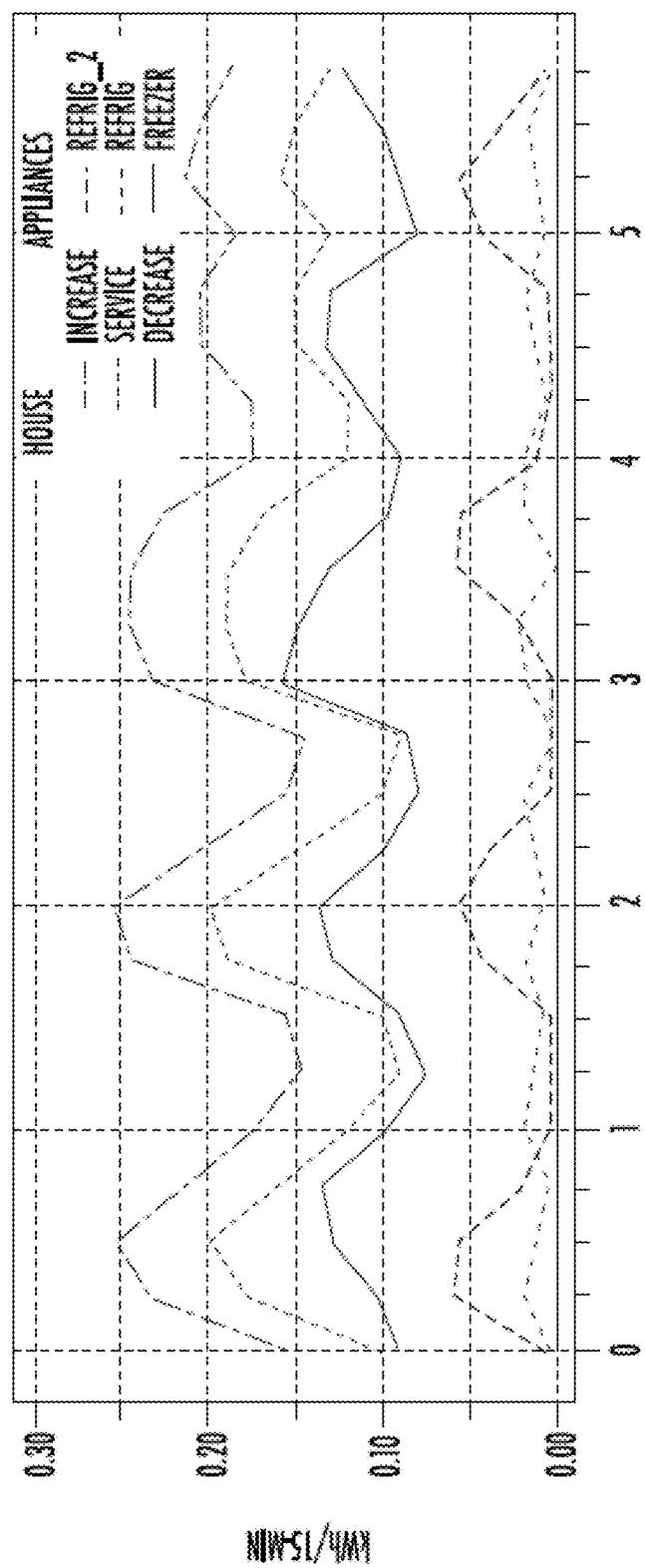
FIG. 4 is a plot of the energy usage profile of RBSA homes.

Diversity in appliance empirical energy usage resulted in varying load shaping opportunities across the studied NEEA RBSA homes, of which, 57 homes used electricity to heat DHW and 44 used gas. To estimate opportunities for each 15-minute interval, (1) and (2) were evaluated to calculate the ability of each individual electric TCL appliance to add and shed load using a look-ahead interval of 24-hours for Lmax. Likewise, for each specific home, results were summed among TCL appliances using (3) and (4) to calculate the upper and lower instantaneous limits of load shaping, as shown in FIG. 4. (six-hours are chosen for visual clarity of chart) and Table 4.2.

FIG. 4 shows the energy usage profile of RBSA home 13019 at 15-minute intervals. The hatched line labelled service is the whole-building electric service, the portion leading up to the hashed dotted line labeled Increase is the instantaneous load that could be added, and the portion descending to the solid line labelled Decrease is the instantaneous load that could be shed. Energy usage of individual TCL appliances in the home appear in hashed lines labeled Refrig, Refrig_2, and Freezer at the bottom of the graph. RBSA home 13019 is representative of homes with gas DHW heaters.

Table 4.2 tabulates load-shaping opportunities for Home 13019 based on 15-Minute intervals during first six hours.

TABLE 4.2

| Opportunity | Max | Min | Mean |
| --- | --- | --- | --- |
| Increased load [kW] | 0.800 | 0.360 | 0.587 |
| Decreased load [kW] | 0.636 | 0.302 | 0.442 |

To evaluate instantaneous load shaping opportunities among groups of homes, results from individual homes were summed using equation 5 and 6. Summing whole-building electric service, as well as the upper and lower limits among the 14 NEEA RBSA homes exhibiting best data quality, yielded an aggregate load that may be added or shed at any point in time, as shown in FIG. 5 (14 homes are chosen for visual clarity of chart).

Figure 5:
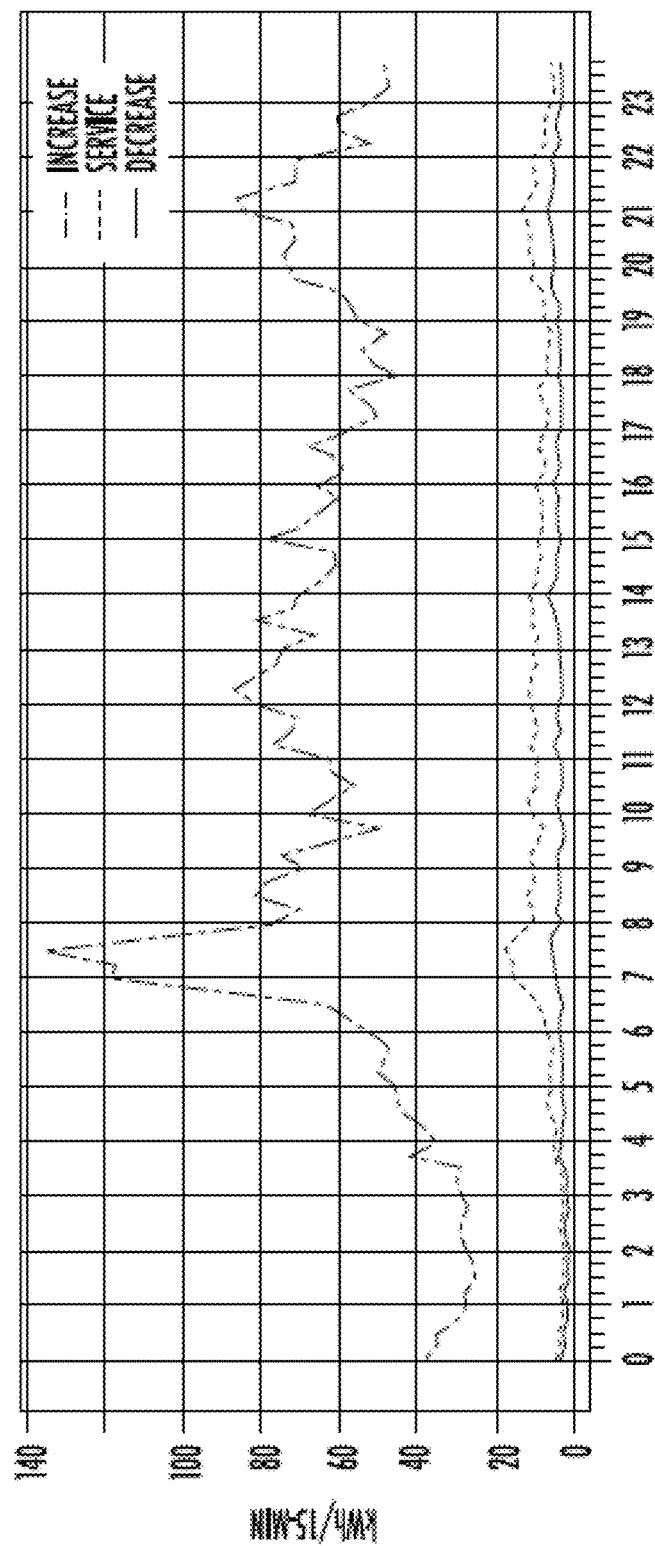
FIG. 5 is a plot of the aggregate load profile of RBSA homes.

FIG. 5 shows the aggregate load profile of 14 RBSA homes at 15-minute intervals. The black line labeled Service is the home electric use, the portion leading up to the hashed line labeled Increase is the possible instantaneous load that could be added, and the portion descending to the hashed line labeled Decrease is the possible instantaneous load that could be shed. The red spikes indicate opportunities to add load, for example, following completion of DHW heating resulting from early morning widespread synchronized use of hot water. Mid-day and evening load shaping opportunities were also evident.

Summing across multiple houses showed that significantly more load could be added than shed at any point in time. This is mostly attributable to a DHW heaters low duty cycle and high instantaneous load, which is on the order of 10 to 40 times greater than that of refrigerators and freezers.

4.4.3 Visualization of Appliance Loads

The results discussed thus far have not provided visual insight to appliance energy usage that varies over time. While results have indicated temporal diversities, they lack numerical summaries that quantify behavior. Furthermore, using one pixel on the time axis to denote 15-minutes, the number of pixels required becomes unwieldy when attempting to visualize long periods of a year or more. As an alternative, a visual sense of the mean, median, interquartile range, outliers, and positive skew all of which quantify behavior over time, lack the ability to depict behavior changes between intervals. Similarly, other results lack the ability to depict inter-interval behavior, e.g., from any single 15-min to another. In summary, while a sense of distributions of energy use over a period and provide insights to the normality of the data can be obtained, they do not provide a sense of behavior at specific points in time.

Heat maps can be helpful in viewing energy usage over multiple intervals. An energy use heat map displays time on both axes, e.g., individual days on the horizontal axis and individual 15-minute intervals on the vertical axis. As depicted near the center of FIG. 6, Day 4 had several periods of high energy use.

Another heat map may show energy usage of DHW heater in RBSA home 2284 over the first 7 days of 2Q. Colored bars depict electricity use in 15-minute intervals and 1.0 or above denotes high use. Note several high energy use periods, particularly on Day 4 before 12 noon. In a heat map, the number of time intervals on the horizontal axis may be increased in order to view more days, for example electricity use over 30 days.

Another such heat map may show energy use of DHW heater in RBSA home 2284 over the first 30 days of 2Q. Colored bars depict electricity use in 15-minute intervals and 1.0 denotes high use. Note several high energy use periods, particularly on Day 4, 11, 12, 15, 23, and 24. In addition to high electricity use on Day 4, other high use periods are evident. Heat maps become increasingly difficult to read in the presence of non-stationary behavior, e.g., the red regions in 4.11 denote high electricity usage occurring at different times on the day. When attempting to visualize behavior over very long periods, heat maps have pixel limitations similar to bar plots. The visual information in a year-long heat map can be blurred by nonstationary behavior.

Another heat map may show energy usage of DHW heater in RBSA home 2284 from 2Q of Year 1-1Q of Year 3 inclusive. Colored bars depict electricity use in 15-minute intervals and red denotes high use. Note the faint thin white horizontal band denoting nearly consistent energy use at 5 AM on most days. Also note the non-stationary high energy use intervals in the late morning, afternoon, and evening on most days. High electricity use can also be observed at approximately 6 AM on and near day 600. Spectrograms can be helpful in viewing appliance electricity usage over time. A spectrogram is a visualization of the spectrum of frequencies of a signal as it varies with time. There is much recent literature on disaggregating household loads by using spectrogram analysis to discern the time frequency signatures of individual appliances such as kettles, refrigerators, dishwashers, microwave ovens, washing machines, and televisions. In addition, spectrogram visualization may be applied to a specific appliance, in this case, a DHW heater. A spectrogram may be created using a 1-day window of 96 samples to depict the frequency of energy use by the electric DHW heater in RBSA home 2284 over 30 days.

Such a spectrogram of DHW heater energy use in RBSA home 2284 over the first 30 days of 2Q. An oscillogram may be plotted beneath the spectrogram and denotes peak energy use. High energy use periods on days 11, 12, 15, 23, 24, and 29 were observed. The size and shape of a spectrogram analysis window can be varied. A shorter (smaller) window produces more accurate results in timing at the expense of precision in representing frequency. A longer (larger) window provides a more precise representation of frequency at the expense of precision in representing timing. The daily window size presents challenges when depicting a very large number of days.

Another spectrogram may show usage of DHW heater energy use in RBSA home 2284 from 2Q of Year 1-1Q of Year 3 inclusive. An oscillogram is plotted beneath the spectrogram may denote peak energy use. Only a few details are discernible such as lower energy use in the first 200 days and higher energy use just before and in the period after Day 600. The inclusion of 2 years of daily spectrogram windows showed only a few unique details being discernible such as lower energy use at left and higher energy use.

Wavelet analysis is becoming a common method for analyzing, visualizing, and simulating localized variations of power within a time series. A major benefit of wavelet visualizations is their ability to convey more comprehensive information than traditional distributional metrics and visualizations such as boxplots and histograms. For example, the wavelet visualization for a single DHW heater discussed above may be based on 25 months of 15-minute intervals.

4.4.4 Simulation of Appliance Loads

Figure 7:
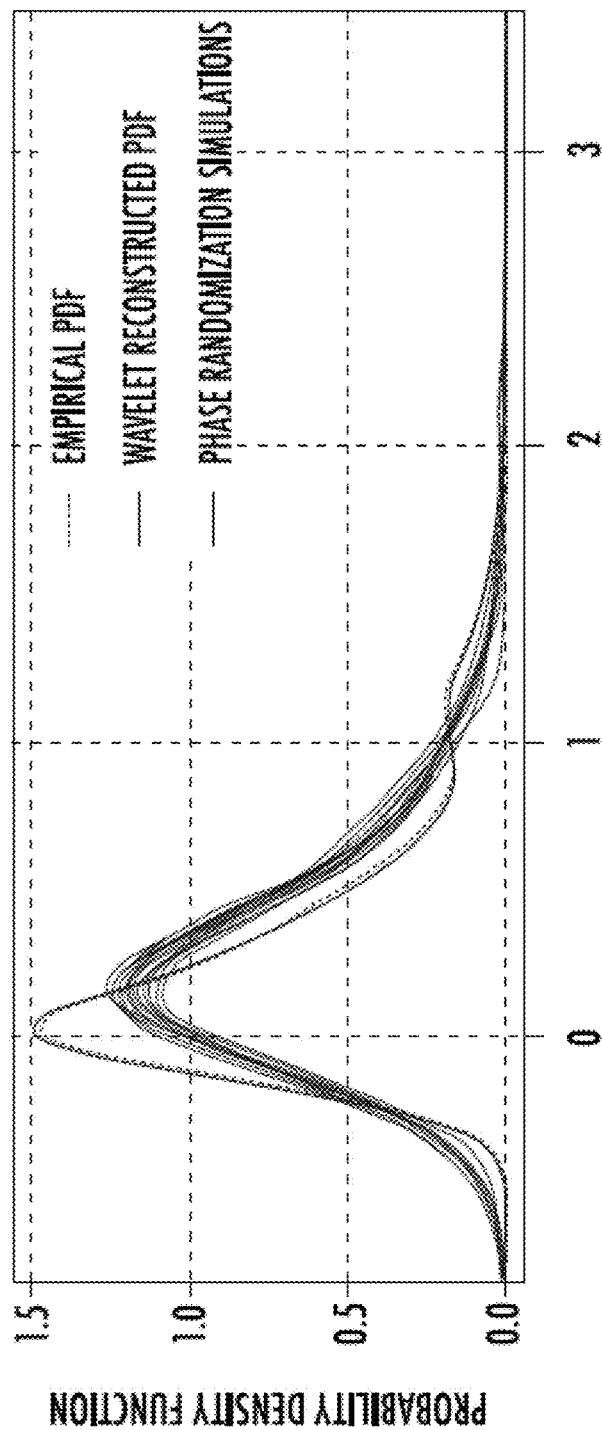
FIG. 7 is a plot of a wavelet-based phase randomization simulation of an appliance.

Having discussed methods and results for quantification and visualization of appliance energy usage, this section presents and compares simulation via several methods. Using a nonparametric density estimation technique, spectral reconstruction was used to simulate PDF ensembles of the 5 AM energy usage of a DHW heater, which were compared to the PDF of the empirical data. There were differing results from the simulations based on wavelet-based phase randomization, straight autoregressive, and ARIMA methods. The phase randomization method applied a cosine perturbation to the spectral fit and did the best job creating ensembles of DHW heaters that model the empirical PDF, as shown in FIG. 7.

A similar simulation of the wavelet may be constructed that is decomposed 5 AM hourly energy usage by DHW heater in RBSA home 13088 from Q2 Year 1-Q1 Year 2 inclusive, using the phase randomization method. The straight autoregressive and ARIMA simulation results were obtained using the stats::arima.sim function from the R programming environment. The simulations based on the straight autoregressive method performed similarly to ARIMA simulations, with PDF ensembles from both methods showing poor fits.

Another simulation of the wavelet decomposed 5 AM hourly energy usage by DHW heater in RBSA home 13088 from Q2 Year 1-Q1 Year 2 inclusive, using the autoregressive ARIMA method. In both simulations ensembles are not close to the empirical PDF. Also, note the high occurrence of unrealistic negative values further indicating poor curve fits by the straight autoregressive and ARIMA simulation methods. The phase randomization method most accurately modeling the observed behavior of the empirical PDF was explored. Then comparison of phase randomization and ARIMA simulation techniques of the wavelet decomposed 5 AM hourly energy usage by DHW heater in RBSA home 13088 from Q2 Year 1-Q1 Year 2 inclusive was observed.

To quantify the performance of the simulation methods, distributional statistics for the first, second, third and fourth statistical moments (mean, variance, skew and kurtosis) were shown for all simulations, along with maximum, minimum, and sum. For comparison, the performance of each simulation method was shown along with statistics from the empirical observations. For most statistical measures, the phase randomization method had better simulation performance than either the straight autoregressive or ARIMA methods.

Mean and variance comparing the performance of reconstruction methods in simulating 5 AM hourly energy usage by the electric DHW heater in RBSA home 13088, from Q2 Year 1-Q1 Year 2 inclusive. Statistics of empirical observations are denoted by red dots. For mean and variance, phase randomization provided superior performance. An unrealistic slightly negative mean energy usage and spread in variance in both the straight autoregressive and ARIMA simulation methods was observed.

Skew and kurtosis were plotted comparing the performance of reconstruction methods in simulating 5 AM hourly energy usage by the electric DHW heater in RBSA home 13088, from Q2 Year 1-Q1 Year 2 inclusive. Statistics of empirical observations are denoted by red dots. For skew and kurtosis, the phase randomization method had somewhat better performance. The statistics of all simulation methods were less than in the observed RBSA data.

Maximum, minimum, and sum comparing the performance of reconstruction methods in simulating 5 AM hourly energy usage by the electric DHW heater in RBSA home 13088 were obtained, from 02 Year 1-Q1 Year 2 inclusive. Statistics of empirical observations are denoted by red dots. Note: (a) the significant variances in the maximum statistic would adversely affect load shaping calculations, (b) the minimum statistic included unrealistic negative values, and (c) Mean values of zero in the AR and ARIMA sum statistics were unrealistic. This further highlights the challenges in simulating RBSA appliance usage data, in this case, for a single DHW heater. Note that all simulation methods understated both peak usage and minimum usage, some more so than others. Analyzing these simulations highlighted limitations in all simulation methods and quantified the superior performance of phase randomization over both the straight autoregressive and ARIMA simulation methods.

In summary, results indicate the abilities of different types of Internet-connected appliances to add and shed electric load throughout the day. The implications of automatically adding and shedding loads are significant in the context of the grid supporting increased penetration of RES. Results also indicate the improved performance of spectral methods over traditional statistical methods in the ability to quantify and simulate non-stationary behavior, which addresses concerns in the literature of preserving energy use diversity and improving model fidelity for realistic simulation of the generation-to-load system-level response.

4.5 Conclusions and Outlook for Future Work

In this study, it was assumed that utilities would evolve beyond direct load control and use ARLS to create elasticity in demand by continually broadcasting a forecast dynamic price of electricity to IOT appliances in order to maximize generation efficiency and minimize the cost of electric power production and consumption. Changes in pricing resulted in instantaneous load add and shed opportunities which were quantified for individual and groups of NEEA RBSA single family homes in the Pacific Northwest of the United States.

Empirical data were explored, resulting in several interesting statistics and features, including the relationship between duty cycle and instantaneous opportunities, however brief they might be, to add or shed electric load. Wavelet spectral analysis was applied to capture and view diverse and unknown drivers of load such as the type, age, and time of use of appliances and occupancy characteristics. The performance of WARM phase randomization, autoregressive and ARIMA simulation methods were compared; the ability of each method to reflect diversity in energy usage of an actual DHW water heater in a high-variance hour over the course of a year was quantified, with phase randomization providing the most accurate simulation ensembles.

Most importantly, this work provided insights in quantifying diversity in appliance energy consumption without a priori knowledge of appliance details and in simulating load ensembles that reflect observed energy use. The main contribution is that a robust simulation technique like WARM provides the ability to simulate synthetic subdivisions for use in energy management research. The WARM can be used to simulate a variety of ensembles mimicking each appliance in a subdivision in order to aggregate statistics of energy usage, by house and electrical distribution feeder, for potential decision making in managing the grid.

The research and results described in this chapter provided insights into the characteristics of residential electricity consumption. Insights based on observed empirical energy usage included times and durations of energy use along with expected ranges of power and energy that were helpful when checking for reasonable behavior of the loads modeled in Phases 2 and 3. Visualizations and numerical summaries of electricity usage provided a sense of the upper and lower limits of individual appliance-level contributions to load shaping. The results have been helpful in understanding expected appliance, home, and distribution feeder behavior with and without ARLS. Of immediate use in this research was finding a disagreement between the GridMPC simulated data and the RBSA empirical data regarding the timing of energy usage by DHW heaters. GridLAB-D is the origin of the DHW heater energy use schedules that are implemented in GridMPC simulation. A discrepancy in DHW heater operation in early morning hours motivated usage schedule modifications during Phase 2 of this research. Additional detail appear in Chapter 6.

Chapter 5

Characterizing Potential Electric Grid System Benefits of MPC-based Residential Load Shaping 5.1 Introduction This chapter explores the potential for price-responsive control of residential air-conditioning to shape electric demand at the distribution feeder level in order to minimize electricity production costs. First, motivation is provided for flexibility, particularly flexible building loads. Second, physical models of the interplay between building thermal and electric loads are used to simulate time-series temperature and load behavior. Third, instantaneous load-adding and load-shedding opportunities are quantified in more than 100,000 individual homes on 204 distribution feeders with results presented for 35 cities across the United States. Fourth, in the context of distributed model predictive control, simulation of feeder-level response to a residential day-ahead 5-minute pricing vector to 2,146 homes highlights an aggregate impact of flexible loads. Buildings are significant users of energy, responsible for more than 73% of the total electricity usage in the United States, with about 50% of that consumption occurring in residential buildings. As such, the ability for buildings to provide grid-controlled flexible load can be critically important.

With increasing penetrations of renewable energy sources (RES) and fossil fuels waning in the electricity generation mix flexible loads can help accommodate the variable and uncertainty. Flexible loads can be used to maintain the operational balance between generation supply and user demand in transmission, distribution, and microgrids.

5.2 Recap of Reduced Order Building Model and MPC

To reduce electric bills, support high penetrations of RES and achieve a host of electric grid benefits, model predictive control (MPC) has been applied in thousands of residential buildings to enable optimal supervisory control of building thermal mass through the manipulation of cooling temperature setpoints. Setpoint adjustment enables load-adding and load-shedding opportunities because additional cooling energy is stored in the thermal mass when lowered and released when raised. In the absence of grid-side control elements, such as load tap changers, distribution grid impacts were evaluated from the perspective of air-conditioning control on a single electric utility distribution feeder in three U.S. cities for the typical meteorological month of July. The GridMPC in-home controller developed used a receding horizon MPC scheme to minimize an objective function of building electric energy and demand. Given that there are hundreds or thousands of buildings on a distribution feeder, the size of the decision space makes a centralized supervisory control optimization intractable. As such, a decentralized, distributed approach was adopted. Therefore, in GridMPC, a population of residential buildings was simulated as being connected to a feeder, and each performed a separate control optimization independent of the other buildings.

To improve computational efficiency and provide timely simulations, developed a reduced order building model (ROM) within GridMPC suitable for determining electric load throughout the United States. The ROM combines typical meteorological year (TMY) weather data, building envelope data from the U.S. Energy Information Administration, Residential Energy Consumption Survey (RECS), and several component models for appliances and occupancy. The RECS data were randomly sampled across several characteristics important to residential energy use, including dwelling type, floor area, envelope integrity, heating type and setpoint, cooling type and setpoint, and hot water usage. The TMY and RECS data are location specific, capturing variations from one city to another. Using an electrical circuit analogy, all residential buildings on a representative electrical distribution feeder were expressed as a thermal network of resistive and capacitive elements. As an example, for each building, the envelope model illustrated in FIG. 5.1 consisted of six components that represented, counterclockwise from the upper left, the glazing, roof, walls, floor, internal mass, and air.

Figure 8:
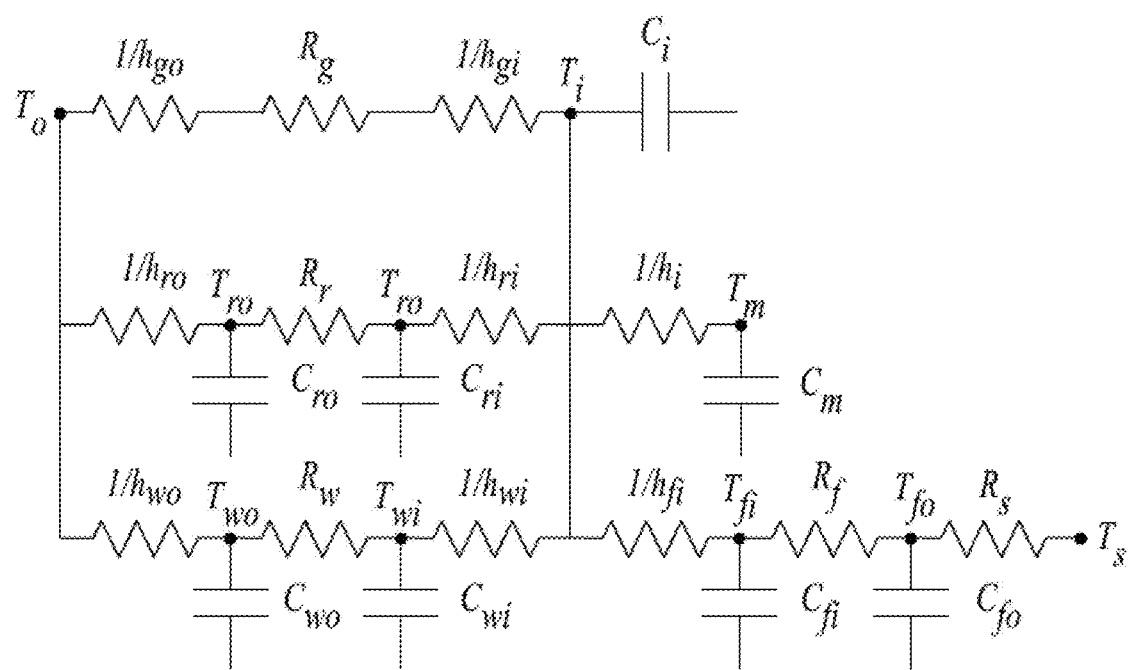
FIG. 8 is a model of a building envelope expressed as a thermal network.

FIG. 8 depicts a building envelope model expressed as a thermal network. For each of the solar exposed surfaces, total solar insolation was calculated from the beam, diffuse, and horizontal components. Likewise, the glazing model was a straightforward extension of the opaque surface model that included a solar heat gain coefficient. Shading by overhangs and fins was also calculated for all solar exposed surfaces. Energy balances were formulated around the individual elements shown in FIG. 8 to create a system of ordinary differential equations, which were discretized in time and solved analytically. As an example, for the exterior wall node, the energy balance was expressed as equation 5.1:

$$\Sigma Q_{wo} = Q_{solwall} + h_{wo} A_w (T_o - T_{wo}) + A_w / R_w (T_{wi} - T_{wo}) + C_{wo} dT_{wo}/dt \qquad (5.1)$$

where:

$\Sigma Q_{wo}$ is the energy balance at the outside wall node,
$Q_{solwall}$ is the energy gain caused by solar insolation,
$h_{wo}$ is the outdoor film coefficient, and
$A_w$ is the wall area.

In addition to ordinary differential equations for the building envelope, other subsystems were modeled in. A central air-conditioning system model combined a DX air cooling coil with a constant volume fan and a dual setpoint thermostat that included hysteresis. Internal heat gains from equipment such as appliances and lights were modeled using a nominal energy demand, schedule, fuel type, and sensible heat fraction. The schedule value ranged from 0 to 1, representing the fraction of time that the equipment is on during a given interval. The heat gain from equipment was the energy consumed times the fraction of energy converted to heat. Heat gains from occupants were also modeled. In an annual comparison of heating and cooling loads, the ROM was found to be in agreement with EnergyPlus (BESTEST-EX), SUNREL, DOE-2.1E, and GridLAB-D).

In summary, the ROM of includes a building envelope model for estimating heating and cooling requirements; equipment models to calculate electric demand associated with cooling; a thermostat model to control the cooling operation; simplified end-use models (and the heat gains they produce) for appliances and electric hot water heaters. Definitions for some of these models are described in the EnergyPlus Engineering Reference. Other models are largely derived from the ASHRAE HVAC 2 Toolkit.

When operating as an Internet-connected smart thermostat, in the context of MPC, GridMPC adjusted setpoints in increments of 0.25 K, which is a typical precision of residential thermostats. GridMPC assumed each home to be unoccupied for 10 hours during the day, starting at 08:00±1 hour. The departure time was randomized for each home to capture occupant diversity and prevent unintended synchronization. The thermostat setpoint in an occupied home was altered between +0K and −2K, and in an unoccupied home between +3K and −5K. The −2K lower boundary during occupied periods recognized that larger temperature swings would likely cause occupant discomfort. To experimentally explore load shaping, GridMPC was extended by adding estimates of instantaneous electric load-adding and load-shedding opportunities at each simulation time step. This extended model allows for the creation of nationwide quantitative assessments of the impact of residential load shaping and helps quantify the electric system benefits resulting from the aggregate effects of residential load shaping. As only real power is considered in this experiment, the results are aggregated using the R programming environment and the GridLAB-D distribution simulation software is unneeded.

5.3 Simulation Methodology

To simulate the impact of thermal mass-enabled residential load shaping on the distribution network in 5-minute intervals, the following steps are summarized here and further detailed next: 1) Hundreds of prototypical electric distribution feeders in cities across the United States are populated with the attributes of thousands of prototypical homes. 2) The ROM uses one Summer day of TMY weather data to estimate the whole-building electric demand for each residence. 3) Using the extended model, individual home instantaneous electric load-adding/load-shedding opportunities are calculated on a 5-minute timescale based on differences between air-conditioning thermostat setpoints and zone temperatures. 4) Each home's electric loads and instantaneous add/shed opportunities are aggregated to the feeder level. 5) Feeder loads and instantaneous add/shed opportunities are aggregated to the city level. 6) As a separate activity, GridMPC uses 5-minute day-ahead forecast pricing to control air-conditioning load, in the context of distributed MPC, to simulate a single feeder-level response to residential load shaping.

Step 1) Using data from the RECS, the MATLAB feeder generation scripts provided by the GridLAB-D development team are used to automatically generate a population of residential buildings characteristics based on feeder nominal load characteristics and climate region.

Step 2) For each house, a base case load simulation involves the following: A) A fixed cooling temperature setpoint is selected from a distribution. B) Using TMY and RECS data, the zone free-float temperature for the current time period is found by simulating without operating air-conditioning equipment. C) If the zone temperature exceeds the cooling setpoint, the energy required to bring the zone back to the temperature is calculated; if not, new mass and zone temperatures are calculated. D) Energy consumption by the air-conditioning equipment is calculated given the delivered cooling energy from each time step. The ROM is used for the calculations in steps (B) through (D). The base case load includes air-conditioning, miscellaneous electric loads, appliances, and electric hot water heaters. Alternatively, other than base case simulation, Step 2 can be modified to simulate a load-shaping ancillary service that is provided by GridMPC setpoint adjustment in response to forecast pricing.

Step 3) For each house, using the extended model, the calculation of the zone temperature in each time step enables a logic-based assessment of whether the conditioned space is at the upper or lower temperature limits of comfort. Subject to minimum run-time constraints, if the air conditioner is off and the zone temperature is between comfort limits, then load can be added. Similarly, if the air conditioner is on and the zone temperature is between comfort limits, then load can be shed. However, if the zone temperature is at the upper comfort limit, then no load can be shed because the air conditioner must run to keep the zone from overheating; likewise, if the zone temperature is at the lower comfort limit, then no load can be added without over-cooling the zone. This on/off logic governs the calculation of instantaneous load-adding/load-shedding opportunities within temperature setpoints.

Step 4) Residential loads and instantaneous add/shed opportunities are aggregated at the feeder level using the R statistical programming environment. Instantaneous add/shed opportunities in MW are then divided by feeder demand in MW and expressed as a percentage of feeder load.

Figure 9:
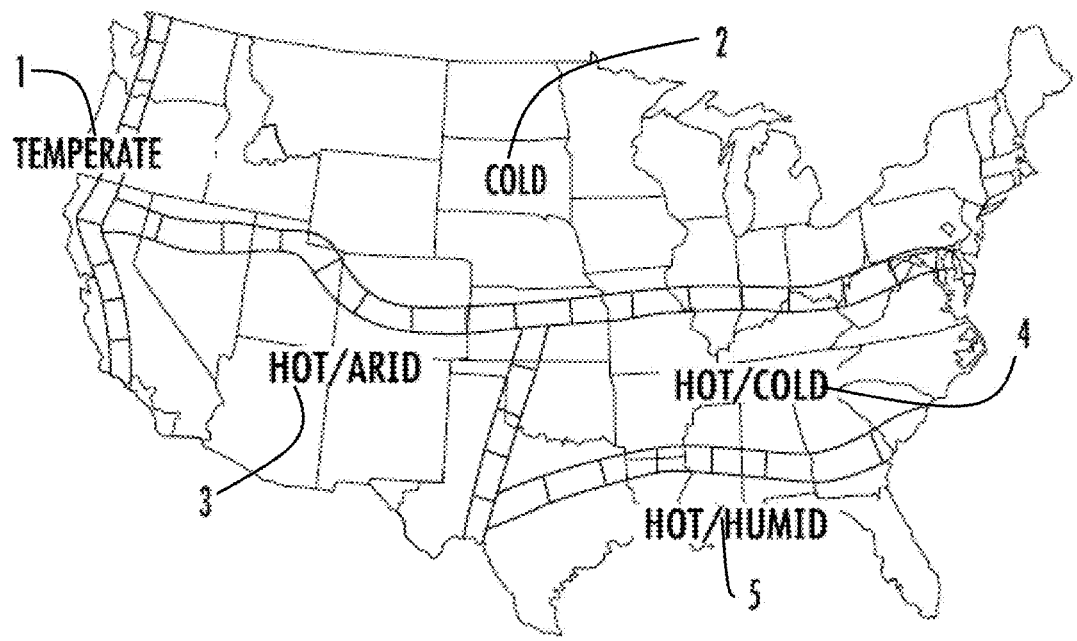
FIG. 9 is a map of the USA with different regional climate characteristics.

Step 5) The percentage load-add/shed results are transformed into a weighted average (on a per city basis) by multiplying the output of Step 4 by the percentage of each type of feeder per city. To create a nationwide perspective of instantaneous load-adding/load-shedding opportunities, multiple representative feeders are simulated in nearly equally spaced cities across the climate regions defined in the distribution taxonomy in. For reference, a map of distribution taxonomy climate regions is shown in FIG. 9, and a list of feeder weighting and characteristics are shown in Table 5.1. The regions are as follows: Temperate region 1, cold region 2, hot/arid region 3, hot/cold region 4, hot/humid region 5.

TABLE 5.1

Prototypical feeder weighting by region.

| Region | Feeder | kV | # of Feeders | % within a Region | Description |
|---|---|---|---|---|---|
| Region 1 | R1-12.47-1 | 12.5 | 2,200 | 21% | Moderate suburban and rural |
| | R1-12.47-2 | 12.47 | 2,500 | 23% | Moderate suburban and light rural |

TABLE 5.1-continued

Prototypical feeder weighting by region.

| Region | Feeder | kV | # of Feeders | % within a Region | Description |
|---|---|---|---|---|---|
| | R1-12.47-3 | 12.47 | 2,000 | 19% | Small urban center |
| | R1-12.47-4 | 12.47 | 1,800 | 17% | Heavy suburban |
| | R1-25.00-1 | 24.9 | 1,200 | 11% | Light rural |
| | GC-12.47-1 | 12.47 | 1,000 | 9% | Single large commercial or industrial |
| | Total | | 10,700 | | |
| Region 2 | R2-12.47-1 | 12.5 | 3,500 | 19% | Light urban |
| | R2-12.47-2 | 12.47 | 3,200 | 17% | Moderate suburban |
| | R2-12.47-3 | 12.47 | 3,000 | 16% | Light suburban |
| | R2-25.00-1 | 24.9 | 3,500 | 19% | Moderate urban |
| | R2-35.00-1 | 34.5 | 4,000 | 21% | Light rural |
| | GC-12.47-1 | 12.47 | 1,500 | 8% | Single large commercial or industrial |
| | Total | | 18,700 | | |
| Region 3 | R3-12.47-1 | 12.47 | 1,500 | 30% | Heavy urban |
| | R3-12.47-2 | 12.47 | 1,500 | 30% | Moderate urban |
| | R3-12.47-3 | 12.47 | 1,000 | 20% | Heavy suburban |
| | GC-12.47-1 | 12.47 | 1,000 | 20% | Single large commercial or industrial |
| | Total | | 5,000 | | |
| Region 4 | R4-12.47-1 | 13.8 | 1,400 | 33% | Heavy urban with rural spur |
| | R4-12.47-2 | 12.5 | 1,500 | 36% | Light suburban and moderate urban |
| | R4-25.00-1 | 24.9 | 1,250 | 30% | Light rural |
| | GC-12.47-1 | 12.47 | 750 | 2% | Single large commercial or industrial |
| | Total | | 4,900 | | |
| Region 5 | R5-12.47-1 | 13.8 | 400 | 9% | Heavy suburban and moderate urban |
| | R5-12.47-2 | 12.47 | 600 | 19% | Moderate suburban and heavy urban |
| | R5-12.47-3 | 13.8 | 650 | 14% | Moderate rural |
| | R5-12.47-4 | 12.47 | 500 | 11% | Moderate suburban and urban |
| | R5-12.47-5 | 12.47 | 450 | 10% | Moderate suburban and light urban |
| | R5-25.00-1 | 22.9 | 450 | 10% | Heavy suburban and moderate urban |
| | R5-35.00-1 | 34.5 | 500 | 11% | Moderate suburban and light urban |
| | GC-12.47-1 | 12.47 | 1,000 | 22% | Single large commercial or industrial |
| | Total | | 4,550 | | |
| TOTAL | | | 43,850 | | |

It is critically important to note that following a load-adding/load-shedding event, the future operation of air-conditioning cannot be controlled continuously. The resulting load-adding and load-shedding opportunities after participating in load increase and decrease events is discussed in Step 6.

Step 6) Lastly, as a separate activity, GridMPC evaluates the time-varying load-shaping capabilities of homes reacting to a day-ahead 5-minute electricity pricing forecast. A perfect forecast is assumed that is based on recent residential market-cleared prices from, for example, the ComEd Internet API. The ComEd Chicago market prices used in this simulation are illustrative only and are not representative of the rest of the United States. That said, just as per-city TMY data are available today, in the future it is expected that location-based forecast marginal pricing will also be available and will be a critical spatiotemporal input that is used to automatically shape residential load to provide ancillary services throughout the distribution and transmission grid.

5.4 Discussion and Results Analysis

This section presents results for load shaping opportunities in residences and in electrical distribution feeders. At the end of this section are results of feeder-level response in the context of MPC.

5.4.1 Single Residence Load Shaping Opportunities

Figure 10:
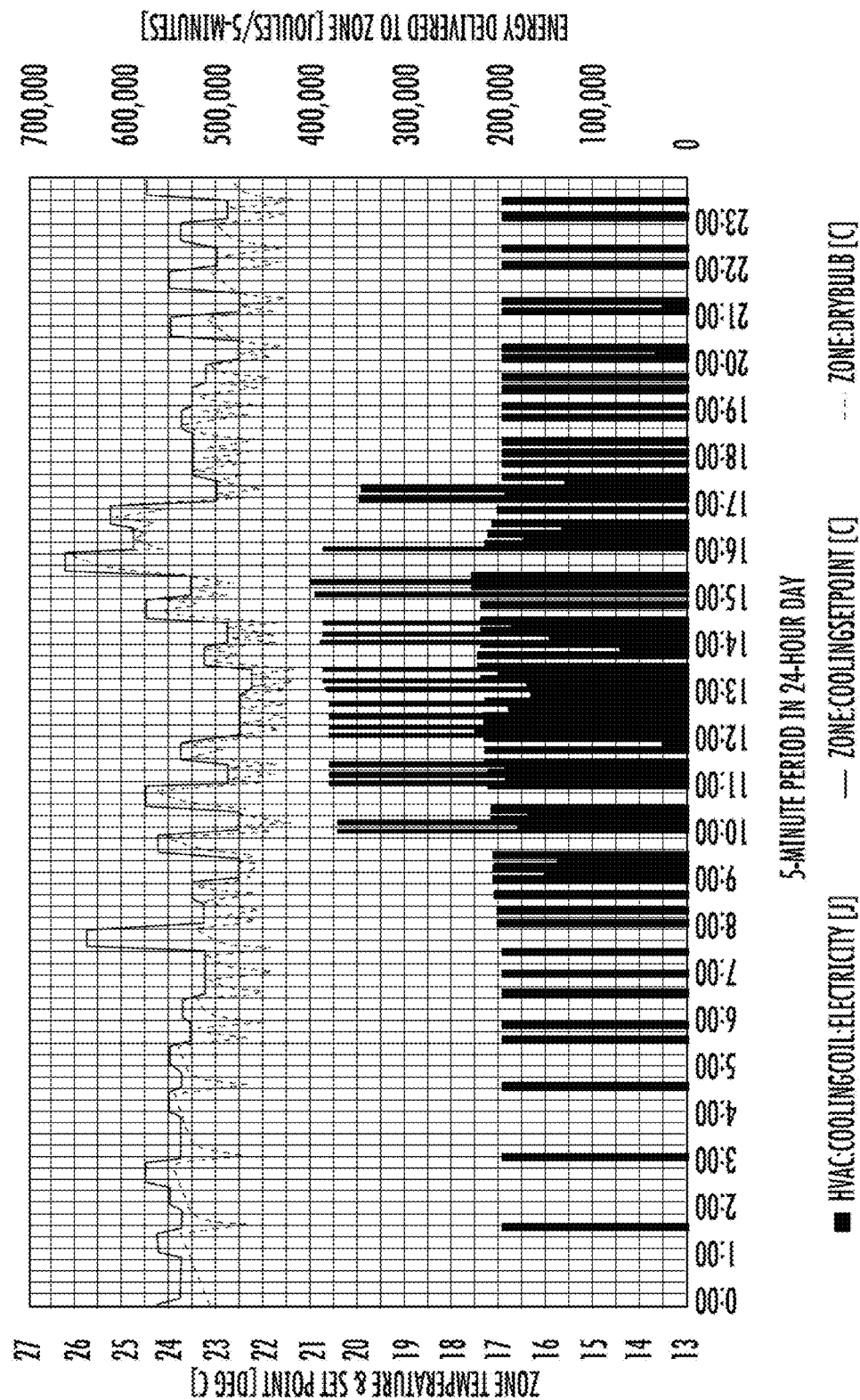
FIG. 10 is a plot of management of the optimization of an air conditioner.

An example of GridMPC load management optimization of residential central air-conditioning reveals adjustments to the cooling setpoint throughout July 20, as shown in FIG. 10. Note the smaller changes in setpoint when the home is occupied and the larger changes in setpoint during the middle of the day when the home is expected to be unoccupied.

GridMPC air-conditioning setpoint in gold (solid black line), zone temperature in blue (hashed line), and energy delivered (black bars) every 5 minutes on July 20, assuming a two-stage central air-conditioning system with a 10-minute minimum run time. Applying the temperature comfort constraint logic, we can obtain the instantaneous load-adding/load-shedding opportunities for the house every 5 minutes on July 20. It was found that because of comfort constraints, there are a few intervals when load cannot be added and many intervals when load cannot be shed.

5.4.2 Feeder-Level Load Shaping Opportunities

To calculate base case feeder-level instantaneous load opportunities, fixed setpoints are constant in time, and add/shed results are aggregated every 5 minutes across 2,146 homes on the Houston prototypical Feeder. Load-adding opportunities, with the top being the maximum possible instantaneous load, the base case whole-building load, and load-shedding opportunities, (with the minimum possible instantaneous load depicted by the top of the green area), where charted. After normalizing feeder-level results, the average percentage instantaneous load-adding/load-shedding opportunities as a function of whole-building electric load every 5-minutes on July 20 based on the same 2,146 homes on Houston Feeder was determined.

Thermal mass-enabled instantaneous feeder load-adding/shedding opportunities every 5-minutes on July 20, expressed as percentage, based on aggregated whole-building electric use was then tabulated. The results of combining feeder-level instantaneous load-adding/load-shedding opportunities on per city basis across the United States on July 20th was then observed. Distributional statistics Nationwide summary statistics appear at lower right were determined. The resulting heat map of thermal mass-enabled U.S. residential air-conditioning instantaneous percentage electric load-adding/load-shedding opportunities every 5 minutes on July 20th showed the increased add/shed opportunities because of increased air-conditioning loads in hot and humid southern climates, e.g., Houston, Tex., and Jacksonville, Fla.

The corresponding instantaneous load-shedding opportunities during the 5-minute interval at the top of each hour for all 24 hours of July 20 was mapped for the minimum and maximum scale of −53% to 0% for the entire United States for loads over each hour of a 24 hour period and areas of shed were noted. Corresponding load-adding opportunities during the 5-minute interval at the top of each hour for all 24 hours of July 20th were observed with reference to a minimum and maximum scale of 0% to 189% load-add.

A U.S. load-add contour map for all hours of July 20th was generated. It was found that the amount of add/shed opportunities over time is proportional to the duty cycle of air-conditioning systems. An air conditioner with a low duty cycle (in cooler hours) has a low opportunity to shed load and high opportunity to add load. Conversely, an air conditioner with a high duty cycle (in warmer hours) has a high opportunity to shed load and a low opportunity to add load. The magnitude of add/shed opportunities is proportional to the size of air conditioners. The larger air conditioners required in hot climates have larger compressors and circulation motors and hence provide increased add/shed magnitudes.

5.4.3 Feeder-Level MPC Control Response

The final step was evaluating the MPC load-shaping capabilities of 100% participating homes based on an assumed perfect forecast of day-ahead residential 5-minute pricing and a deterministic supply of power from three generators, each providing up to 3 MW of capacity at differing marginal costs. Simulation results of deviations were charted, depicting base case and optimized loads every 5 minutes on July 20 based on the same 2,146 homes on Houston Feeder. It was found that, in practice, price fluctuations and building responses would be based on the actual and forecast needs of the balance of system, not on Chicago market pricing. Further, any air-conditioning setpoint adjustment has time-lagged effects because the aggregate building responses are slower than the 5-minute price changes.

Figure 11:
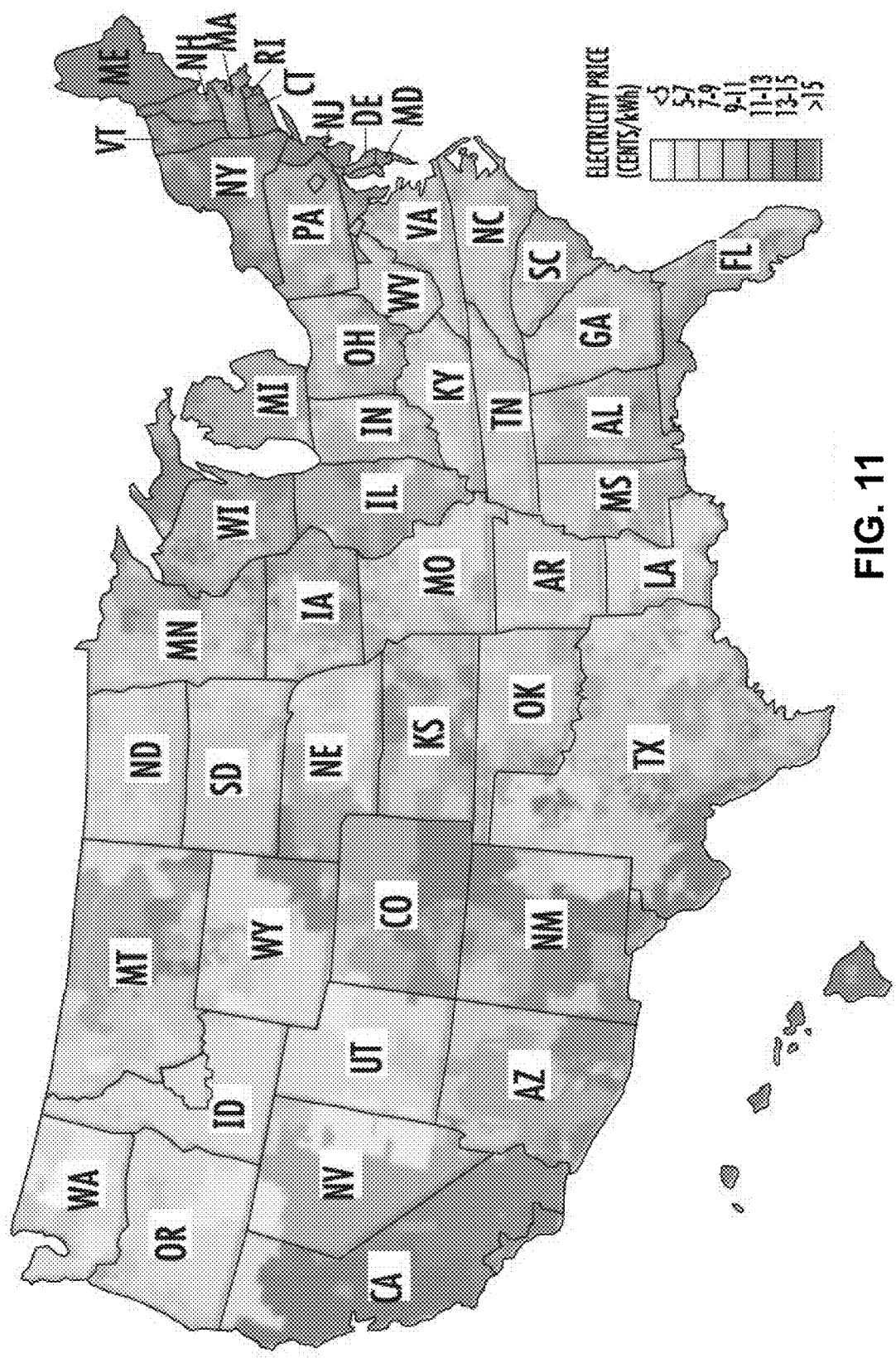
FIG. 11 is a map of the USA showing residential electric rates.

Then a single-day feeder-level response was modelled using the base case demand, MPC-based response to forecast price signal, and the midnight-to-midnight 5-minute forecast price signal. It was found that reductions in demand during high price periods. Depending on the needs of the grid, the oscillatory nature could be beneficial for providing grid ancillary services, but, more likely, might be detrimental for air conditioners that are cycled on and off too frequently. Pricing-based electricity is available from many electric utilities and forecast dynamic electricity prices are increasingly available via the Internet. Savings attributable to ARLS are dependent on differences in pricing which vary by utility for industrial, commercial, and residential customers. As shown in FIG. 11, residential electric rates vary by a multiple of 3 or more across the United States, highlighting the spatial nature and potential value of flexible residential building loads.

5.5 Conclusions

These experiments contribute to characterizing electric grid system benefits of MPC-based residential load shaping. The spatiotemporal potential is explored across the United States for residential buildings to shape electric demand at the distribution feeder level by adding or shedding load to minimize electricity production costs. Air-conditioning and appliance loads in more than 100,000 homes on 204 distribution feeders are calculated based on TMY weather data and a thermal house model that reflects geographic diversity in the building stock. A weighted average of feeders is used to express results in each of 35 cities. Depending on the city and 5-minute interval, thermal mass-enabled load-shedding opportunities up to 53% of load are possible, and load-adding opportunities up to 189% of load are possible. Instantaneous load-adding/load-shedding opportunities caused by air-conditioning are depicted as a function of geographical location and time of day. Also included is a 24-hour simulation of feeder response to a residential day-ahead perfect forecast 5-minute pricing signal in the context of distributed MPC of air-conditioning load.

5.6 Throughout the equations cited in this application, the following definitions shall apply:

In the building envelope expressed as a thermal model, for the glazing:
$T_i$ is the zone dry-bulb temperature,
$h_{gi}$ is the interior film coefficient,
$R_g$ is the glass thermal resistance,
$h_{go}$ is the outdoor film coefficient, and
$T_o$ is the outdoor dry-bulb temperature.

For the roof:
$h_{ri}$ is the interior film coefficient,
$T_{ri}$ is the interior roof dry-bulb temperature,
$C_{ri}$ is the interior roof thermal capacitance,
$R_r$ is the roof thermal resistance,
$T_{ro}$ is the outdoor roof dry-bulb temperature,
$C_{ro}$ is the outdoor roof thermal capacitance, and
$h_{ro}$ is the outdoor film coefficient.

For the walls:
$h_{wi}$ is the interior film coefficient,
$T_{wi}$ is the interior wall dry-bulb temperature,
$C_{wi}$ is the interior wall thermal capacitance,
$R_w$ is the wall thermal resistance,
$T_{wo}$ is the outdoor wall dry-bulb temperature,
$C_{wo}$ is the outdoor wall thermal capacitance, and
$h_{wo}$ is the outdoor film coefficient.

For the floor:
$h_{fi}$ is the interior film coefficient,
$T_{fi}$ is the interior floor dry-bulb temperature,
$C_{fi}$ is the interior floor thermal capacitance,
$R_f$ is the floor thermal resistance,
$T_{fo}$ is the outdoor floor dry-bulb temperature,
$C_{fo}$ is the outdoor floor thermal capacitance,
$R_s$ is the soil thermal resistance, and
$T_s$ is the deep soil temperature.

For the internal mass in the zone:
$h_i$ is the interior film coefficient,
$T_m$ is the mass dry-bulb temperature, and
$C_m$ is the mass thermal capacitance.

For the zone, $C_i$ is the thermal capacitance.

Chapter 6

Estimating Value of Jointly Optimized Electric Power Generation and Residential Electrical Use 6.1 Introduction This chapter is a culmination of research to estimate the value of jointly optimized electric power generation and residential electrical use. Discussed are efforts to transition from thermal generation to RES, the need for flexibility in electricity supply and demand, distributed storage options, and electricity production costs. The concept of an optimum load shape is developed along with a simulation framework for ARLS. Results are presented and discussed from a case study of Texas. Certainly, other cities, states or provinces, and countries are within the scope of the invention.

Recent geopolitical initiatives to reduce carbon emissions have encouraged research and development focused on clean and inexpensive energy sources. Initiatives have resulted in a series of policies and mandates designed to drive socio-economic trends to increase the penetration of renewable energy sources (RES) and raise the efficiency of existing generation. Despite these initiatives, greater than 75% of the world's electricity is still generated using thermal technology that is on average 35-40% efficient. Thermal power plants cost billions of dollars to operate on an annual basis. Furthermore, they are the largest consumers of fresh water on the planet and are among the largest producers of heat, creating nearly twice as much heat as they do electricity along with greenhouse gases that trap heat. The transition is not straight-forward and challenges exist in maintaining the security of electricity supply as electricity providers seek to provide the most effective mix of generators, which include the highest penetration of RES.

Electric load from the residential sector is forecast with ever-increasing accuracy but has not traditionally been considered as part of demand flexibility options. Residential loads are typically operated as needed without regard for the physical constraints in a given geographic area or the time-varying costs and CO2 emissions that result from generating electricity in thermal power plants. On the contrary, this research focuses on end-use loads including air-conditioning, domestic hot water (DHW) heating, and battery charging that are considered flexible due to the thermal and electrochemical storage ability of their inherent internal energy reservoirs. Through load modulation, thermostats and other controllers of end-uses achieve varying levels of energy storage and release, subject to the constraint that the systems they control remain sufficiently charged to maintain occupant comfort and meet expected needs. The results and findings herein extend to all consumer (demand) side loads, including commercial and business consumers of energy.

To determine the maximum theoretical benefit of load shaping, a daily optimum load shape 'flattens' the output of thermal generation over time in order to provide a best-case scenario for reducing variable generation costs. Ubiquitous internet connectivity would allow energy retailers to broadcast future optimum load shapes to allow distributed storage in end-uses and the operation of generation resources to be orchestrated in time by automatic residential load shaping (ARLS). In ARLS, optimum load shapes modulate residential loads in concert with lowest cost generation in order to jointly optimize supply and demand by minimizing the production cost of electricity. To explore the value of ARLS across generation and load, models account for the variable electricity production costs, emissions, and flow of electricity 600, as shown generally in FIG. 12.

Figure 12:
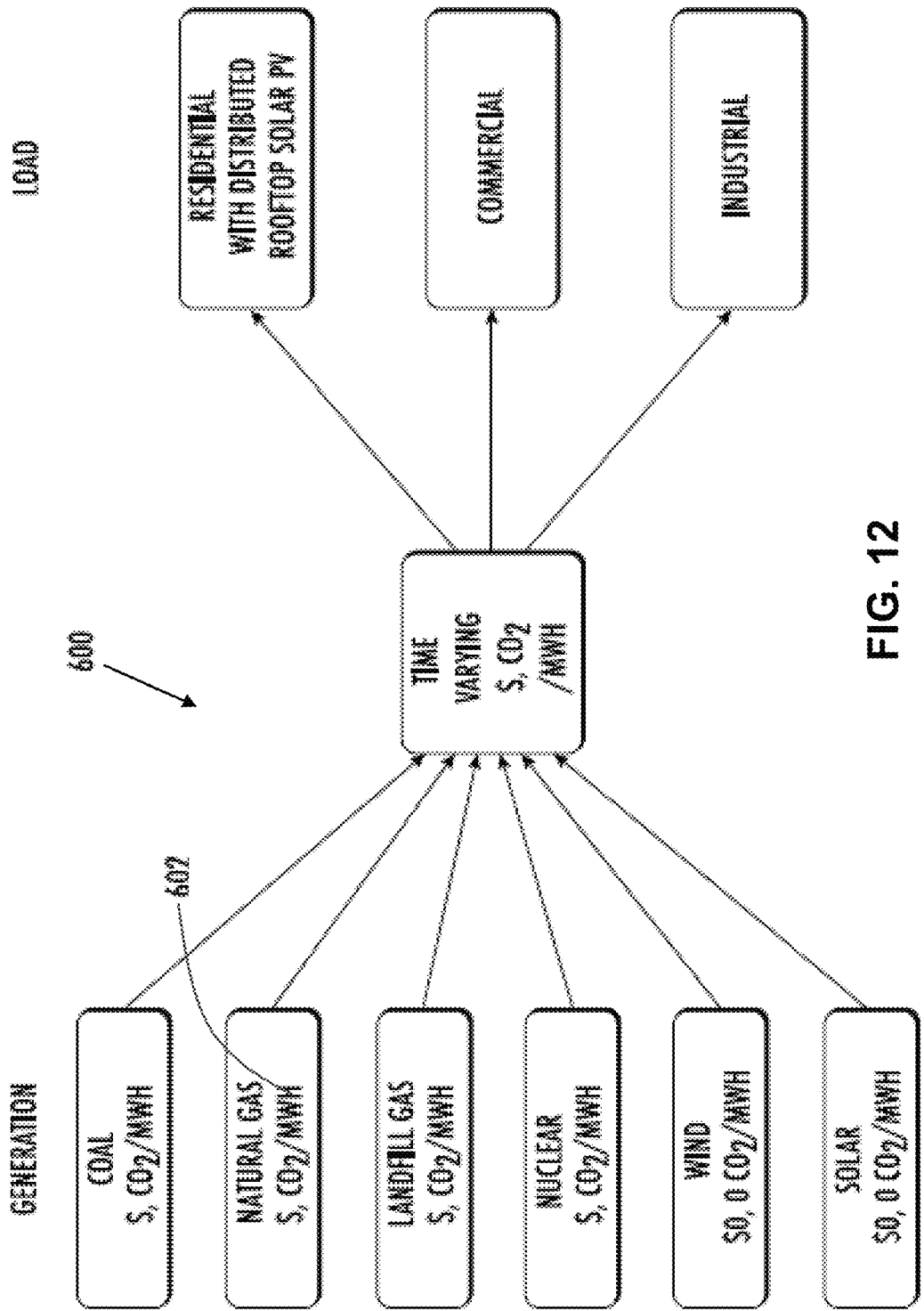
FIG. 12 is a model showing variable production costs, emissions and electricity flow per end user.

FIG. 12 shows variable production costs, emissions, and electricity flows. The notation $, CO2/MWh denotes variable generation costs 602 and carbon dioxide emissions per unit of energy. In addition to varying by generation mixtures, i.e., the mix of generators, the production costs of electricity also vary spatiotemporally (i.e., are impacted by weather), which simultaneously influences loads and, to a more significant extent, certain forms of RES generation. For example, during summer, higher wind speeds from a cold-weather front can simultaneously decrease the cooling load in homes and increase the output of wind power generation. At times electricity production cost can be relatively low, such as when wind and solar RES generate most of the required power. At other times, the production cost can be high, such as when marginal power is provided by expensive peaking generators that operate for only a few hours a day, or from thermal generators operating at a partial load with lower heat rate efficiencies.

In joint optimization of electricity supply and demand, one objective of ARLS was flattening the net load met by thermal generators in order raise the overall heat rate efficiency across the generation fleet and thus minimize variable production costs. Another objective of ARLS was reducing the curtailment of low-cost RES by modulating loads to match in-time the forecast availability of RES. The overarching goal of this work was to advance current trends to modernize generation of electricity by introducing ARLS which created load flexibility and elasticity thereby allowing for higher RES utilization, more efficient operation of existing thermal generation, and more effective management of distributed energy resources (DERs) including thermal and battery storage.

The simulation framework was designed to apply to any area in the world subject to the availability of the following inputs attributes of building stock, end-use operating schedules, prototypical feeders, generator constraints, fuel costs, and time-synchronous historical weather, load, and RES generation data. Once calibrated using historical data, many inputs to the simulation framework such as generation, load, weather, and RES penetration may be modified to support past- or future-based analysis. While necessary for optimizing the transmission and distribution portions of the electric grid, spatial variations in the production cost of electricity were not considered in this study though should be considered in future work. This simulation Framework takes a system of systems approach to solving the problem of jointly optimizing electricity supply and demand. The novelty of this work is the ability to provide estimates of the impact of ARLS on variable generation costs and CO2 emissions anywhere in the world using a relatively small set of input variables. Section 6.2 is an additional literature review of models for residential electric DHW heaters and battery storage, section 6.3 describes the methodology, section 6.44 discusses the results, and Section 6.5 presents conclusions and outlook.

6.2 Domain-Specific Literature Review

The author here considered a photovoltaic solar model, a reduced-order thermodynamic building model, and the MPC of residential air-conditioning. Further applicable models include residential electric DHW heaters and battery storage that were reviewed to inform adding degrees of control to GridMPC.

6.2.1 Electric Domestic Hot Water Heaters

Benchmarks and illustrative methods were considered that are effective and reliable in analyzing the energy use of modern appliances and houses. According to research, the energy savings for residential hot water systems depends significantly on detailed occupant DHW use patterns. Quantifying these patterns, as surrogate measures for occupancy and energy usage, is essential for analyzing tank and tankless water heaters, solar hot water systems with demand-side heat exchangers, distribution system improvements, and recirculation loops. A series of year-long hot water event schedules consistent with realistic probability distributions of the start time, duration and flow rate variability, clustering, fixture assignment, vacation periods, and seasonality, was analyzed.

Annual performance ratings for solar water heaters using TMY weather and a revised water draw criteria and model were reviewed. Bias stemming from lack of realism in the then-existing ratings draw included 1) low flow rates incorrectly boosted system performance with load-side heat exchangers; 2) low mains temperature incorrectly boosted performance for all solar water heaters, and 3) an invariant draw profile could not appropriately credit larger storage volumes versus smaller and did not portray realistic variations in the south to north geographies. A more-realistic ratings draw was proposed that eliminated most bias by improving mains inlet temperature and by specifying more realistic hot water use. Current and the proposed draws and estimated typical ratings changes from draw specification changes for typical systems in four cities was reviewed. The average change in the ratings from the proposed draw was approximately eight percent.

Two-node electric resistance water heater models are often used to create a balance between prediction accuracy and computation speed. Compared to a one-node model, a two-node model captures the stratification phenomenon in the tank, thus representing the outlet temperature more accurately. The following two-node electric domestic hot water heater model in equation 6.1 yields:

$$T_{wh}^{low}(t+1) = \frac{1}{C_{wh}^{low}} \left[ UA_{wh}^{low}\left(T_{air}^{in}(t) - T_{wh}^{low}(t)\right) + \right. \quad (6.1)$$

$$\left. \Delta m(t)C_p\left(T_{inlet}(t) - T_{wh}^{low}(t)\right) + \eta_{wh}^{low} P_{wh}^{nom,low} U_{wh}^{low}(t) \right]$$

$$T_{wh}^{up}(t+1) = \frac{1}{C_{wh}^{up}} \left[ \right. \quad (6.2)$$

$$\left. UA_{wh}^{up}\left(T_{air}^{in}(t) - T_{wh}^{up}(t)\right) + \Delta m(t)C_p\left(T_{wh}^1(t) - T_{wh}^{up}(t)\right) + \eta_{wh}^{up} P_{wh}^{nom,low} U_{wh}^{up}(t) \right]$$

$$T_{dwh}(t+1) = T_{wh}^{up}(t+1) \quad (6.3)$$

where superscripts low and up represent the lower node and upper node of the tank.

Equations 6.1 and 6.2 calculate the water temperature as a function of the input variables.

T iwh is the water temperature and U iwh is the control signal of tank node i in terms of duty cycle. T inair is the indoor air temperature, and Tinlet is the inlet water temperature. UAi is the product of the heat loss coefficient and surface area of node i, Δm is the flow rate of hot water draws, Cp is the heat capacity of water, C whi is the thermal capacitance of tank node i, and Pwh niom and niwh are the rated power and efficiency of the resistive element in node i, respectively. Equation 6.3 indicates the temperature at which the hot water is delivered by the top node of the water heater.

Their water heater model is subject to the following constraints:

$$T_{wh}^{min} \leq T_{wh}^{up} \leq T_{wh}^{max} \quad (6.4)$$

$$T_{wh}^{low} \leq T_{wh}^{up} \quad (6.5)$$

$$U_{wh}^{low} \leq U_{wh}^{up} \leq 1 \quad (6.6)$$

$$0 \leq U_{wg}^{low}, U_{wh}^{up} \leq 1 \quad (6.7)$$

where equation 6.4 dictates the constraints of the hot water temperature for safety reasons as the hot water exits the tank from the upper node. Equation 6.5 enforces the thermal stability in the tank such that the lower node should not be hotter than the upper node because of buoyancy. Equations 6.6 and 6.7 are the constraints of control signals U lowwh and U upwh which are continuous variables between 0 and 1 and can be interpreted as duty cycles.

Though heat-pump water heaters provide savings in heating hot water and are increasing in popularity, they were not included in the literature review or analysis. That said, heat pump water heaters would likely have a) less instantaneous load shed capability due to reduced load from a compressor being used most often for heating versus a heating element, and b) similar load add capabilities when energizing a heating element. The literature reflects a general agreement on a) the importance of DHW draw schedules as a proxy for energy use, and b) the use of two-node models to capture the operating characteristics of DHW heaters.

6.2.2 Distributed Battery Storage of Electrical Energy

This invention considers energy storage cost and explore dispatch optimization strategies to minimize costs associated with generator starts, generator fuel consumption, and battery erosion, based on a thorough economic analysis of present worth life-cycle cost. This invention considers the case when the net load is large enough and thus the Genset fuel efficiency is high enough that the cost of diesel generation per unit of energy produced is less than the cost of battery wear; in which there is defined a critical load, Ld, above which this applies and develop a "Frugal Discharge Strategy." The invention further takes into account metrics for comparing and sizing hybrid photovoltaic, wind, diesel, and battery generation in a stand-alone power system. A technoeconomic approach that combines two models, a reliability model developed beneath the total energy deficit concept and an economic model based on the calculation of total net present cost. The combination determines the optimum configuration in the most cost-effective manner. Optimization results showed that a combined photovoltaic, wind, diesel, and battery system is more economically viable compared to either a) a photovoltaic, wind, and battery system, or b) a diesel generator only. In a grid-tied battery system with dynamic pricing, added dimensions of buying and selling electricity at different prices at different times of the day helped make a case for local micro-controllers and new battery storage operating paradigms.

In pricing-based DR, it is concluded that large loads could provide nearly the same degree of flexibility for load-serving entities as does large-scale storage if adequately incentivized. However, and this is a significant caveat, there is more planning of lead-time required (i.e., it is much harder) to extract flexibility from loads than from (battery) storage. Battery state of charge (SOC), charging power, Pch bat, and discharging power, Pdis bat, are related as follows:

$$SOC(t+1) = SOC(t) + \frac{\eta_{bat}^{ch} \Delta t}{Q_{bat}} P_{bat}^{ch}(t) + \frac{\Delta t}{\eta_{bat}^{dis} Q_{bat}} P_{bat}^{dis}(t) \quad (6.8)$$

where Pch bat≥0, Pdis bat≤0, and ηcha bat, ηdis bat are the charging and discharging efficiency of the battery system, Δ(t) is the length of the prediction step, and Qbat is the capacity of the battery. The battery control variables are Uch bat=Pch bat=Pch,max batt and Udis bat=Pdis bat=Pdis,max bat(t) which represent the percentage of maximum charging power, Pch,max bat, and maximum discharging power, Pdis,max bat, respectively.

The battery system model in equatiopn 6.8 is subject to the following constraints:

$$SOC^{min} \leq SOC(t+1) \leq SOC^{max} \quad (6.9)$$

$$0 \leq U_{bat}^{ch}(t), U_{bat}^{dis}(t) \leq 1 \quad (6.10)$$

where equation 6.9 defines the operable SOC range for reducing battery degradation and equation 6.10 indicates the range of the normalized battery control variables. In addition to thermal energy storage in buildings and appliances, electrical energy storage in distributed fixed and mobile batteries is proliferating and introduces additional degrees of control for home energy management systems. Batteries are unique in their ability to provide a near instantaneous response in load add and shed and can be very flexible over short time frames. In conjunction with one-time optimum sizing of a battery system and related charging and discharging components, several factors that govern efficient charging and discharging of batteries must be continuously considered in order to provide optimum supervisory control.

The literature suggests that there are likely significant economic opportunities enabled by battery storage. This is especially so given recent trends away from net-metering where buying and selling costs are equal per unit of electricity, e.g., a kWh, toward feed-in tariffs, where selling cost is a fraction of buying cost. Lower feed-in tariffs give rise to the need for optimum control that "buys low and sells high".

6.3 Simulation Methodology

The ARLS simulation framework incorporates functionality for the model predictive control of buildings and the modeling of electrical distribution feeders. The building thermal model in, as incorporated into GridMPC, was suitable for use without modification. However, GridMPC required extensions to provide for additional degrees of control in order to optimize electrical energy use by DHW heaters and battery systems. The GridMPC DHW heater required complete replacement in order to allow for a) modeling thermal behavior, b) MPC-enabled setpoint changes, and c) usage schedules that reflect the empirical behavior observed in the Northwest Energy Efficiency Alliance, Residential Building Stock Analysis: Metering Study. The solar penetration assumptions from GridMPC required changes to reflect 50% and 100% of homes having annual net-zero solar generation. A new model was required for the MPC of battery charging and discharging.

6.3.1 Simulation Framework

The simulation framework utilizes a three-step process to estimate the impacts on costs and CO2 emissions attributable to jointly optimizing electric power generation and residential electrical use via MPC-based ARLS. In each step, a primary GAMS-based electricity production cost model (PCM) simulated the costs and emissions of the thermal generators that met the net load (the cost of the load without any management), and a second GAMS model determined the daily optimum net generation shape. In order to generate the optimum load shape, the RES was added to the daily optimum net generation shape. MPC cases included the model predictive control (MPC) of various storage-capable end uses and scenarios included increasing penetration of RES.

First, actual costs, emissions, and optimum load shapes were estimated based on the historical net load (total load less RES generation). Second, simulated costs, emissions and optimum load shape were estimated based on the simulated historical net load obtained by coupling local historical weather and residential building stock data with the calibrated thermodynamic residential building model. Results of the actual versus simulated historical load were compared to evaluate the skill of the simulation model. Third, costs and CO2 emissions were estimated based on the simulated MPC of the on/off setpoints of end-use loads in various RES scenarios. In the second and third steps, the framework aggregated the simulated load from individual buildings by feeder, city, and weather zone (also known as load zone). A high-level representation of the ARLS simulation framework proposed here is shown in FIG. 13.

Figure 13:
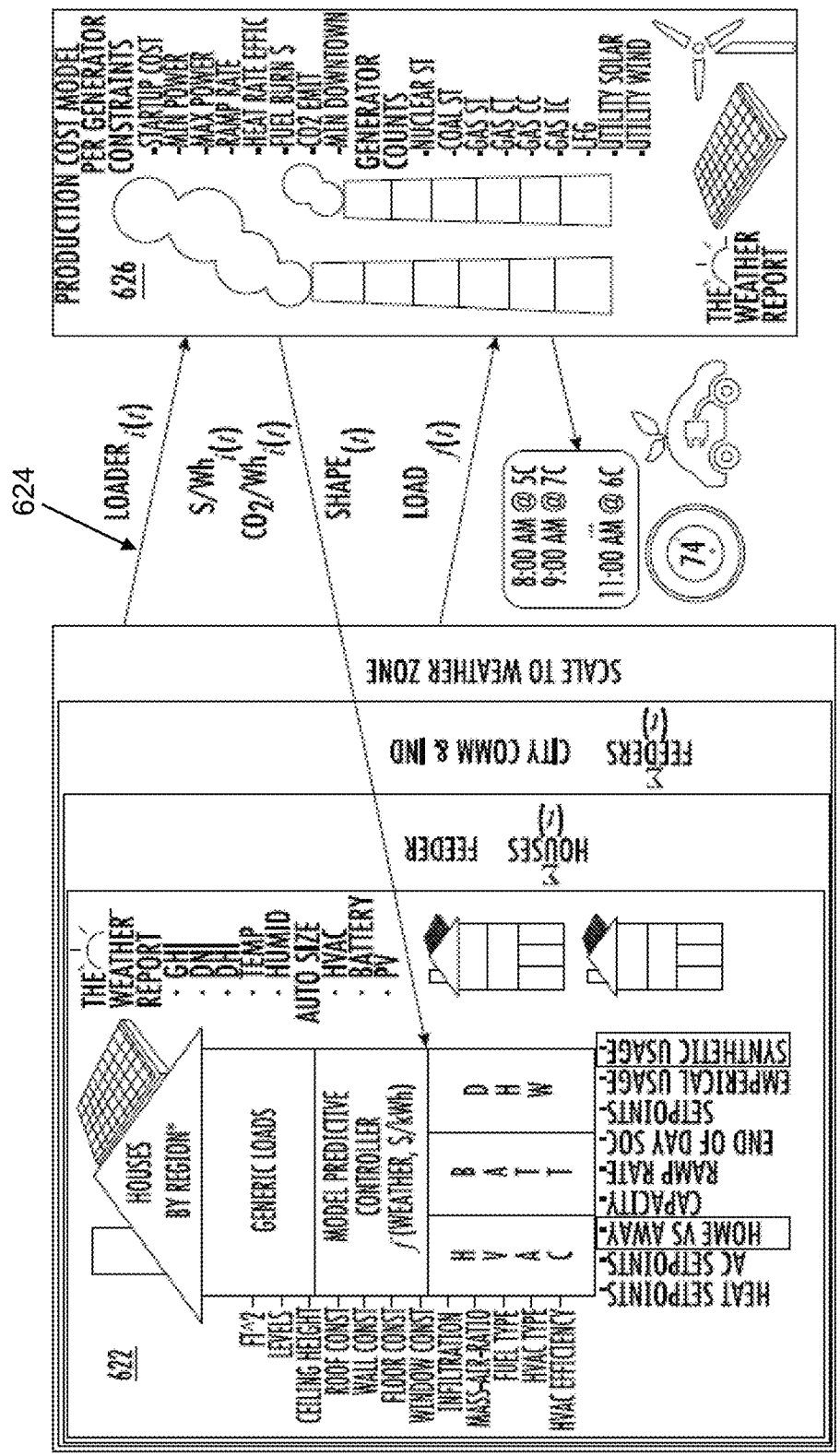
FIG. 13 is pictogram showing residential load shaping simulation of the present invention.

In FIG. 13 an Automatic Residential Load Shaping Apparatus 601 simulation framework 620 is depicted illustrating a consumer or demand side 622, a transmission network that includes transmission of information and control signaling 624, and a power generation or supply side 626. Load(i) denotes initial load. Load(f) denotes final optimized load. Weather parameters include global horizontal irradiance (GHI), diffuse horizontal irradiance (DHI), and direct normal irradiance (DNI). Generator types include steam turbines (ST), combustion turbines (CT), combined cycle systems (CC), internal combustion engines (IC), and landfill gas systems (LFG). Optimum load shapes are denoted by Shape(t). Variable production costs and CO2 emissions as a function of time are also shown.

Starting at the left of FIG. 13, the consumer or demand side 622 is shown generally as a residence, however, any consumer side facility is considered applicable to the present invention(s) herein. In actuality, consumers are fed power through feeders of various stages, depicted by bounded boxes around the consumer facility. These include, for example, a zone wide feeder that feeds power to a group of consumers, typically 2000 houses. Further upstream towards the supply side, there are typically city wide feeders that distribute power to larger areas such as cities and counties. The outer bounded box scales the load in terms of weather zones. In other words, an aspect disclosed herein is taking into account loads, not only per geographic or demographic region, but per weather patterns, thereby allowing loads to more accurately reflect weather patterns in order to provide a more optimum load shape that is stable and less changing over time. Part of what is shown in this figure is the concept that the load shaping is performed at the grid level. Notably, the load shaping may be applied at any level, zone, city/county or grid level, or at any level for that matter.

It should be noted that for purposes of evolving the present invention(s), regional parameters were selected for building stock. Next, auto-sizing based on local weather was performed for space heating, air-conditioning (HVAC), hot water heating, and solar PV systems. Load simulation was performed per feeder, aggregated to cities, and scaled to weather zones, but may be simulated at any level. Daily variable production costs and optimum load shapes were calculated and broadcast to MPC-enabled controllers in each home, which shaped loads to minimize cost based on forecast weather, occupant comfort constraints, and home/away schedules. Again, the optimum load shapes may be calculated in a similar manner at any granularity, residential or home zone, business facility or industrial zone, city, county, region, state, weather pattern area, etc., using the same inventive concepts laid out herein. In a specific example, PCMs performed a generation unit commitment optimization in each simulation to minimize the variable cost of generating electricity per day by choosing the lowest cost mix of generators each hour, subject to the generator operating characteristics and constraints in Table 6.1 below. Table 6.1 shows typical generator constraints used in production cost modeling. However, it shall be appreciated that generation unit commitment optimization(s) may be performed in one or more simulations.

TABLE 6.1

Typical generator constraints used in production cost modeling.

| Characteristic | Units | Description |
|---|---|---|
| Marginal heat rate | MMBTU/MWh | The fuel burned by each generator to produce electrical output. |
| Maximum generation capacity | MW | The maximum output of each generator. |
| Minimum generation capacity | MW | The minimum output of each generator. |
| Maximum upward and downward ramping | MW/hour | The maximum increase and decrease in the output of each generator in a single hour (note that thermal generators ramp slowly in comparison to gas turbines). |
| Variable operation and maintenance cost | $/MWh | The VO&M for each generator, which increases with output power |
| Startup cost | $/start | Related to the type of fuel and time required to start each generator, typically from a cold-start condition. |
| Fuel price | $/MMBTU | Specific to each fuel type. |
| Minimum downtime constraint | hours | The amount of time required to take each generator offline and back online again |

In the last step of the simulation framework, comparisons of load, costs, and emissions quantified the differences across all simulations. Of course, the comparison may be between any combination or permutation of simulations.

6.3.2 Electric Domestic Hot Water Heater Loads

While the above methodology provides solid data to base determining optimum loads, further improvements were performed. An evaluation was performed on the C++ based electric hot water heater physical model available in GridLAB-D and found it lacking in realism. As a result, an 'instantaneous' two-node physical model was created. The model ran on a 1-second timescale, was written in Python code, and implemented the on and off logic 630 shown in FIG. 14.

Figure 14:
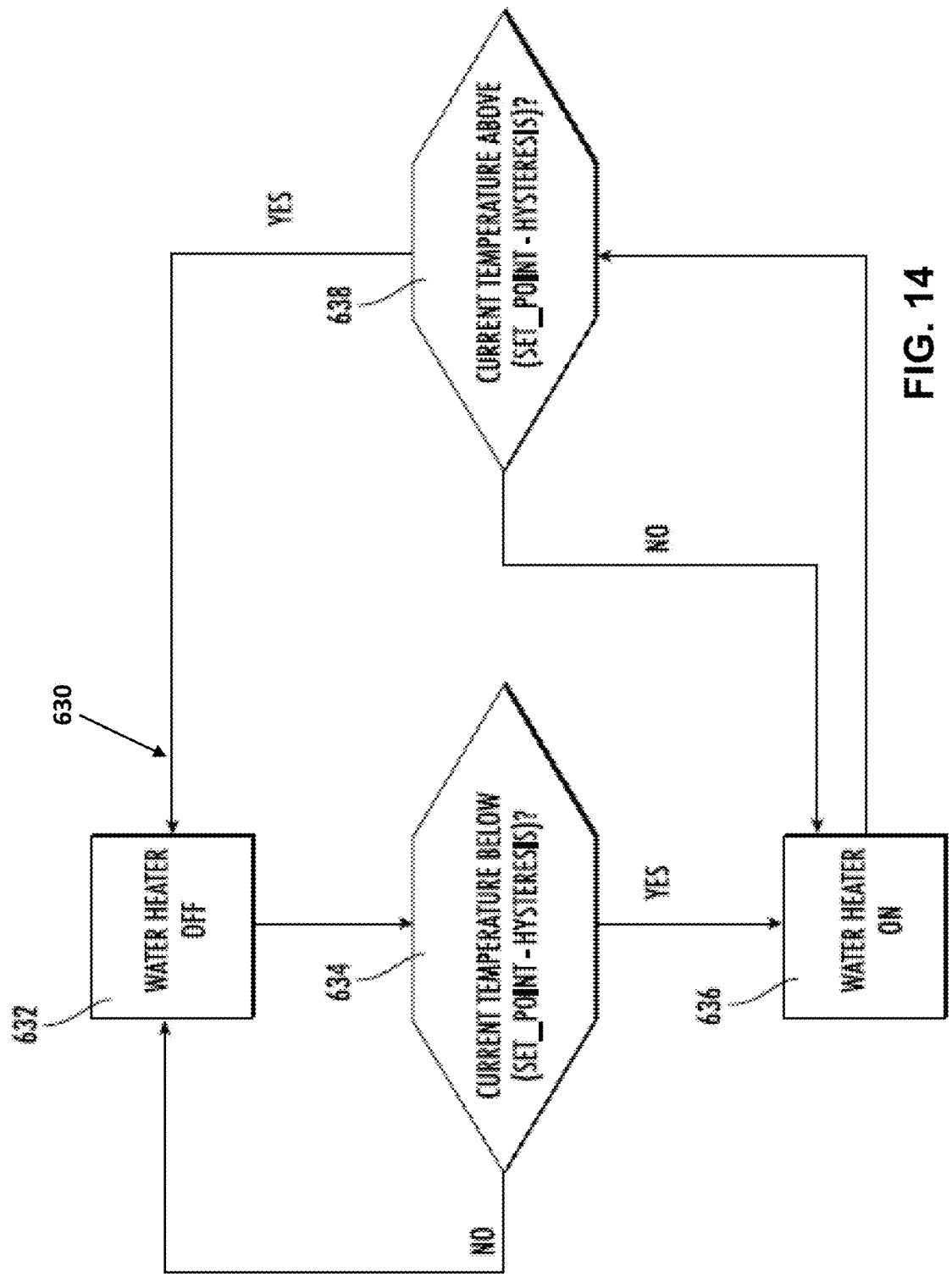
FIG. 14 is a state diagram of a hot water heater.

FIG. 14 shows a state diagram of instantaneous DHW Heater. The model 630 begins with in the state 632 with the water heater off. At state 634, the current temperature of the water heater is checked or determined whether it is below a set hysteresis point. If yes, then the water heater enters the ON state 636. If not, the model returns to the state 632. From the on state 636, it is checked or determined whether the current temperature is above the set hysteresis point 638. If the result is yes, then the state returns to the off state 632. If the answer is no then the water heater stay in the on state 636. The model was generated as code and was ported from Python to Java so that it could be incorporated into GridMPC. The Java version was verified against the original python version by setting the same initial conditions (tank volume and insulation characteristics) and runtime conditions (inlet water temperature, thermostat setpoint, dead band, and water draws) and then verifying the energy consumption and water outlet temperature over time.

A test was run to compare the results of simulation from the ported Java model to those of the Python model. Results of the two models were found to be in agreement, and the Java model was incorporated into GridMPC. In attempting to follow the daily optimum load shape, MPC adjusted the water temperature setpoints causing electric water heaters to store and release thermal energy over time.

6.3.3 Distributed Battery Storage of Electrical Energy

The battery model was designed from modelling a hydraulic reservoir where water height represents the SOC. In general, house loads discharge the battery and charge offsets loads; this is where the height of reservoir analogy applies, e.g., if the load (out) is greater than charge (in) then the battery discharges (water level drops).

At each time step, the GridMPC particle swarm optimizer (PSO) adjusted the power supply control vector, which contained setpoints for the upper state of charge and global lower bound. Battery discharge was equal to the sum of all house loads, including air-conditioning, DHW heating, and appliances. Multiple runs were completed with various PSO simulation settings to verify the desired operation in finding global versus local minima.

The battery was modeled with no standby losses (i.e., it maintained charge over time). State of charge was constrained to be equal to 50% at the beginning and end of every daily simulation which: a) ensured that batteries were ready to charge or discharge at the start of simulation based on Reference Demand, and b) simplified checksum calculations for the conservation of energy. The battery model assumed a combined 89% round trip charge and discharge efficiency (100% also used during testing), no standby losses, and a maximum hourly charging rate of 25% of battery size. The battery was sized at 13.5 kW, as commonly found in a Tesla Powerwall. In attempting to follow the daily optimum load shape, provided by the instant invention, MPC adjusted the state of charge setpoints causing batteries to charge and discharge over time to cause the battery to follow the optimum load shape.

6.3.4 Distributed Generation via Residential Solar Photovoltaic Collectors

The solar model was modified for 50% and 100% PV penetration of homes. Solar array sizing for each house was based on annual net-zero energy consumption. Each of the 14 unique feeders with 0% distributed solar photovoltaic (PV) penetration was replicated once to include 50% of houses with PV and then again to include 100% of houses with PV. In the 50% percent penetration case, every other house on a feeder was chosen to have PV. The houses with PV were then kept as a static set when performing simulations. Reactive power control was not considered in this research, but is within the scope of this model.

6.3.5 Key Performance Indicators

Metrics used to capture battery performance and the cost of control included: a) NS, the number of charge/discharge sign reversals during the simulation, e.g., NS=3 for sequential intervals of +; −; +; +; −; −, and b) AV, the sum over the simulation of the absolute value of changes in the state of charge, SOC, e.g., AV=abs(+5%)+abs(−2%)=7% over two intervals. Both battery metrics were designed to measure how 'hard' a battery works, NS to aggregate charge cycles and AV to aggregate the total amount of energy passing through the battery over time expressed as a percent of battery capacity. Note that NN may rapidly exceed 100%, which is expected behavior. Both metrics are important in forecasting battery life-cycle cost due to wear and tear from charging and discharging. Battery charge, discharge, and SOC were stored at each simulation interval to allow for post-processing of results, e.g., to support analysis of deep discharge behavior.

In addition, a new summary metric, Ls, was developed to track the amount and percent of load shaped. Ls is defined as the sum over the simulation intervals of the absolute values of the deltas between the shaped and unshaped load and has units of energy. As a percentage, Ls became a normalized value when divided by the sum of energy delivered in the unshaped case.

6.3.6 Texas Case Study

The simulation framework was applied to a case study of the serving area of the Electric Reliability Council of Texas (ERCOT). ERCOT was chosen as time-synchronous load and RES data are available, generator sizing and constraints are available, and for its significant electric load, equaling approximately 10% of U.S. electricity consumption on an annual basis. The area simulated represented over 24 million residential, commercial, and industrial electricity customers across 200,000 square miles as depicted by the eight colored ERCOT weather zones ERCOT within PNNL climate regions 3, 4, and 5 shown in FIG. 15.

Figure 15:
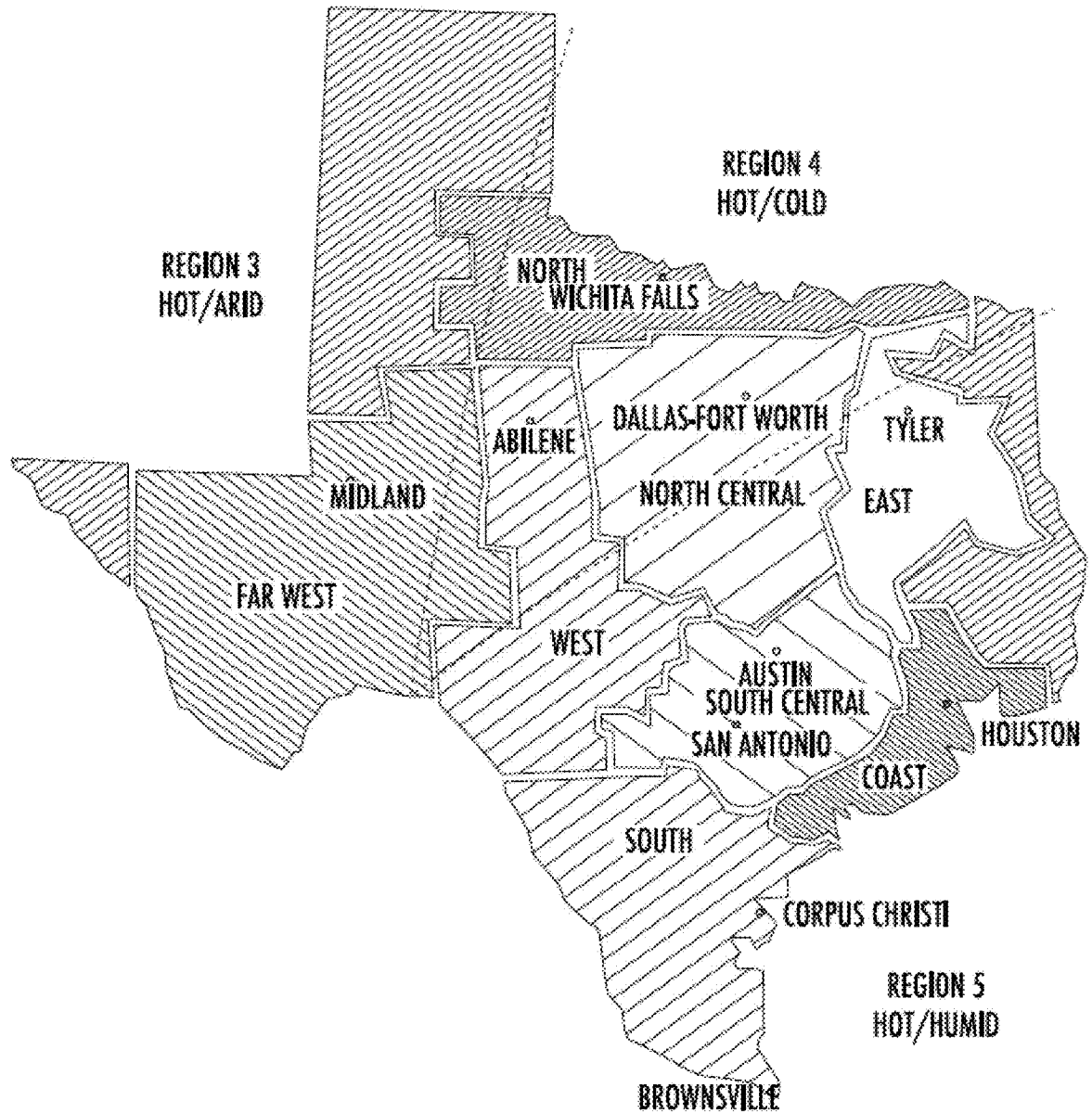
FIG. 15 is a map of Texas showing different environmental regions.

FIG. 15 shows ERCOT operating area with eight weather zones (aka load zones) denoted by colors (different shades) and three PNNL Grid Taxonomy climate regions separated by dashed lines as shown. The case consisted of 1) unshaped and optimally shaped cases for actual and simulated ERCOT load, 2) seven combinations for the model predictive control (MPC) of residential air conditioners, electric DHW heaters, and battery charging systems, and 3) three scenarios of increasing RES penetration. In addition, the study included the operating characteristics and constraints of 263 utility-scale thermal generators that closely represent the ERCOT generation fleet, an excerpt of which is listed in Table 6.1. Note that generators were, for the most part, individual line items, though in some cases were grouped into a single-line meta generator, e.g., utility wind and solar generators were grouped by technology. It shall be appreciated that the OLS methodology of the present invention may be applied per geographic region, environmental region, or weather zones, and the like.

Table 6.2 shows sample ERCOT generator characteristics and constraints. Prime movers include Combined Cycle systems (CC), Gas Turbines (GT), Landfill Gas systems (LFG), Steam Turbines (ST), Wind Turbines (WT) and Photovoltaic (PV) generators. Not shown but also included in the ERCOT generation fleet are: Internal Combustion engines (IC) and Combustion Turbines (CT).

generation cost and thus was considered the daily optimum net generation shape. As a final step in Case 2, the hourly-based PCM was re-run using the flat daily optimum net generation shape and returned the variable generation costs and emissions.

Estimated production cost and $CO_2$ emissions based on simulated ERCOT electricity use will now be discussed. For Case 3, Simulated Base Case net load, the thermodynamic model of residential buildings, provided a 5-minute time-series estimate for each of the 8 ERCOT weather zones and for ERCOT in total. Individual cities in each of the 8 ERCOT weather zones referenced the local airport time-

TABLE 6.2

| Unit | County | Fuel | Prime Mover | Capacity (MW) | Marginal HR (MMBtu/MWh) | Base Heat Rate (MMBTU) | Co2Ems (lb/MMBtu) |
| --- | --- | --- | --- | --- | --- | --- | --- |
| BRAUNIG_AVR1_CT1 | bexar | GAS | CC | 533.0 | 9.3 | 154.5 | 117.0 |
| ATKINS_ATKINSG7 | brazos | GAS | GT | 18.0 | 12.8 | 0.0 | 117.0 |
| DG_WALZE_4UNITS | bexar | LFG | LFG | 9.8 | 13.8 | 0.0 | 117.0 |
| CALHOUN_UNIT1 | calhoun | GAS | ST | 44.0 | 12.3 | 102.7 | 117.0 |
| COLETO_COLETOG1 | goliad | COAL | ST | 655.0 | 10.4 | 1284.1 | 214.3 |
| CPSES_UNIT1 | somervell | NUCLEAR | ST | 1205.0 | 10.5 | 0.0 | 0.0 |
| WT-ercot1 | kinney | WIND | WT | 20280.8 | 0.1 | 0.0 | 0.0 |
| PV-ercot1 | presidio | SOLAR | PV | 1003.8 | 0.0 | 0.0 | 0.0 |

| | VOM ($/MWh) | MiniLoad (MW) | StartCost ($) | MinDownTime (hrs) | RampRate (MW/hr) | FuelPrice ($/MMBtu) |
| --- | --- | --- | --- | --- | --- | --- |
| BRAUNIG_AVR1_CT1 | 3.7 | 213.2 | 49690.0 | 4 | 169.5 | 3.3 |
| ATKINS_ATKINSG7 | 15.7 | 7.2 | 419.5 | 1 | 6.2 | 3.3 |
| DG_WALZE_4UNITS | 8.9 | 3.9 | 456.8 | 4 | 3.4 | 0.0 |
| CALHOUN_UNIT1 | 4.5 | 17.6 | 4102.0 | 7 | 10.2 | 3.3 |
| COLETO_COLETOG1 | 4.5 | 327.5 | 61063.7 | 12 | 117.2 | 2.2 |
| CPSES_UNIT1 | 2.2 | 1084.5 | 561693.2 | 20 | 96.4 | 0.7 |
| WT-ercot1 | 0.0 | 0.0 | 0.0 | 0 | 20200.8 | 0.0 |
| PV-ercot1 | 0.0 | 0.0 | 0.0 | 0 | 1003.8 | 0.0 |

Estimated production cost and emissions based on actual ERCOT electricity use will now be discussed. For Case 1, Actual net load, production costs, and emissions were estimated for the 2005 hourly load reported by ERCOT less the time-synchronous production of electricity from all utility scale wind and solar generators. The net load was met by thermal generation. The hourly GAMS (generic algebraic modeling system) PCM (production cross model) took as inputs the net load along with the generator characteristics and constraints. The PCM simulated the time-varying unit costs, marginal costs, and CO2 emissions based on a constraint of fossil-based thermal generation equaling net load for each hour. Consistent with best practices, the simulated variable production costs were compared to the actual production costs for the same period to check for general agreement.

For Case 2, a significant assumption was made to support the calculation of a) the minimum theoretical variable generation cost based on the daily optimum thermal generation shape, and b) the daily optimum load shape. The assumption was that all load could be shaped with negligible 2 The 745 MW of Texas utility-scale hydroelectric generators was considered small enough to exclude from the analysis, losses and penalties. While unrealistic due to the efficiency losses of thermal and electrical storage, this assumption allowed the daily-based GAMS PCM to relax the constraint of thermal generation equaling net load for every hour to thermal generation equaling net load for an entire day. This always resulted in a constant output 'flat' thermal generation shape with no generator starts, stops, or generator ramping. The flat thermal generation shape had the lowest variable synchronous weather denoted by the shorted form of the International Civil Aviation Organization airport identifier (e.g., Houston denoted by HOU). For weather details, see the 2005 annual files of hourly observations across Texas. Per the PNNL grid taxonomy, between four and eight of the 14 feeders unique to ERCOT appeared in each city resulting in a total of 48 'city' feeders, as shown in Table 2, where the letter R denotes residential feeders and the letters GC denote generalized commercial feeders.

Table 6.3 shows ERCOT PNNL feeders by Weather Zone, city, and airport.

TABLE 6.3

ERCOT PNNL feeders by Weather Zone, city, and airport.

| Weather Zone | City | Airport Weather | Feeders |
| --- | --- | --- | --- |
| West | Abilene | ABI | 4 |
| | R4-12.47-1/2, R4-25.00-1, GC-12.47-1 | | |
| N. Central | Dallas | RBD | 4 |
| | R4-12.47-1/2, R4-25.00-1, GC-12.47-1 | | |
| Coast | Houston | HOU | 8 |
| | R5-12.47-1/2/3/4/5, R5-25.00-1, R5-35.00-1, GC-12.47-1 | | |
| Southern | Laredo | LRD | 8 |
| | R5-12.47-1/2/3/4/5, R5-25.00-1, R5-35.00-1, GC-12.47-1 | | |
| North | Lubbock | LBB | 4 |
| | R3-12.47-1/2/3, GC-12.47-1 | | |

TABLE 6.3-continued

ERCOT PNNL feeders by Weather Zone, city, and airport.

| Weather Zone | City | Airport Weather | Feeders |
|---|---|---|---|
| Far West | Midland | MAF | 4 |
| | R3-12.47-1/2/3, GC-12.47-1 | | |
| South | San Antonio | SAT | 8 |
| | R5-12.47-1/2/3/4/5, R5-25.00-1, R5-35.00-1, GC-12.47-1 | | |
| East | Tyler | TYR | 8 |
| | R5-12.47-1/2/3/4/5, R5-25.00-1, R5-35.00-1, GC-12.47-1 | | |

The PNNL GridLAB-D MATLAB scripts populated the simulation files for each unique feeder by selecting house attributes from the Energy Information Agency, Residential Energy Consumption Survey (RECS). GridMPC then used historical weather and the reduced-order thermal building model to simulate hourly thermal and electrical load in homes. GridMPC simplifies each home in GridLAB-D into an equivalent ZIP load model so that the homes within the feeder could be simulated simply as an electric demand calculated outside of GridLAB-D. This is accomplished by first writing the electric demand of each home at each time step of the simulation into a separate file, then linking these files to the power flow simulation using the GridLAB-D ZIPload and player objects. The new model that results, which combines the loads calculated by GridMPC with the GridLAB-D feeder model, is termed the hybrid model and produces GridLAB-D output files for each feeder.

Simulations of each of the feeders, including a complete set of miscellaneous loads and appliances were performed per house and then summed to produce the aggregate loads per feeder without MPC control. This was referred to as the Base Case simulation and included the loads of electric and natural gas water heaters, refrigerators, ranges, computers, televisions, cable boxes, and lighting. The distributional statistics such as sum and standard deviation of the per house 5-min energy consumption and zone temperatures were calculated per day and then aggregated across the simulation of all 46,384 houses. Referencing the percent proportion of each feeder type within a region described, the feeder loads were summed proportionally to simulate the per day 5-minute city loads.

Figure 6:
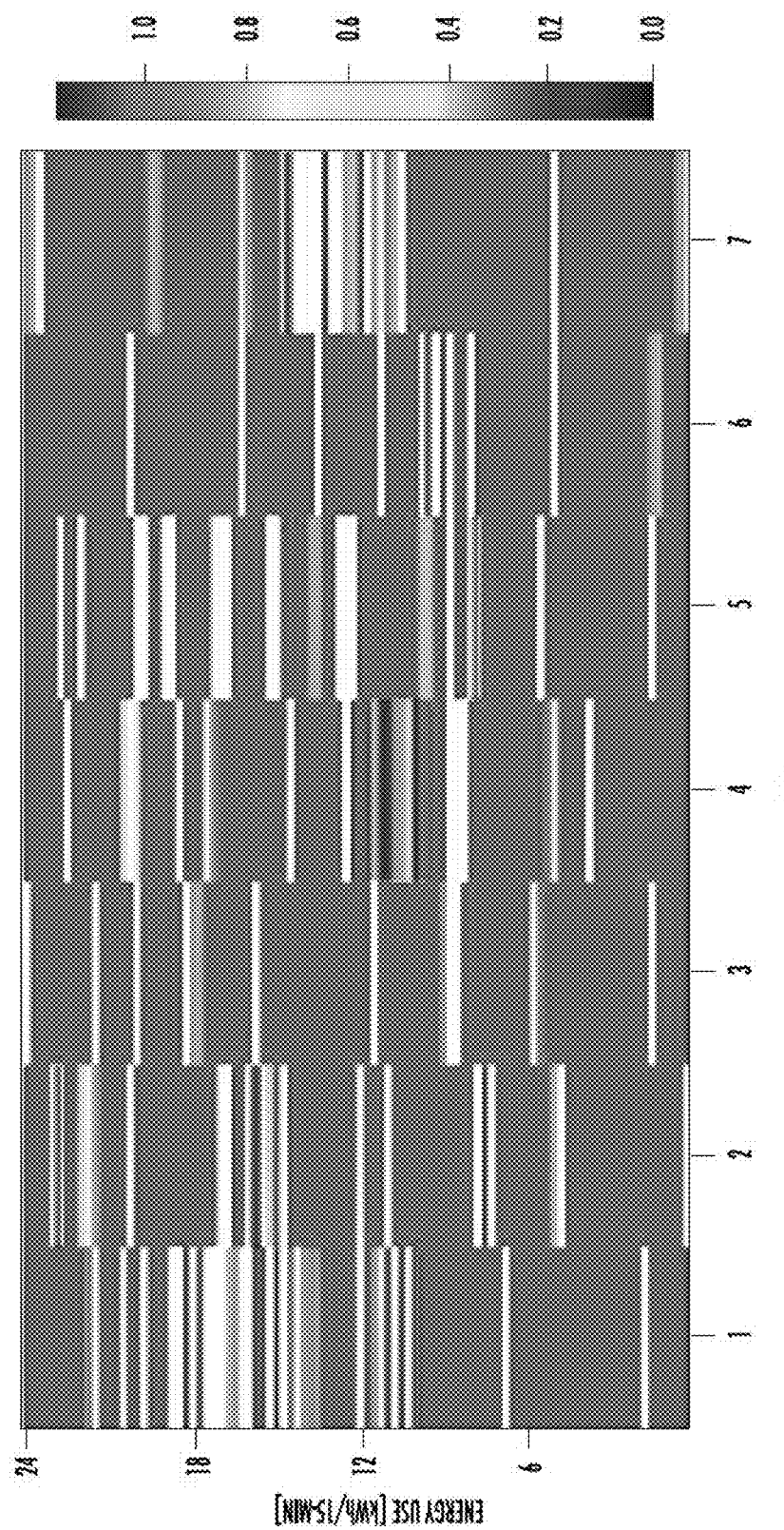
FIG. 6 is a heat map illustrative of energy usage of different appliances.

In order to scale city loads up to create aggregate weather zone loads, the daily sum of the historical actual hourly weather zone load was divided by the daily sum of 5-minute city load in order to arrive at a city-to-zone scaling factor. City-to-zone scaling factors were calculated for all eight weather zones and used as a multiplier of 5-minute city loads in order to arrive at aggregate calibrated 5-minute weather zone loads. The sum of loads used in calibration produced a zero bias (i.e., there was no residual in the energy balance); alternatively, calibration via non-linear minimization could be used to minimize the variance between the actual and simulated loads using a Newton-type algorithm with a non-zero bias. Lastly, the aggregate 5-minute load per weather zone was summed across all weather zones to create an unshaped Base Case (BC) aggregate 5-minute ERCOT load. FIG. 6.5 depicts the flow of power to weather zones, cities, feeders and houses.

Figure 16:
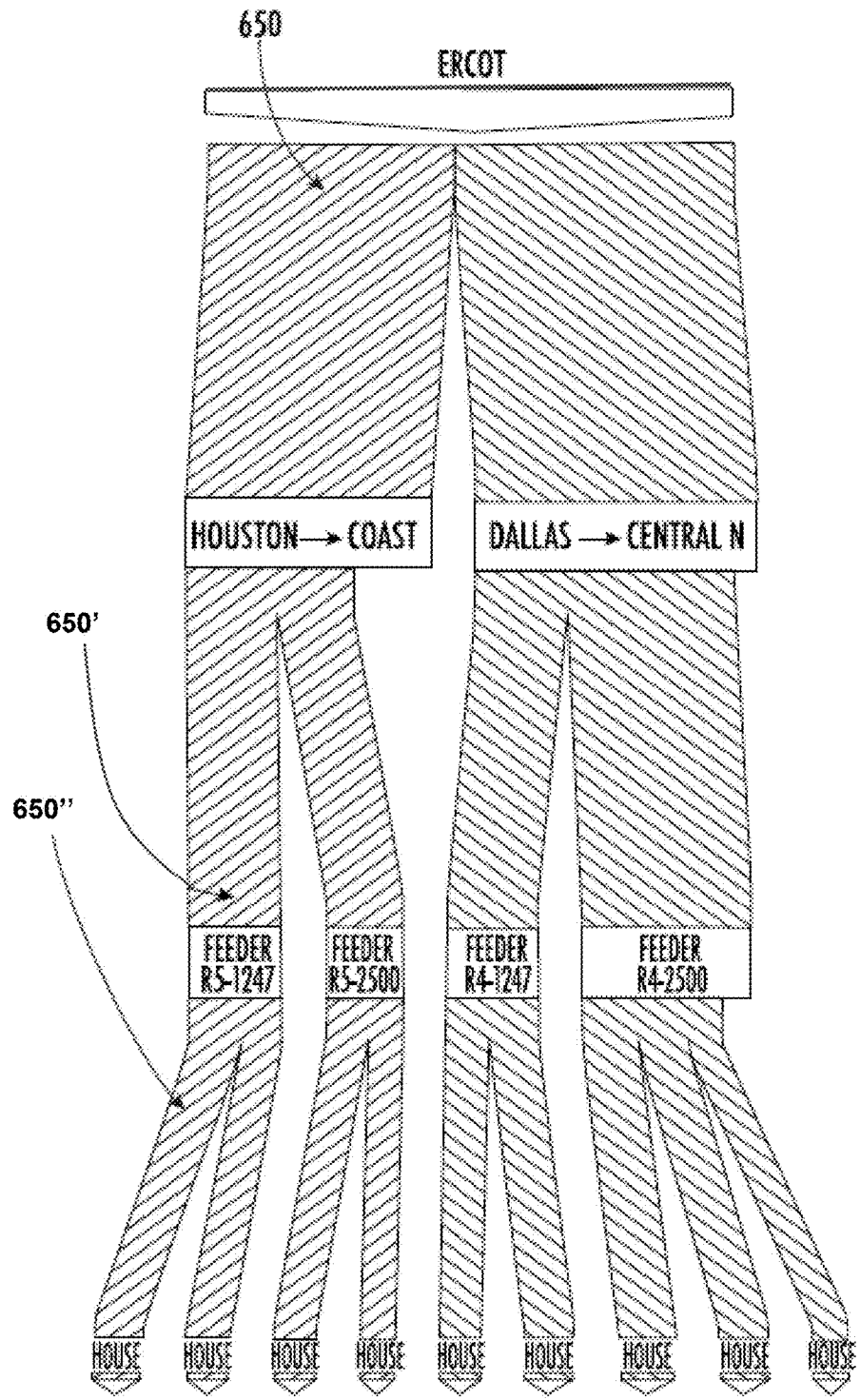
FIG. 16 is a flow diagram of the electric power according to different weather zones.

FIG. 16 shows the flow 650, 650', 650" of electric power to weather zones, cities (in this case Houston and Dallas), feeders, and houses. The varying line width illustrates the sizes of flows. Reading from the bottom to the top depicts aggregation. The plus symbols denote tens of thousands of flows removed for clarity of chart.

As a final step in Case 3, the hourly-based PCM returned the variable generation costs and emissions for meeting the aggregated (unshaped) net load across ERCOT. Case 4, followed the same procedure as Case 2, in this case, applied to the simulated load of Case 3. Cases 5-8 are the daily excerpts from Cases 1-4 respectively.

6.3.6.3 Estimated Production Cost and Emissions Based on Simulated MPC-Based Load Shaping For Cases 9 through 15 of simulated shaped net loads, ARLS extended the MPC-based load shaping and air-conditioning models to include control of electrical charging of batteries and thermal charging of electric DHW heaters. Using ARLS, a set of cases and scenarios assessed the cost and $CO_2$ impact of different combinations of controlled end uses, e.g., air-conditioning only, air-conditioning plus battery charging, air-conditioning plus battery charging plus electric water heating.

Cases implemented the following steps: 1) MPC shaped electric load by optimizing the above end-uses based on forecast weather, predetermined presence of occupants assumed to be away from home from 8 AM to 6 PM, bounded temperature setpoints, and target load shape deltas derived from daily optimum load shapes, 2) Loads were aggregated across Texas using feeder-to-weather zone scaling, and the residential load was estimated to be 33% of total load with the remaining load assigned to commercial and industrial loads, 3) In three scenarios of RES penetration (A) low, (B) medium, and (C) high, the variable production costs and $CO_2$ emissions from generators operating to meet the MPC-managed load were summarized.

6.3.6.4 MPC Scenarios

The MPC of air-conditioning followed a method with an auto-sized cooling capacity based on the maximum cooling day for the year and a 10-minute minimum on-time for single-stage air-conditioning. In attempting to follow the daily optimum load shape, MPC adjusted the cooling setpoints causing houses to store and release thermal energy over time. In Cases 9-15, MPC attempted to meet the daily optimum load shape, and the resulting shaped load was input to the hourly PCM, which returned costs and emissions for each ERCOT simulation scenario. For additional degrees of MPC control, particle swarm parameters were adjusted based on results of experiments to determine the appropriate parameters. The MPC control intervals were increased from 30-minutes to 1-hour to limit the oscillatory behavior of loads and to reduce computer processing time.

6.3.6.5 PSO Optimization Parameters

The GridMPC air-conditioning model used an increment of 0.25 [K] and a maximum particle velocity of 0.25 [K]. To reflect allowable temperature ranges during home and away occupant hours, GridMPC was allowed to explore a range of thermostat settings including 2 [K] below the setpoint while the occupants were home, and from 5 [K] below to 3 [K] above the setpoint while the occupants were away.

The PSO parameters were set such that there were 24 dimensions, 1 per hour, for every controlled device, resulting in a total of 72 dimensions for the AC+BAT+WH case. The resolution of the PSO was set to 0.25 [K] for the air-conditioning and DHW heater models and to 1% of capacity for the battery model. The maximum particle velocities were chosen by graphing the swarm behavior for individual houses and inspecting graphs manually, then choosing velocities which had a decent spread within 5000 iterations. The maximum velocities for the AC, Battery, and Water Heater were 0.25, 2, and 24, respectively.

The Water Heater model had a range of −10 to +10 [K]. Given an increment of 0.25 [K], the max velocity of the particles were 4 increments equal to 4/80 or 5% of the total search space for each dimension. The Battery model had a range of −50% to +50% from an initial 50% state of charge, with each value representing one percentage point of battery capacity. Given the increment of 1%, the max velocities of the particles were 24 increments equal to 24/100 of the total search space for the first 20 dimensions. Dimensions 20-24 had their lower and upper bounds decreased by 12.5% each so that batteries would converge to 50% charge by the end of the day.

eration cost. The difference between the net load with and without the application of the optimal load shape determines the upper bounds of possible reductions in variable costs and $CO_2$ emissions. Table 6.4 shows a full year range of variable generation costs and $CO_2$ emissions for actual net load, simulated net load, and scenarios of increasing RES penetration. Entries for utility-scale wind and solar denote penetration based on annual production, e.g., uWind22 denotes utility wind providing 22% of the annual energy. Entries for distributed solar, e.g., dSolar50, denote the percent of houses with PV.

TABLE 6.4

| Scenarios → | A. Low RES penetration uWind22, uSolar1, dSolar0 | | | B. Medium RES penetration uWind30, uSolar3, dSolar50 | | | C. High RES penetration uWind38, uSolar5, dSolar100 | | |
|---|---|---|---|---|---|---|---|---|---|
| ↓ Cases Full year | Cost $ [B] | Cost $/MWh | $CO_2$ lb [B] | Cost $ [B] | Cost $/MWh | $CO_2$ lb [B] | Cost $ [B] | Cost $/MWh | $CO_2$ lb [B] |
| 1 Actual net load observed in Texas | 5.36 | 17.96 | 252 | 3.75 | 12.58 | 146 | 3.22 | 10.77 | 94.7 |
| 2 . . . daily optimum shape | 5.31 | 17.80 | 257 | 3.23 | 10.83 | 148 | 1.92 | 6.44 | 77.9 |
| 3 Simulated BC net load | 5.35 | 17.92 | 253 | 3.49 | 11.70 | 138 | 2.92 | 9.79 | 84.0 |
| 4 . . . daily optimum shape | 5.30 | 17.76 | 263 | 3.14 | 10.53 | 141 | 1.70 | 5.70 | 65.0 |

Notes to Table 6.4:
1. Curtailment of uWind and uSolar is required during some hours in Scenario B and many more hours in Scenario C in order to prevent over generation.

6.4 Results

In simulations of generation and load across the ERCOT serving area, cost and $CO_2$ emission estimates for actual, simulated, and MPC-managed loads quantified the impact of various penetrations of utility wind, utility solar and distributed solar photovoltaic generation. Region-specific building envelopes, physics-based thermodynamic house models, and location-specific weather were used to forecast the day-ahead 5-minute time-series load per house, distribution feeder, city, and the ERCOT serving area. The forecasted load, RES generation, and thermal generator properties and constraints were combined to estimate electricity production costs and emissions based on the optimized daily unit-commitment of the generation mix. Using the daily optimum load shape as a control signal, MPC enabled optimal supervisory control of thermal and electrical energy storage in each house. Comparing the daily electric power production costs and emissions that resulted from varying the number and type of storage degrees of freedom controlled by MPC, yielded a range of costs and $CO_2$ emissions.

6.4.1 Cost and Emissions Overview

Table 6.4 summarizes annual costs and $CO_2$ emissions for the ERCOT serving area. Rows depict different cases, and columns are grouped into three scenarios of (A) low, (B) medium, and (C) high penetrations of RES. Cases 1-4 summarize actual and simulated performance for 2005. In each group, the daily optimal load shape is applied to the actual and simulated load to flatten net generation in order to determine the theoretically lowest possible variable gen- Table 6.4, Scenario A, Cases 1 and 3 have good agreement between the annual cost of providing electricity Texas-wide, which was approximately $5.3B. Results from all Scenarios indicate a reduction in costs in Cases 2 and 4 when the optimum load shape was applied. Scenario A savings were 1%, Scenario B savings were approximately 10%, and Scenario C savings were approximately 40%. Scenario B and C savings are particularly important as they reflect the additional annual savings expected from the deployment of ARLS. Savings in Scenarios B and C are attributable to ARLS shaping and modulating load to better match in time the available RES, which results in decreased curtailment of RES.

With respect to $CO_2$ emissions, Cases 2 and 4 have a 2% to 3% increase from Scenario A to Scenario B. This is possibly due to increased use of lower cost but higher $CO_2$-producing coal steam turbines which displaced the use of cleaner gas combined cycle generation. On the contrary, Scenario C provided an approximate 20% reduction in $CO_2$ attributable to ARLS' increased use of RES.

Table 6.5 summarizes the 1-day results for Cases 5-15, which is illustrative of Spring and Fall weather. RES penetration Scenarios A, B and C are the same is in Table 6.4. Cases 5, 6, 7, and 8 are 1-day excerpts of Cases 1, 2, 3, and 4 in Table 6.4. Cases 9 through 15 quantify the performance of the MPC of air-conditioning, battery charging, and electric DHW heating.

Table 6.5 shows the range of variable generation costs and $CO_2$ emissions for actual net load, simulated net load, and scenarios of increasing RES penetration.

| Scenarios → | | A. Low RES penetration uWind22, uSolar1, dSolar0 | | | B. Medium RES penetration uWind30, uSolar3, dSolar50 | | | C. High RES penetration uWind38, uSolar5, dSolar100 | | |
|---|---|---|---|---|---|---|---|---|---|---|
| ↓ Cases | | Cost $ [M] | Cost $/MWh | $CO_2$ lb [M] | Cost $ [M] | Cost $/MWh | $CO_2$ lb [M] | Cost $ [M] | Cost $/MWh | $CO_2$ lb [M] |
| 5 | Actual net load observed in Texas | 12.96 | 15.45 | 486 | 6.73 | 8.02 | 160 | 3.67 | 4.37 | 52.00 |
| 6 | . . . daily optimum shape | 11.25 | 13.41 | 523 | 3.63 | 4.32 | 119 | 1.07 | 1.28 | 8.00 |
| 7 | Simulated BC net load | 12.43 | 14.81 | 534 | 3.07 | 3.66 | 42.0 | 1.07 | 1.28 | 8 |
| 8 | . . . daily optimum shape | 11.25 | 13.41 | 523 | 1.07 | 1.28 | 8.0 | 1.07 | 1.28 | 8 |
| 9 | Simulated net load with MPC A/C | 12.73 | 15.17 | 518 | 2.84 | 3.39 | 48.0 | 1.07 | 1.28 | 8 |
| 10 | . . . with MPC BAT | 11.89 | 14.17 | 535 | 2.50 | 2.98 | 38.0 | 1.07 | 1.28 | 8 |
| 11 | . . . with MPC DWH | 12.59 | 15.01 | 562 | 3.06 | 3.65 | 46.0 | 1.07 | 1.28 | 8 |
| 12 | . . . with MPC A/C + BAT | 12.20 | 14.54 | 576 | 2.64 | 3.14 | 39.0 | 1.07 | 1.28 | 8 |
| 13 | . . . with MPC A/C + DWH | 12.98 | 15.47 | 600 | 2.84 | 3.38 | 49 | 1.07 | 1.28 | 8 |
| 14 | . . . with MPC BAT + DWH | 12.12 | 14.44 | 571 | 2.66 | 3.17 | 36 | 1.07 | 1.28 | 8 |
| 15 | . . . with MPC A/C + BAT + DWH | 12.63 | 15.05 | 584 | 2.66 | 3.17 | 42 | 1.07 | 1.28 | 8 |

Notes to Table 6.5:
1. For cases 5-15, residential PV solar sizing was initially based on net zero whole-house energy usage on an annual basis and then on daily basis to reduce compute times.
2. Curtailment of uWind and uSolar is required during some hours in Scenario B and many more hours in Scenario C in order to prevent over generation.

In Table 6.5 Scenario A, Cases 5 and 7 have reasonable agreement between the daily cost of providing electricity Texas-wide, which was approximately $13M for the day. As summarized in Table 6.6, the greatest reductions in cost occur across all Scenarios in Cases 6 and 8 when the optimum load shape was applied. Cases 9-15, Scenario A had positive and negative impact of 4% or less. Negative impacts are due to 2%-3% increased energy use in optimizations due to standby losses associated with pre-cooling a home and pre-heating hot water. Cases 9-15, Scenario B had positive savings impact of 19% or less with best results observed in the battery Case 10. Cases 9-15, Scenario C had no impact as RES and nuclear generation met the load in all Cases. With respect to CO2 emissions, Scenario A indicates a 2% and 3% decrease in Cases 8 and 9, and an increase up to 12% for other Cases. Scenario B indicates an 81% decrease for Case 8 Daily Optimum Load Shape and positive results for Cases 10, 12, and 14 involving the Battery. Other Cases had greater CO2 emissions due to increased energy and possible increased coal generation that displaced the use of cleaner gas combined cycle generation. Scenario C had no impact on CO2 emissions as RES and nuclear generation met the load in all Cases.

Table 6.6 shows the impact compared to unshaped actual net load.

| Scenarios → | | Cost Impact [%] | | | CO2 Impact [%] | | |
|---|---|---|---|---|---|---|---|
| ↓ Cases | | A | B | C | A | B | C |
| 8 | Net load with daily optimum shape | 9% | 65% | 0% | 2% | 81% | 0% |
| 9 | Simulated net load with MPC A/C | -2% | 7% | 0% | 3% | -14% | 0% |
| 10 | . . . with MPC BAT | 4% | 19% | 0% | 0% | 10% | 0% |
| 11 | . . . with MPC DWH | -1% | 0% | 0% | -5% | -10% | 0% |
| 12 | . . . with MPC A/C + BAT | 2% | 14% | 0% | -8% | 7% | 0% |
| 13 | . . . with MPC A/C + DWH | -4% | 7% | 0% | -12% | -17% | 0% |
| 14 | . . . with MPC BAT + DWH | 2% | 13% | 0% | -7% | 14% | 0% |
| 15 | . . . with MPC A/C + BAT + DWH | -2% | 13% | 0% | -9% | 0% | 0% |

Table 6.7 summarizes the 1-day results for Cases 5-15, which is illustrative of a Summer peak demand day. RES penetration Scenarios A, B and C are the same is in Tables 6.4 and 6.5. As in Table 6.5, Cases 5, 6, 7, and 8 are 1-day excerpts of Table 6.4 and Cases 9 through 15 quantify the performance of MPC.

Table 6.7 shows the range of variable generation costs and CO2 emissions for scenarios of increasing RES penetration and increasing MPC of end uses.

| Scenarios → ↓ Cases | | A. Low RES penetration uWind22, uSolar1, dSolar0 | | | B. Medium RES penetration uWind30, uSolar3, dSolar50 | | | C. High RES penetration uWind38, uSolar5, dSolar100 | | |
|---|---|---|---|---|---|---|---|---|---|---|
| | | Cost $ [M] | Cost $/MWh | $CO_2$ lb [M] | Cost $ [M] | Cost $/MWh | $CO_2$ lb [M] | Cost $ [M] | Cost $/MWh | $CO_2$ lb [M] |
| 5 | Actual net load observed in Texas | 25.41 | 22.51 | 1157 | 17.91 | 15.86 | 838 | 15.13 | 13.4 | 471 |
| 6 | . . . daily optimum shape | 24.31 | 21.54 | 1132 | 17.72 | 15.7 | 897 | 11.35 | 10.06 | 531 |
| 7 | Simulated BC net load | 31.83 | 28.2 | 1447 | 20.74 | 18.37 | 1003 | 13.44 | 11.91 | 482 |
| 8 | . . . daily optimum shape | 30.69 | 27.19 | 1438 | 20.64 | 18.28 | 1017 | 11.66 | 10.33 | 557 |
| 9 | Simulated net load with MPC A/C | 32.52 | 28.81 | 1472 | 21.03 | 18.63 | 1016 | 13.02 | 11.54 | 511 |
| 10 | . . . with MPC BAT | 31.83 | 28.2 | 1453 | 20.54 | 18.2 | 979 | 11.97 | 10.61 | 478 |
| 11 | . . . with MPC DWH | 32.19 | 28.52 | 1457 | 20.8 | 18.43 | 983 | 13.46 | 11.93 | 529 |
| 12 | . . . with MPC A/C + BAT | 32.17 | 28.5 | 1467 | 20.9 | 18.52 | 995 | 12.33 | 10.92 | 515 |
| 13 | . . . with MPC A/C + DWH | 32.86 | 29.12 | 1490 | 21.17 | 18.75 | 1017 | 13.2 | 11.69 | 529 |
| 14 | . . . with MPC BAT + DWH | 32.15 | 28.48 | 1464 | 20.68 | 18.32 | 985 | 12.15 | 10.77 | 486 |
| 15 | . . . with MPC A/C + BAT + DWH | 32.65 | 28.93 | 1484 | 21.11 | 18.7 | 1006 | 12.48 | 11.06 | 543 |

Notes to Table 6.7:
1. For cases 5-15, residential PV solar sizing was initially based on net zero whole-house energy usage on an annual basis and then on daily basis to reduce compute times.
2. Curtailment of uWind and uSolar is required during some hours in Scenario B and many more hours in Scenario C in order to prevent over generation.

In Table 6.7, Case 5 daily generation costs are less than Case 7, for Scenario A, $25.4.M versus $31.8M and for Scenario B, $17.9M versus $21.7. However, Case 5, Scenario C costs are less than Case 7 costs. The greatest reductions in cost occur across all Scenarios in costs in Cases 6 and 8 when the optimum load shape was applied. As summarized in Table 6.8, Cases 9-15, Scenario A have zero or as much as –3% cost impacts, due to due to standby losses related to optimization. Cases 9-15, Scenario B had plus or minus up to % cost impacts. Cases 9-15, Scenario C had up 114 to 13% positive cost impact.

With respect to CO2 emissions, Scenario A indicates a 2% and 3% negative impact. Scenario B indicates 1% negative to 2% positive impact. Other Cases had greater CO2 emissions due to increased energy and possible increased coal generation that displaced the use of cleaner gas combined cycle generation. Scenario C had up to 16% negative impact due to increased coal generation.

Table 6.8 shows the impact compared to unshaped actual net load.

| Scenarios → ↓ Cases | | Cost Impact [%] | | | CO2 Impact [%] | | |
|---|---|---|---|---|---|---|---|
| | | A | B | C | A | B | C |
| 8 | . . . daily optimum shape | 4% | 0% | 13% | 1% | –1% | –16% |
| 9 | Simulated net load with MPC A/C | –2% | –1% | 3% | –2% | –1% | –6% |
| 10 | . . . with MPC BAT | 0% | 1% | 11% | 0% | 2% | 1% |
| 11 | . . . with MPC DWH | –1% | 0% | 0% | –1% | 2% | –10% |
| 12 | . . . with MPC A/C + BAT | 0% | –1% | 8% | –1% | 1% | –7% |
| 13 | . . . with MPC A/C + DWH | –3% | –2% | 2% | –3% | –1% | –10% |
| 14 | . . . with MPC BAT + DWH | –1% | 0% | 10% | –1% | 2% | –1% |
| 15 | . . . with MPC A/C + BAT + DWH | –3% | –2% | 7% | –3% | 0% | –13% |

In summary, the benefits in load reduction are not apparent in many MPC Cases for at least the following reasons: 1) There is increased energy use due to the standby losses associated with shaping load. For example, preheating hot water incurs standby losses as the tank cools down. 2) The model is underpredicting high load periods. This behavior resulted in less use of the most expensive marginal generation. 3) The full thermal generator fleet with a capacity of 69 GW was available to meet a peak load of 59 GW, as opposed to, say 10%, random unavailability due to scheduled and unscheduled maintenance and outages. This behavior also resulted in less use of the most expensive marginal generation. 4) The thermal generator fleet was modeled using a constant heat rate efficiency. This behavior resulted in the same costs, for example, for three similar generators running at 30% capacity to meet load versus one generator running at 90% capacity. This limitation would be apparent when the part-load operation of many generators is required while awaiting a ramping event that could have been mitigated by ARLS attempting to meet the optimum load shape. Each of the above are addressed as a potential for future work in Section 7.3.

6.4.2 Unshaped Actual Load versus Optimum Load Shape

Figure 17:
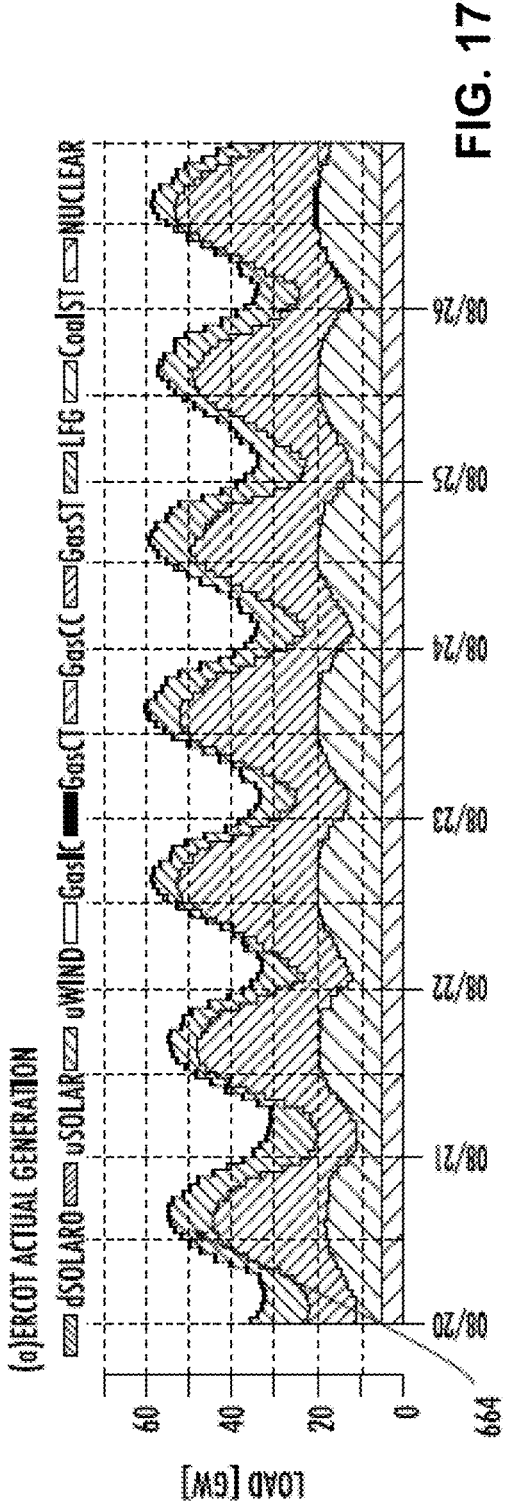
FIGS. 17 and 18 are plots of actual and optimum power generation or load shaping.
Figure 18:
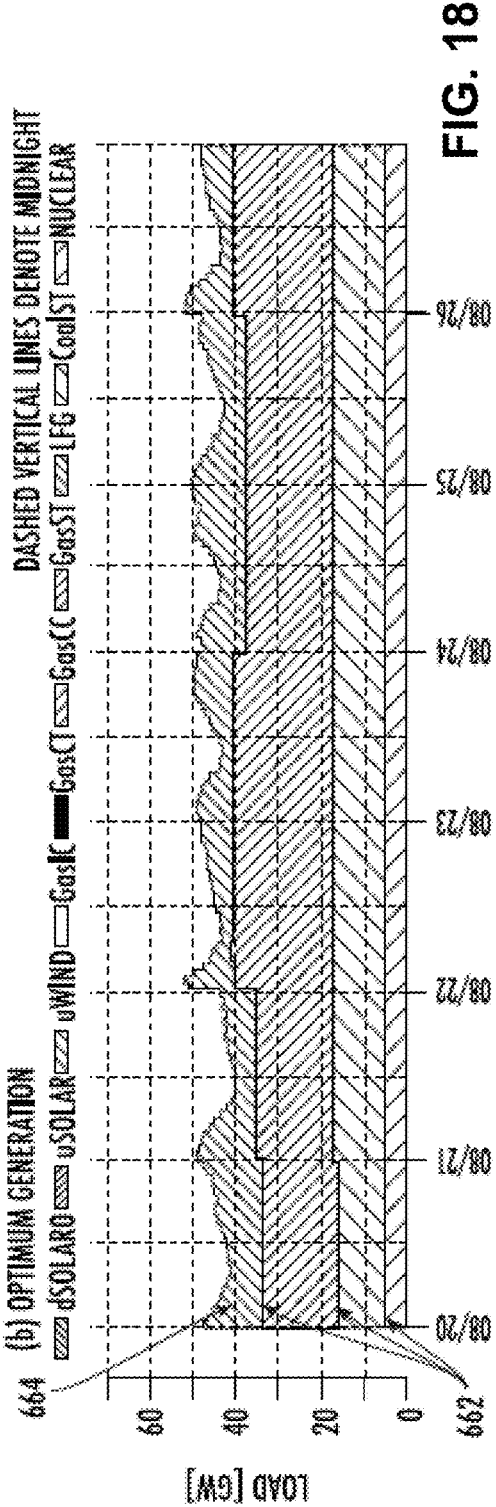

For Cases 1 & 2, Scenario A, variable generation cost and CO2 emissions were calculated for the unshaped actual hourly load and for the actual hourly load had it been optimally shaped, as shown in FIGS. 17 and 1818 respectively. As expected, the daily optimum minimum cost generation was achieved when the net load was constant, depicted as one or more fixed flat lines for each type of energy generation (referenced generally as 662), as shown for each hour in FIG. 18. The curves labeled 664 are the renewable energy resources in this example. The net load in the industry is defined as the load of the non-renewable energy generators, such as nuclear, coal, gas, and oil generators. In FIG. 18 the net load is defined for purposes of this application as the load of the thermal generator resources, i.e., nuclear, oil, coal, gas generators.

FIGS. 17 and 18 show ERCOT hourly generation based on the actual load at the top (FIG. 17) and daily optimum load at the bottom (FIG. 18) on 20-26 Aug. On 22 and 26 August, 9 of the 10 generation technologies shown here in use. There is no distributed solar (dSolar) generation in Scenario A and hence none is depicted. Some generation colors are more prevalent and easier to see. Of course, the present solution is not limited to this selection of energy resources and may include others or some of these may not be included in a particular emulation. This may be dependent on actual resources used or may be a selection by the emulation model. In addition, the renewable resources that are re-added to the flattened load shape may be more or less than those renewable resources shown. The traditional or so-called thermal or "carbon" based energy resources (including nuclear) may be more or less than shown here. Further, it may be chosen to flatten one or more of the renewable energy resources in this model or no flatten some of the thermal or carbon energy resources. The selection of which energy resources are flattened and which are not may depend on parameters such as sufficiency or quality of data for a particular energy resource, ease of calculation, energy regulation definitions that redefine certain resources as renewable or thermal/carbon, selection by the client or energy provider or distributor of energy, definition by the client or energy provider or distributor of energy of what resources are renewable versus thermal/carbon energy resources, and predictability of a given energy resource (predictability, for example, is determinative of whether a resource can be flattened), for example.

In FIG. 18 there are a peak hours of dark red (GasCT) in-between the bands of orange (uWind) and light red (GasCC) on 22, 23, and 26 August, and there are peak hours of dark green (GasST) above dark blue (CoalsST) on 22 and 26 August. Barely visible are: 1) the smallest generation contributions in the midday diurnal signature (d and u Solar) at the very top of each graph, and 2) a continuous line (LFG) atop the hashed area labeled (CoalST). In FIG. 17, note the up and down ramping of net generation (depicted by diurnal humps) of coal and gas as the Texas generation fleet varied its production of electricity to meet the net demand. As expected, after calculating the daily optimum net generation shape, the ramping of net generation in 17 is removed, resulting in a smooth load in 18. Specifically, there is no intra-day ramping in the area under the curve marked (CoalST) and (GasCC), which results in an impact on variable generation cost and CO2 emissions of individual generators. Summing across all generators and intervals, the total energy delivered each day in (a) and (b) is the same. Said differently, the areas under and including the topmost curves in FIGS. 17 and 18 are the same.

As depicted in FIG. 18, calculation of the daily optimum generation sometimes resulted in greater than typical step changes on day boundaries at midnight, e.g., between midnight on 22 August and 1 AM on 23 August. Such atypical discontinuities were the result of adjacent days having a different aggregate energy use and, as expected, were minimal between days with similar meteorological conditions. Typical discontinuities in load at midnight were defined as those observed in Case 1 (unshaped actual load) and were compared to the discontinuities in Case 2 (actual load had it been optimally shaped). Box plot distributions of the midnight discontinuities in load in Cases 1 and 2 provide a sense of typical versus atypical behavior per month.

Figure 19:
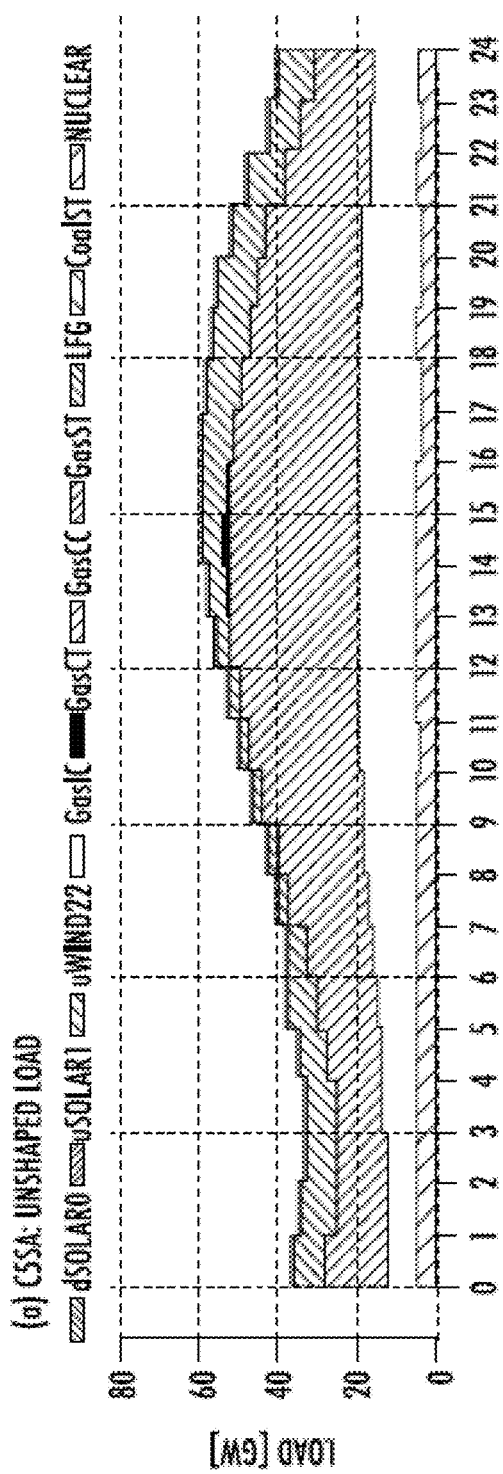
FIGS. 19 and 20 are plots of unshaped and optimum power generation or load shaping.
Figure 20:
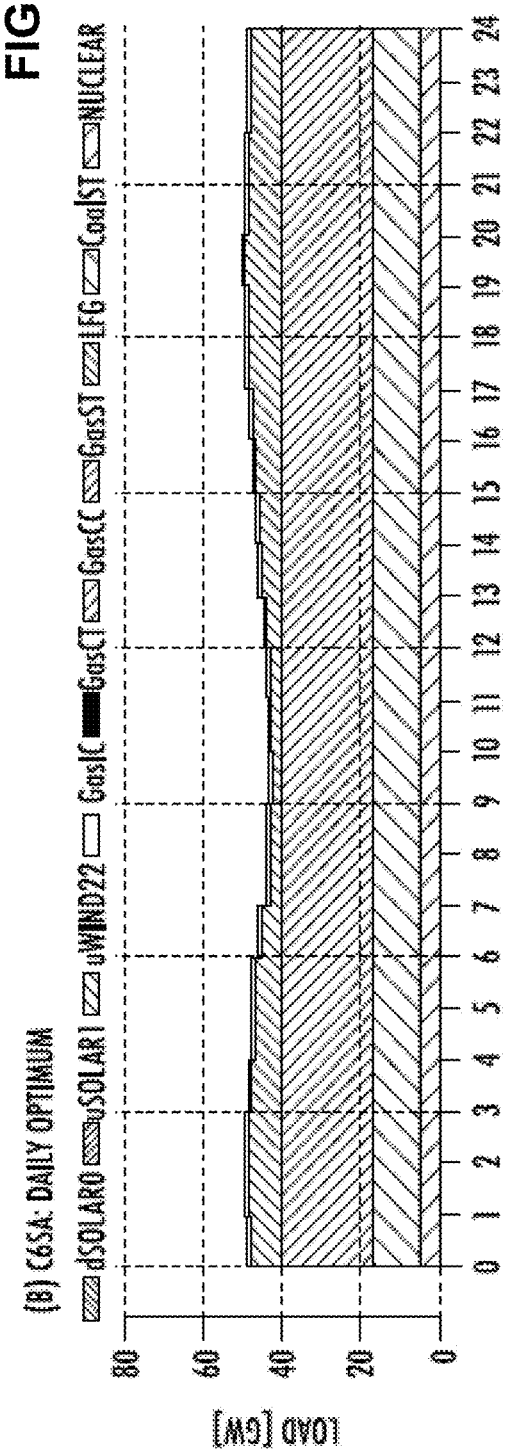

By studying such box plots, the monthly median of midnight discontinuities is found to be less for the optimum versus the actual load in January, March, May through August, and November. Small midnight discontinuities are advantageous from the perspective of reduced thermal and pressure stresses that result from ramping thermal generators. Nonetheless, the upper and inter-quartile ranges in all months depict many greater than typical midnight discontinuities. Methods for reducing midnight discontinuities in load are likely to include modifications to the GAMS PCM to manage day boundaries, are beyond the scope of this research and should be explored. Hourly generation from the Texas fleet of RES and non-RES generators were compared and contrasted for the low, medium, and high RES penetration cases (Scenarios A, B, and C). Sample visualizations of the load and the generation that met the load for each hour are shown in FIGS. 18, 19, and 20, where Cases and Scenarios are denoted with an abbreviated notation, e.g., C5SA, which denotes Case 5, Scenario A. In FIG. 18, both the FIGS. 19 and 20 visualizations are a zoomed view from the weekly view depicted in FIGS. 16a and b, respectively. In FIGS. 16-20, the legend indicates the type of energy resource which is found on the corresponding graph in the same order, such that nuclear is on the bottom and each subsequent energy resource in the legend is layered upon the last.

FIGS. 18 a and b shows Cases 5 & 6, Scenario A, ERCOT generation to meet the unshaped load as shown in FIG. 19 at the top, and the optimally shaped load in FIG. 20 at the bottom. FIG. 19 depicts the variability in load and generation in 24 hourly intervals. The variability in the utility wind resource (uWind 22) is denoted by the changing height of the bars labeled uWind30u, which was lowest from after sunrise through hour 11. GasCT and GasIC generation were required for hours 14, 15, and 16 to ramp up and meet the daily peak load. The top line in FIG. 18 b provides visual insight to calculating the daily optimum load shape. First, the non-RES generation in FIG. 18 a was flattened by equally distributing daily production needs across all 24 hours, in this case starting with the bottom graph labeled (Nuclear) fleet up to and including the area under the curve labeled (GasCC) fleet. Second, the hourly RES generation was added atop the flattened non-RES generation resulting in a somewhat concave optimal load shape. It shall be appreciated that the traditional energy resources may be "flattened" by, for example, averaging the load for the thermal resources over a given time period (or by other smoothing function), and that the renewable resources that are usually inflexible as to control of energy output (a solar panel provides energy only during the day) are not flattened, but added to the flattened non-renewable energy sources that are more flexible in their energy production and, therefore, can be controlled.

As shown in the legend of FIG. 19 a, Scenario B introduced: a) increased utility wind (uWind) from 22% to 30% of the total annual ERCOT load, b) increased utility solar (uSolar) from 1% to 3% of the total annual ERCOT load, and c) 50% of homes having distributed net-zero solar PV.

FIGS. 21 and *b* show Cases 5 & 6, Scenario B, ERCOT generation to meet the (FIG. 21) unshaped load at the top, and (FIG. 22) and optimally shaped load at the bottom. The impact on the non-RES generation fleet of increasing RES can be seen by comparing FIGS. 19, and 21. Note that FIG. 21 shows an increase in ramping of net generation to accommodate the increase in RES.

For the Daily Optimum, comparing FIGS. 20, and 22 provides insights into the impact on the non-RES generation fleet of increasing RES. In FIG. 20 the top of the non-RES generators is a flat line at 40 GW. In FIG. 22 the top of the non-RES generators is a lower flat line reduced to 30 GW, representing a one-quarter reduction in the non-RES generation between Scenarios A and B.

Figure 23:
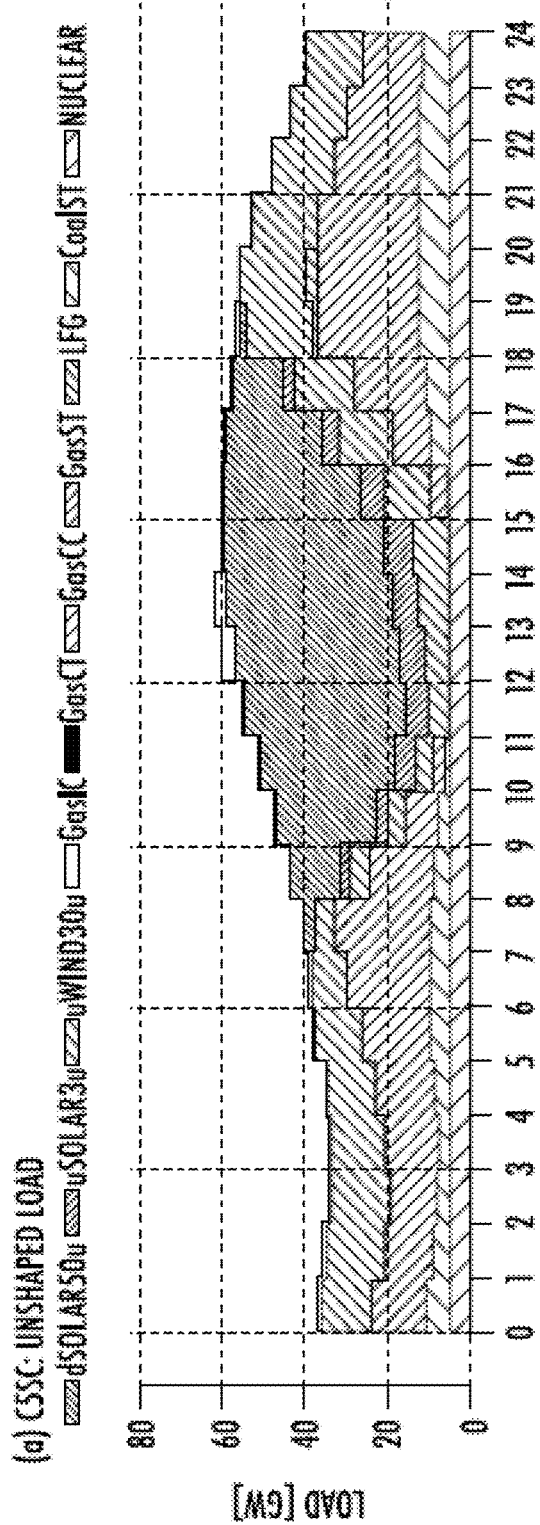
FIGS. 23 and 24 are plots of unshaped and optimum power generation or load shaping.

As shown in FIGS. 23 and *b*, Scenario C further increased: a) uWind to 38% of the total annual ERCOT load, b) uSolar to 5% of the total annual ERCOT load, c) dSolar to 100% of homes.

FIGS. 20 *a* and *b* shows cases 5 & 6, scenario C, ERCOT generation to meet the (a) unshaped load at the top, and (b) and optimally shaped load at the bottom. The black trace in (a) at the top denotes curtailed RES.

FIG. 23 is the forecast load shape or historical load bounded by the upper curve (incorporating the various power generation loads). The hashings represent the different generators to meet the load as indicated in the corresponding legend. We take the forecast load shape and subtract out the renewable component, represented by the areas labeled dSolar50u, uSolar3u, uWind30u. The area that is left is met by thermal generators (and will get flattened as described above). In one methodology, the area under the curve without the renewables is flattened. In one methodology, that area (the total energy of the non-renewables) is divided by the number of intervals (here 24) to arrive at a load per unit time. This flattened signal or adjusted load is provided to the thermal generators (the so called net generation). The renewable signature, i.e., that portion of the energy load from renewable sources, is put back on top of the flattened net, and that gives you the optimal load shape as shown in FIG. 24 as generally indicated by the arrows labeled renewables.

The additional impact on the non-RES generation fleet of further increasing RES can be seen by comparing FIGS. 19, 21, and 23. Note that FIG. 23) shows the greatest ramping of net generation to accommodate the increase in RES. During daylight hours, the contributions of the RES generation required: 1) downward ramping through noon to prevent over-generation, and then 2) upward ramping through hour 19 in order to ensure supply would meet demand. Approaching noon, the required downward ramping was so great that the GasCC and CoalST fleets were completely shut down by hour 11. During the afternoon, the generators in the CoalST and GasCC fleets ramped up, and at hour 18 production was supplemented by fast-starting and fast-ramping GasCT and Gas IC.

Figure 24:
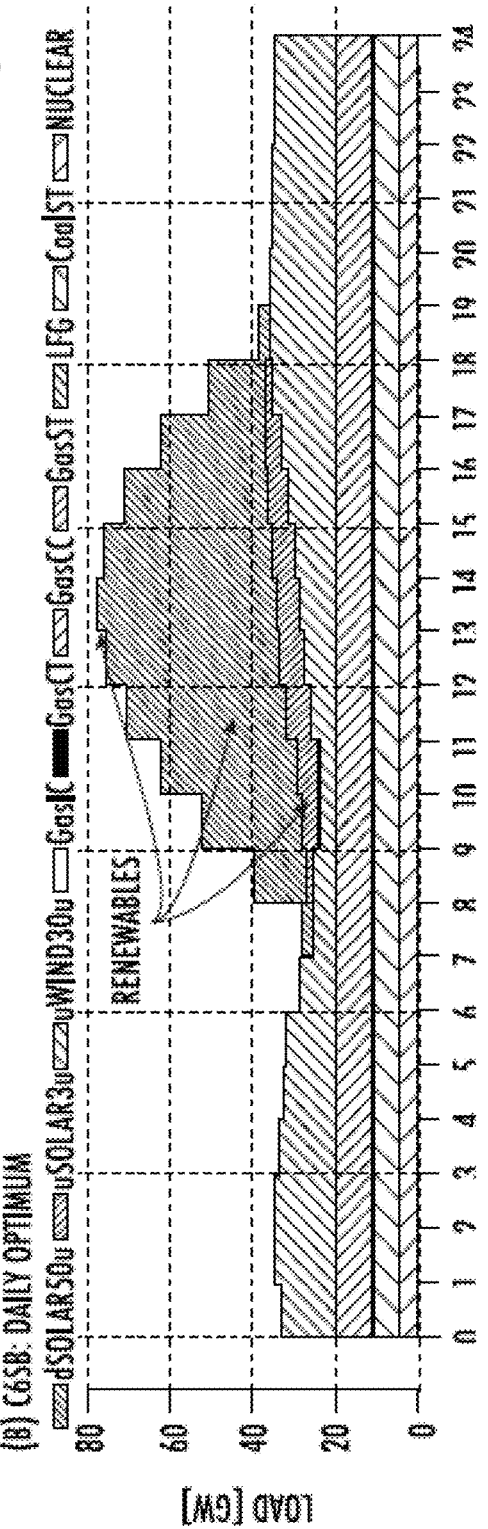

For the Daily Optimum, comparing FIGS. 20, 22, and 24 provides insights to the impact on the non-RES generation fleet of further increasing RES. In FIG. 24 the top of the non-RES generators is a lower flat line reduced to just over 20 GW, representing a nearly half reduction in non-RES generation between Scenarios A and C. The reductions in non-RES generation were enabled by shaping 21% of the load in Scenario A, 29% in Scenario B, and 59% in Scenario C.

6.4.3 Simulated Load

For Cases 3 and 4, on an annual basis, the variable generation cost and $CO_2$ emissions for the unshaped BC simulated load and for the shaped daily optimum load in Scenarios A-C and were found to be in general agreement with results of Cases 1 & 2, as shown in Table 6.4. Referencing Tables 6.5 and 6.7, Cases 5-8 are 1-day excerpts of Cases 1-4. Historical electricity use was simulated using the building model with local weather inputs, scaled from feeder to city, and then city to weather zone. The actual and simulated load by weather zone was analyzed using a new scheme 8 ERCOT weather zones. The two largest weather zones are the Coast, in which Houston is located, and North Central, in which Dallas is located. Summing the historical observed load per weather zone provided a total ERCOT load which peaked near 60 GW during the middle of the week.

FIGS. 25 and *b* show ERCOT load per weather zone, Actual load is shown at the top (FIG. 25) and simulated load at the bottom (FIG. 26). As expected, the impact of outdoor temperature on load was found to be significant. To investigate model prediction errors, histogram frequency distributions were created to provide insight to the skill of the model throughout the forecasting regime.

The vertical axis denotes the number of hours in a year for load ranges on the horizontal axis. In FIG. 25, note the long tails in the actual load in the upper row that are missing in FIG. 26 bottom row which has a reduced range of loads. The left of FIG. 26 depicts the total load and the right shows the simulated net load after subtracting the actual time-synchronous RES. To quantify whether the model was systematically underpredicting or overpredicting the simulated load, the Mean Bias Error was calculated for the year by subtracting the hourly actual load from the predicted load, and was found to be zero.

Monthly boxplot distributions were created to compare the hourly errors between simulated and actual load. It was observed that hourly residual errors occurred between simulated and actual ERCOT load by month. Note that the load is overpredicted in the Spring and Fall seasons and underpredicted in the Summer. The mean and median of residual errors are least in the Winter.

The best agreement between simulated and actual load in the Winter, over prediction during the Spring and Fall, and underprediction during the Summer was considered. To provide additional insight into the distribution of residual errors, box plot distributions were created to compare the hourly errors between simulated and actual load by the hour of day.

Residual errors between simulated and actual ERCOT load by the hour of day were analyzed. It was found that the load is overpredicted in the morning before and after sunrise, underpredicted in the middle of the day, and overpredicted in the evening. The mean and median of residual errors are least in hours 2, 3, 10, 19, and 24. A heat map like the one in FIG. 6 was used to depict residual errors by hour for each day over the course of a year. It was found that the Spring and Fall versus Summer season behavior exhibited weak seasonal stationarity of residuals among adjacent days as denoted.

FIG. 22 depicts 1) the greatest over predictions occurred in the Winter, Spring, and Fall seasons in the late afternoon and early evening, and 2) the greatest underpredictions occurred in the Summer in the late evening. It was found that the summer evening simulated load decreased faster than actual load starting at hour 20. To further investigate the performance of the model, the quantiles of simulated versus actual values were plotted against each other.

Figure 27:
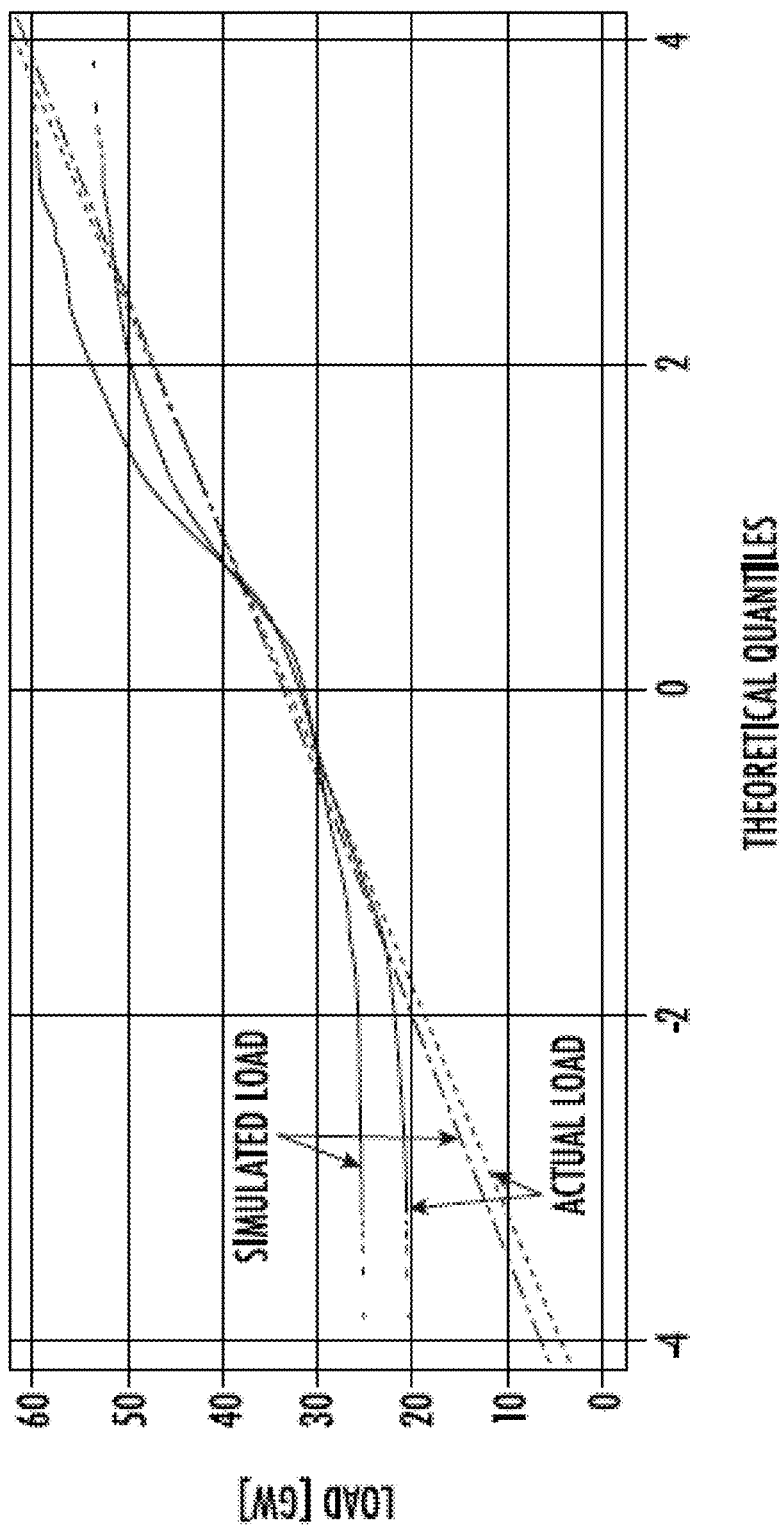
FIG. 27 is a plot of simulated and actual loads.

Quantile-quantile plots of simulated loads were overlayed with actual ERCOT load. The black dots depict actual load, and the red dots depict simulated load. In FIG. 27 the black lines labeled actual load depict actual load. The black lines labeled simulated load depict simulated load, which is overpredicted at low loads and underpredicted at high loads. Looking back at previous data presented so far, there is evidence to reject the assumption that the electric load data are normally distributed. To simplify the interpretation of FIG. 27 the quantiles of simulated versus historical values were plotted against each other, as shown in FIG. 23.

Figure 28:
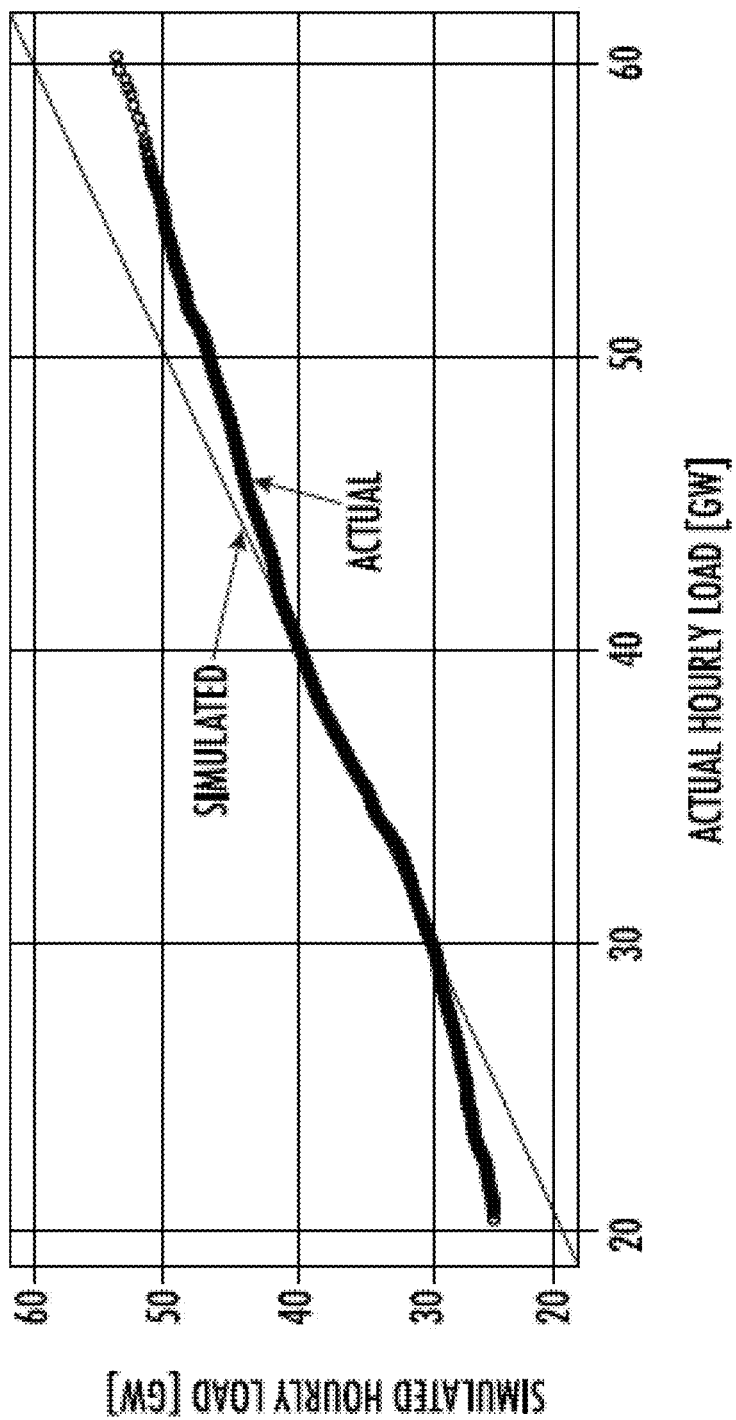
FIG. 28 is a plot of simulated and actual loads.

As shown in FIG. 28 the residual errors of the model are depicted by the distance from the diagonal. This visualization also indicates that simulated load is overpredicted at low loads and underpredicted at high loads. Lastly, a two-sample Kolmogorov-Smirnov Test was used to compare the simulated and actual load for the year. The test is a non-parametric distribution-independent evaluation comparing the simulated and actual samples and is sensitive to differences in both location and shape of the empirical cumulative distribution functions of the two samples. Given a significance level of 0.05, the near-zero p-value of 2.2e-16 provides evidence to reject the null hypothesis that the two samples were drawn from the same distribution.

Figure 29:
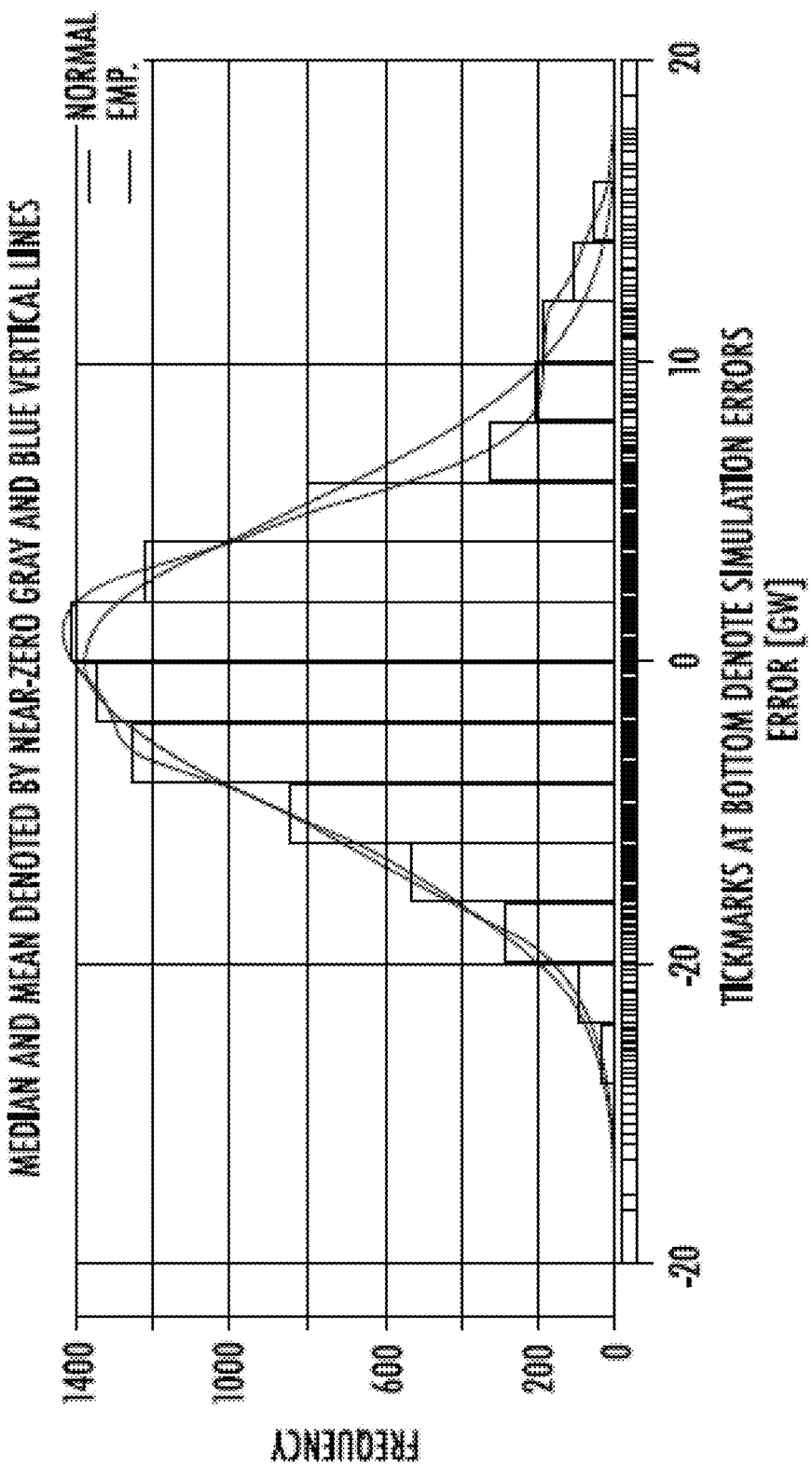
FIG. 29 is a histogram of errors between simulated and actual loads.

A histogram of the residual errors are shown in FIG. 29. FIG. 29 shows a histogram of errors between actual and simulated ERCOT load and may be thought of as an empirical distribution and normal distribution are overlaid for reference. Comparing the previous figures, the residual errors of simulated less actual loads are nearly normally distributed. Thus, it was found that the model overpredicts low loads less than it underpredicts high loads. The impact of underpredicting high loads is critically important as it introduces errors that significantly impact the power systems planning process. First, it underestimates the amount of required peak generation capacity, which is likely the most expensive capacity per unit of electricity produced. Second, it underestimates the marginal cost of generation during high-load and peak demand periods. Failing to predict the highest loads results in failing to simulate the operation of the most expensive marginal generation, which results in significantly underestimating the cost of high-load and peak demand periods.

6.4.4 MPC Load Shaping

For Cases 9-15, MPC-enabled load shaping was simulated on individual devices, with resulting loads, including generic loads, aggregated at the house level. Depending on feeder size, between 168 and 2,192 homes were aggregated to reflect the load at the feeder level. Device loads, generic loads, house loads, and feeder loads were recorded for verification of intended behavior and further post-processing. For example, the BC simulated load and the Reference Demand (scaled from daily optimum load shape) for Houston Feeder R5-2500-1 are shown in FIG. 30.

Figure 30:
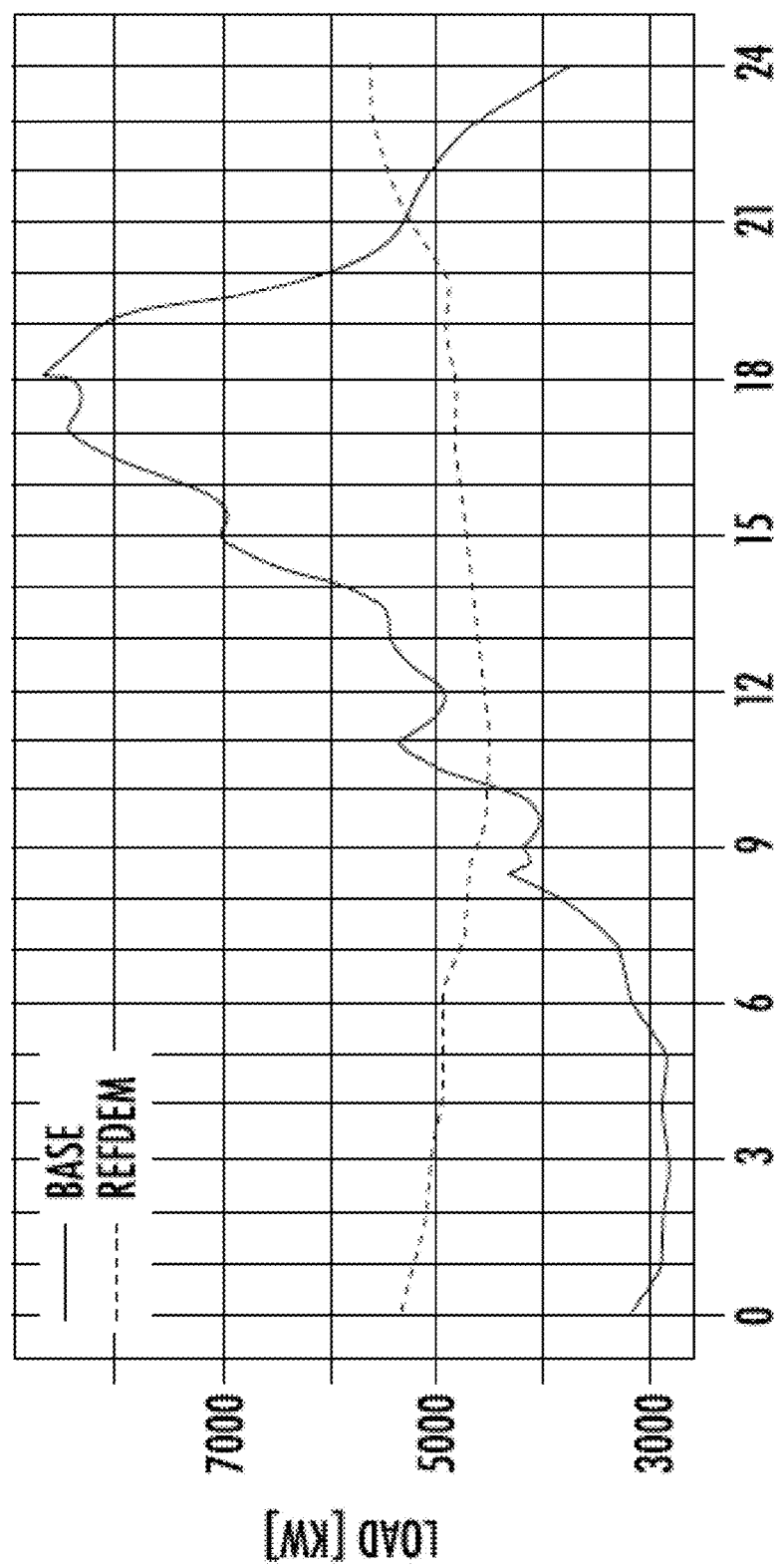
FIGS. 30 and 31 are plots showing the base and reference demand of a group of homes.

FIG. 30 shows the base Base and Reference Demand for 2,146 homes on Houston Feeder R5-2500-1. In the figure, the Reference Demand informs GridMPC to add load when above the Base Case load until hour 10, to shed load when below the Base Case load between hours 10 and 21, and then to add load again starting in hour 21 through the end of the day. Continuing the example, Feeder loads and Reference Demand were normalized and then differenced to produce the daily optimum load shape deltas, as shown in FIG. 31.

Figure 31:
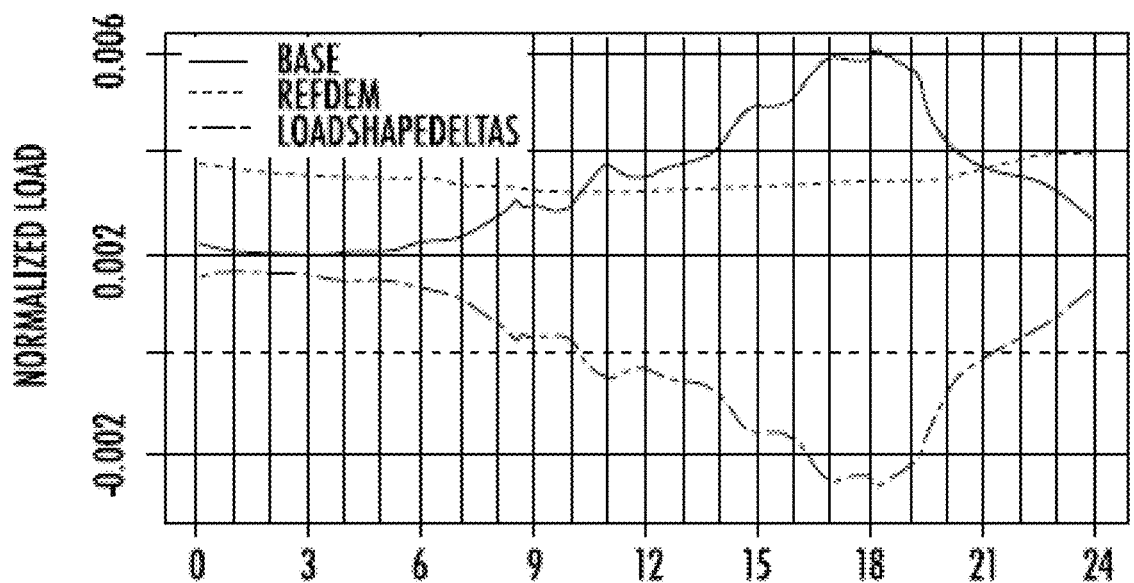

FIG. 31 shows the normalized Base Case, Reference Demand, and load shape deltas for Houston Feeder R5-2500-1. In the figure, the green line connects the 288, 5-min load shape deltas, creating a zero-centered inverse of the normalized load less the Reference Demand.

Figure 32:
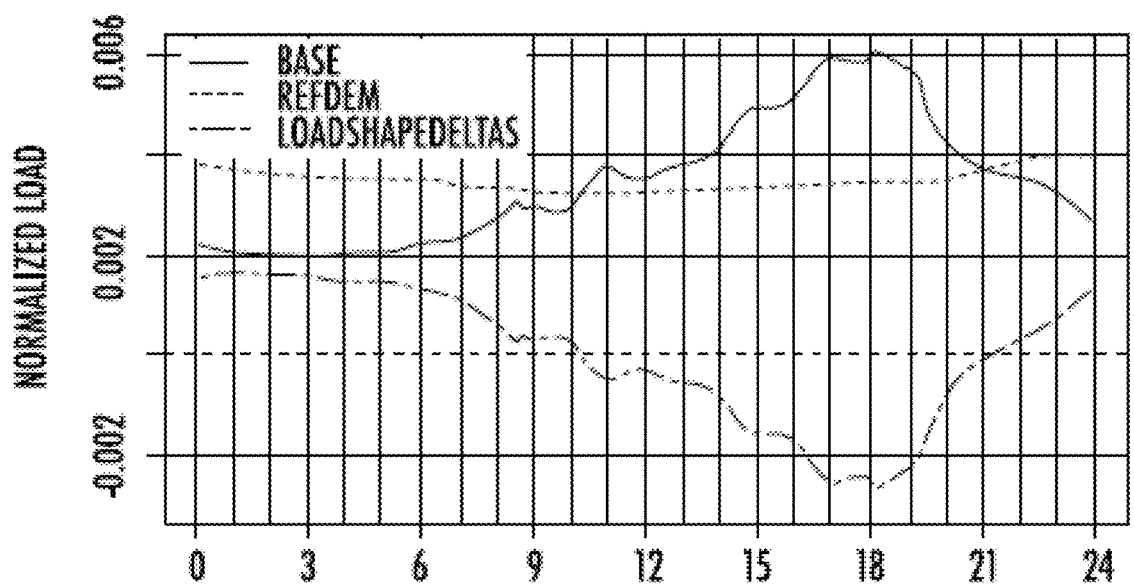
FIG. 32 is a plot showing the optimized demand.

For Case 9, a simulated shaped load with MPC of air-conditioning (A/C), applying the daily optimum load shape deltas resulted in the optimized load is shown in FIG. 32. The calculations for Cases 10-15 followed the same process.

Figure 33:
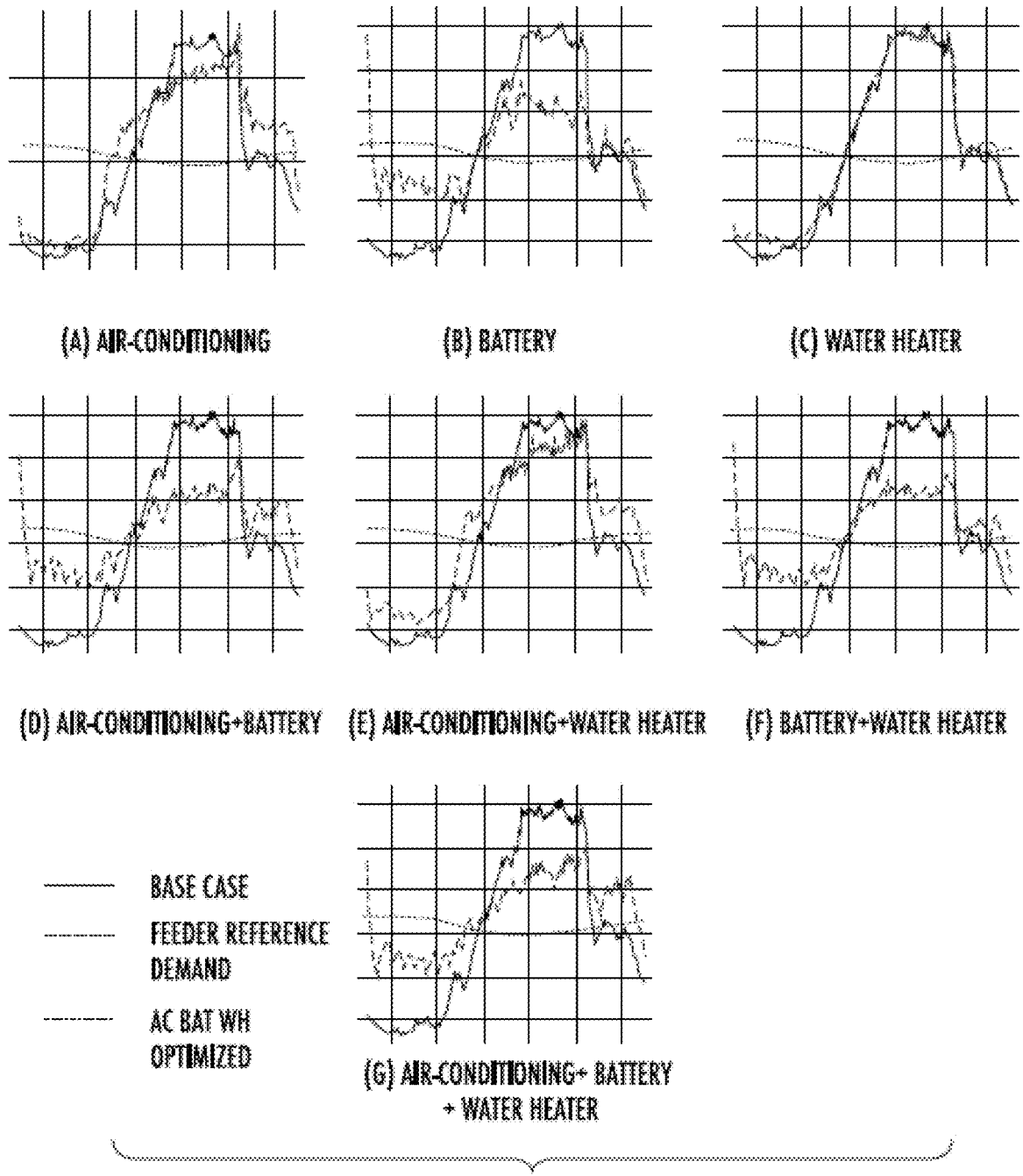
FIG. 33 are plots of load shapes showing the optimized load shaping signal and appliance response for actual scenarios.

FIG. 33 shows a Base Case, Reference Demand, and MPC optimized air-conditioning demand for Houston Feeder R5-2500-1. In FIG. 6.21, the circle at hour 10 denotes MPC transition from load adding in the morning to load shedding in the middle of the day. Likewise, the circle at hour 21 denotes MPC transition from load shedding in the middle of the day to load adding at night. In this example, there are two transitions denoted by circles, though the framework supports up to 288 transitions per day given the 5-minute interval used in the simulation. The specific timing and number of transitions per day varied depending on the simulated BC load and optimum load shape. In theory, given sufficient computational resources, there is no upper limit on the number of transitions possible. To simplify interpretation, the load curves in FIG. 33 were kept as smooth as possible by simulating the air-conditioning portion of the load (for these figures only) with infinitely variable air conditioners in each home that had no minimum on-time requirement.

On some days, the impacts of ARLS were negligible, slightly positive or negative, such as 1) in Scenario A, when RES was fully utilized regardless of the application of the optimum load shape, and 2) in Scenarios B and C, when there was sufficient hourly RES throughout the day such that thermal generation was unneeded. On other days, the impacts of ARLS were considerable and are detailed here.

The following examples were further examined for analysis of MPC-based control based on ARLS. The performance is shown for Cases 9-15, Scenarios A, 13, and C in FIG. 33. The objective of GridMPC in all Cases and Scenarios was to shape and modulate load to match as closely as possible the Feeder Reference Demand. This was accomplished by GridMPC minimizing the differences between the Optimized demand and Feeder Reference Demand.

The Feeder Reference Demand, depicted by the broken dot-dash line, was calculated by scaling down the ERCOT daily optimal load shape such that daily energy use (i.e., the area under the curve) was the same as the Base Case energy use depicted in the solid line. In every MPC Case and RES penetration Scenario, the Feeder Reference Demand was the control signal used by GridMPC to add or shed load throughout the day.

From these plots, it is seen that Large excursions in the air-conditioning optimized loads at the start of each day denote initial cool/down of homes. Large excursions in the battery optimized load at the start of each day denote a rapid change from the initial SOC of 50% and highlight the ability of batteries to immediately and rapidly charge or discharge as directed by GridMPC in response to the optimum load shape as delivered by Feeder Reference Demand. In addition, large excursions in the battery optimized load at the end of each day denote GridMPC attempting to return the battery to a final SOC of 50%. These so-called 'edge effects' could be mitigated with a multi-day model, which would likely predict greater savings through more seamless orchestration of air-conditioning and battery-enabled storage.

Performing these plots for different scenarios provides insight to the behavior of ARLS on a spring day as annotated in the text following each figure. The behavior of ARLS on an ERCOT annual peak load day occurring in summer could be established. Higher loads that are driven by air-conditioning are apparent. As hypothesized in Section 3.2.2, the MPC of DERs can be complementary in supporting the grid at different times of the day, as explained below.

FIG. 33 shows a Scenario A load shapes for Houston Feeder R5-2500-1. GridMPC attempted to increase the Optimized load above the Base Case load until hour 9:30, decrease from hours 9:30-19:30, and increase from hours 19:30-24:00. While the response in each of (a)-(g) is unique, similar load add and shed trends are apparent. The x-axis is labelled in increments of 4 starting with 2, and the y-axis is labelled in increments of 1 starting with 2. In another Scenario B load shapes for Houston Feeder R5-2500-1 were plotted. Here, the Feeder Reference Demand was nearly flat. Fifty percent of homes having net-zero PV results in midday negative generation. GridMPC adds load to offset PV generation. Differing performance of load shaping are apparent in (a)-(g). In Scenario C load shapes for Houston Feeder R5-2500-1 were plotted. Here, the Feeder Reference Demand specifies shedding load until hour 6 and adding load thereafter. All homes having net-zero PV results in greater mid-day negative generation. GridMPC adds load but is unable to completely offset PV generation.

In Scenario A load shapes for Houston Feeder R5-2500-1 were plotted. Here, load shaping benefits occur (a) in hours 1-22, and 6, (b) in hours 1-18, and (c) in hours 1-7, 19, and 21. Although not an exact superposition of benefits, complimentary load shaping occurs, for example, in hours 1-6 where the benefit in (e) is greater than in (a) and (c). In Scenario B load shapes for Houston Feeder R5-2500-1 were plotted. Here, load shaping benefits occur (a) in hours 6-22, and 6, (b) in hours 3-22, and (c) in hours 7 and 13. Complimentary load shaping occurs in (d) in hours 4-22, (e) in hour 7, (1) hours 3-8 and 19-21, and (g) with the smoothest optimized load. In Scenario C load shapes for Houston Feeder R5-2500-1 were plotted. Here load shaping benefits occur (a) in hours 11-13, and 6, (b) in hours 1-22, and (c) in hours 7 and 12. Complimentary load shaping occurs in (e) hour 7, (f) hour 8, and (g) with the smoothest optimized load. Undesired load add occurs in (d), (e), and (g) in hours 1-3.

An important takeaway from FIG. 33 and various Scenarios is that residential load can be shaped significantly in order to take advantage of increasing penetrations of RES. However, from a practical perspective and for the purposes of this study, the only loads than can be shaped are those with inherent thermal or electrical storage. In other words, load curves that correspond to thermal or electrical storage, namely nuclear, coal, oil, gas, and/or battery(ies) are flattened according to the technique disclosed herein. To reiterate, flattening is a redistribution of the load for all or particular energy resource load over unit time, which may include for example averaging, weighted averaging, empirical redistribution, and the like. Significant limitations arise when attempting to shape load from lighting, non-refrigeration appliances (i.e., other than refrigerators and freezers), and miscellaneous electric loads (MELS) such as plug loads. Some of these energy resources may be omitted from the load shaping or application of the load shape to the appliance. MELS accounted for approximately half of residential electricity usage in the RBSA metering study.

6.4.5 Optimization Run Times

This section provides a brief overview and tabular summaries of computational run times using the NREL Eagle high-performance computing cluster. In the Eagle standard queue, jobs may use up to a maximum of 1,050 compute nodes. A single-scenario ERCOT ARLS simulation creates a total of 304 jobs based on 38 Feeders multiplied by eight, one for each of Cases 7 and 9-15. Requesting 304 compute nodes on Eagle would result in the lowest start-to-finish runtime of approximately 45-50 minutes. However, given that jobs for smaller Feeders completed in less than 45 minutes, time would be wasted when scheduling one Eagle node per feeder for the following reasons: 1) As smaller Feeder jobs completed, many compute nodes would be idle and would remain unavailable for other use until all Feeder jobs completed. 2) Given the design of the Slurm workload manager and job scheduler, large node requests would result in an extended time spent waiting in queue for the jobs to be scheduled to start. As such, the most expedient and efficient use of computing time was to request many more than one but fewer than 304 nodes, just enough then keep each node running short jobs until all the longer jobs had finished. This resulted in the lowest possible per-node computing cost.

PSO run time is a useful metric for comparing the computing time required for different Cases and different Feeders. PSO run times on the NREL Eagle high-performance computing cluster are shown in Tables 6.9 and 6.10. Table 6.9 shows run times for completing simulations of 2,146 homes on Feeder R5-2500-1.

Table 6.9: Typical PSO run times for Cases 9-15 on Feeder R5-2500-1 which has 2,146 homes.

TABLE 6.9

Typical PSO run times for Cases 9-15 on Feeder R5-2500-1 which has 2,146 homes.

| Case | Time [sec] | Time per home [msec] |
|---|---|---|
| BASE | 10 | 4.7 |
| BAT | 97 | 45 |
| AC | 104 | 48 |
| AC . . . BAT | 206 | 96 |
| AC . . . WH | 707 | 329 |
| WE | 712 | 332 |
| AC . . . BAT . . . WH | 716 | 332 |
| BAT . . . WH | 747 | 348 |

Differences in the time per house provide a sense of the complexity of each case. As expected, PSO run times increased with additional MPC degrees of freedom. The most extended run times were observed in Cases that included the DHW heater. PSO run times per feeder are shown in Table 6.10. Also included are the number of homes per feeder.

TABLE 6.10

Typical PSO run times for Case 15 AC . . . BAT . . . WH on all Feeders.

| Feeder | Homes | Time [sec] |
|---|---|---|
| R5-1247-2 | 306 | 119 |
| R5-1247-4 | 926 | 324 |
| R5-1247-1 | 1,002 | 359 |
| R5-1247-3 | 2,024 | 715 |
| R5-1247-5 | 1,539 | 560 |
| R5-2500-1 | 2,146 | 716 |
| R5-3500-1 | 2,192 | 724 |

As expected, PSO run times increased linearly, taking approximately 350 milliseconds per home.

6.4.6 Grid LAB-D Output Files

As part of the operation of GridMPC, GridLAB-D was called and created output files that recorded typical power flow simulation metrics on 15-minute intervals at specific locations on each feeder. For example, on Houston feeder R5-2500-1, the state of the physical switches in the distribution network and the real, reactive, and imaginary voltages were recorded for phases A, B, & C at the locations of specific capacitors, e.g., Capacitors 128, 129, 130, and 131. Other distribution network measurements included: 1) Underground line losses, 2) Triplex line losses, 3) Transformer losses, 4) Voltages at load tap changers 5) Overhead line loss, and 6) End of line voltages. An analysis of the GridLAB-D files is beyond the scope of this work and is suggested for future work.

6.5 Conclusions

The OLS model disclosed herein may be thought of as a simulation framework for creating broad geographic assessments of the impact of residential load flexibility on variable generation costs and CO2 emissions for decision and policymakers. Unique to this was the combination of physical models to estimate the impact of flexible residential load on the generation of electric power for the state of Texas, which accounts for approximately 10 percent of the $100B annual electric power production cost in the United States. The methodology estimated the monetary savings that electricity producers would realize by jointly optimizing the mix of generation and residential energy use under various renewable energy penetration scenarios, which is an essential metric in deciding whether ARLS is worthy of further research and implementation. Most importantly, the methodology is suitable for application to geographies around the world, requiring only knowledge or collection of one or more of historical load, weather, attributes of the building stock, operating schedules of electrical devices, distribution feeder models, and generator constraints and I or fuel costs. In addition, the framework could be extended to consider the physical constraints of transmission and distribution networks. Throughout its nearly 150 year history, electric power generation has typically been optimized only to meet the anticipated inflexible load and required reserves at the lowest possible cost.

By including flexible residential load as an additional dimension of optimization, ARLS introduced a new paradigm in the traditional supply-demand relationship by managing storage-capable loads to shift forward or backward in time in order to follow and use the least costly forms of generation. The effect of time-shifting residential demand was twofold: a) to reduce electric power production costs and CO2 emissions by shaping load to increase the efficiency of thermal generation, and b) to decrease the curtailment of renewable energy sources (RES), thus forcing demand to seek and follow the least costly forms of supply all while providing for user needs and maintaining user comfort.

With the ability of ARLS to move generation away from more costly generators towards less costly generators, the Texas-wide annual opportunity for reduction in production costs increased as a function of RES penetration. The maximum opportunity for savings in the high RES Scenario C based on daily optimum load shapes were a ⅓ reduction in annual generation costs, from $3.2B to $1.9B, and a ⅕ reduction in annual CO2 emissions, from 95B to 78B tons. The scale of the generation changes implies gross errors in modeling the sea change in generation sources and technologies. For example, in the presence of highly penetrated RES, as fossil-fueled base-load, mid-merit, and peaking plants run less often, their marginal cost of generation will increase, likely skewing cost calculations in favor of ARLS as existing thermal generation becomes less competitive.

The inventive concepts herein shall now be discussed with reference to an actual example that applies one or more of the methodologies described herein whose results have been tabulated in Table 6.11 below. The table is arranged illustrating the time of day in increments of 1 hour over a 24 hour period along the Y-axis, and the various stages of processing the optimized load shape signal on the supply side and application of the OLS signal on the demand side. The dividing line between supply side and demand side is shown in the table, and may be thought of as a network over which the OLS signal is transferred. In Table 6.11, an electric car was used as an example and the signaling was processed according to each stage as shown.

For illustrative purposes, this example will examine the first row, that corresponds to midnight. A forecast load in gigawatt hours is tabulated in the first column, that may be considered as the total load for a particular unit of area, which may be a micro-grid, such as a single dwelling or building, or a macro-grid, such as a region (geographic or weather defined), power grid, or sub-power grid, for example. It shall be noted that the forecast load follows a shape as the load from hour to hour changes according to the needs of the consumers in the respective demand area. Of course, other values will reflect other grids and demand curves. Similarly, in the next column, a forecast for the renewable energy resources is provided. Both the forecast load and/or the forecast renewables may be provided or generated according to the various forecast methodologies already explained in detail above. The forecasts may be based on actual load measurements, on a model of measurements, or a combination of both. In the alternative, the forecast for the non-renewables may be provided, and any combination of forecast load, forecast renewables and/or the forecast non-renewables to obtain the net generation. In the current example, the forecast load for midnight is tabulated as 36.1 GWh, and the forecast renewables for midnight is tabulated a 6.0 GHh.

The next column provides the net generation, which is the amount of energy attributed to the non-renewable energy generator sources. In the table shown, the net generation is obtained by subtracting or removing the forecast renewables from the forecast or total load. Alternatively, the net generation itself may be obtained in other ways. For example, the net generation may be provided and the renewable component added to that to obtain the optimum load shape. Returning to our example, the net generation is calculated as shown in the table to subtract the forecast renewables of 6.0 GWh from the forecast load of 36.1 GWh to yield 30.1. The same is done over the remaining units of time for a given period (here 24 hours) to obtain the net generation per hour. In the next step, the net generation is flattened by apportioning a total energy, or load requirement, (here 845.1 GWh) over a period of time (here 24 hours), resulting in a distribution of 35.2 GWh, It shall be appreciated that the distribution may be apportioned using other methodologies such as those already described, including weighting and empirical distribution.

The optimum load shape is created in this example by adding the component for the renewable energy sources back onto the flattened load shape, shown in the table as a percentage of load per hour (which adds up to 100% total load for the 24 hour period). In other words, the percentage load for the optimum load shape per hour is the amount of load the respective grid should be drawing, and the energy consuming devices should draw energy at that percentage for that period of time. Of course, and as noted elsewhere, the energy consuming devices will adjust their load in an attempt to meet the percentage optimized load based on factors such as online time (particularly relevant for electric cars that are not connected to the grid 24/7 and other energy consuming devices that charge and discharge simultaneously).

Table 6.11 separates the supply side (or energy generation side) from the demand side (or consumer/energy consuming device side) by a vertical grey bar symbolizing the transmission route by which the optimum load shape signal is transmitted. This transmission route may be a network such as the internet, a secure transmission route, telephone line, optic fiber, satellite network, static media such as a disk or USB stick, and the like. It shall be appreciated that the optimum load shape is determined on the supply side in this example. However, this is due to the availability and resources on the supply side to collect data that is available and process the data from a vast source of forecast data using computers and in some cases super-computers. In other words, the supply side is best situated to generate the optimum load shape. In any and all embodiments, the optimum load shape may alternatively be generated by the distributor, a third party such as a supplier of software or power grid infrastructure, or locally at the residence or building, and even by the energy consuming device itself. In that case, the optimum load shape may be created from forecast data, model data, actual data, or estimates from previous calculations of the optimum load shape, for example, sent to the demand side entity determining the optimum load shape.

Now turning to the demand side, the application of the optimized load shape. It shall be appreciated that application uses the term optimum load shape and optimized load shape interchangeably, but it is recognized that optimum may imply that a perfectly optimized load shape is achieved. Recognizing that it may not be possible to achieve 100% perfection in the real world, the application refers to optimized in order to express that the optimized load shape signal is an attempt to achieve the best possible load shape using the methodologies disclosed herein. To continue on the demand side, the 6$^{th}$ column in the table shows the percentage of total load (10 kWh in our example) and distributes it according to the optimum load shape apportionment received (here labelled the electric vehicle EV optimum load shape). It shall be appreciated that the optimum load shape is given in the table as a percentage of the total load, instead of a signal value. This operates a normalization on the optimum load shape, as a whole number value may not be readily usable by the energy consuming device. It shall also be appreciated that the signal representing the optimum (or optimized) load shape may not necessarily be represented in percentages, but may be a signal of values, and that these values are converted into a value the energy consuming device can use such as the percentage of load shown in the table. One skilled in the art will understand readily how a smart switch or processor can calculate a value such as a percentage from a signal provided to it.

It shall be appreciated that some energy consuming devices may need to make adjustments to the optimized load shape, or otherwise make adjustments in how the energy consuming device operates based on, for example, online connection to the grid or charge/discharge schedule. In our example, the electric vehicle is not always connected to the power grid and is not able to charge during unconnected periods. In that case, the optimum load shape received or operation/charging based thereon is modified. As shown in the table, our example electric vehicle is not connected to an energy source from 7:00 to 17:00 (7 AM to 5 PM), presumably while the owner is at work with the vehicle. This shown in the table by the blocked out area during those times. In this case, the energy consuming device, according to the inventive concepts laid out in this disclosure, modify or recalculate the optimum load shape apportionment according to its operating schedule. In any and all embodiments, this may be done as shown here by a reapportionment of the total load required (10 kWh in our example) over the time the vehicle is connected to a power source. This may be achieved by generating a percentage proportional to the original percentage shown in column 5 based on the amount of load that is not charged during the unconnected time periods. In our example, the EV optimum load shape is calculated to be 7.3% of the load, which is the proportion of load not charged during 7 AM to 5 PM corresponding to the 3.7% Optimum Load Shape shown in column 5. It shall be appreciated that the reapportionment of the optimum load shape may be performed by a smart switch or meter, by the energy consuming device itself, or the like as enumerated elsewhere in this disclosure.

For comparison, the unshaped load for the electric vehicle EV is shown in column 8. In our example, the electric vehicle charges its entire load during hours 18:00 and 19:00 (6 PM and 7 PM). This is presumably because the electric vehicle operated without intelligence is plugged in when the driver returns home and the dumb vehicle simply begins to charge until full. As will be appreciated, this causes all of the load to be drawn over a relatively short period of time (2 hours), translating into a spike of demand at this time. Considering that most drivers of an electric vehicle return home around the same time, it is unsurprising that in actuality a large spike in the aggregate is caused during this time period. It can be reasonably predicted that, as more drivers turn to electric vehicles, the spike in electric demand during the early evening will be unmanageable in the near future. The inventive concepts laid out herein smartly redistribute the load where energy is provided, thereby efficiently using the energy at the time when it is generated, which both allows traditional (thermal) energy generators to operate at maximum efficiency and allows for the energy of the renewables to be fully utilized when produced (and not wasted).

In any and all embodiments, the optimized load shape signal may be modified for a subset of the total load or entire grid such as a local region, micro-grid (including a single building, residence), or appliance/energy consuming device. In some circumstances, it occurs that the demand or load for a subset of the total load or entire grid, is higher or lower than that planned for by the determination of the optimized load shape signal. For example, a spike in demand or load at a residence or building may occur when more load is demanded, such as when multiple electric vehicles are charging at the same time. Another example is that the residents or occupants of a building may be absent due to a vacation or are in isolation and less power is being utilized than the planned for load determined by the optimized load shape signal. The spike or lull in demand may be defined as being a significant increase/decrease in demand or load over a shorter time than the period of the optimized load shape signal, and/or may be defined as being in addition to or independently from time defined by a percentage increase/decrease over the determined load indicated in the optimized load shape signal. These fluctuations in demand/load may be detected locally by meters, including grid meters that are provided by, for example, cable operators. Such grid meters are capable of connecting to the internet and providing grid metrics for a localized area on the grid, and can be used to detect voltages/load of that area. In the case of a fluctuation of the load for that area and in response thereto, the optimized load shape can be modified, clipped, weighted or limited in order to mitigate or suppress the spike or lull. In any and all embodiments, a location of the subset of the total load or entire grid such as a local region, micro-grid (including a single building, residence), or appliance/energy consuming device may be detected or determined. The location information may be determined on the demand side by the local region, micro-grid (including a single building, residence), or appliance/energy consuming device, or on the supply side (power utility or utility, infrastructure or IT supplier, or distributor, for example, noting that a utility is a broader definition of power utility that shall be broadly defined throughout this disclosure as an organization (including private and public) that supports, maintains or provides the infrastructure (including the equipment, network, or IT) for a public service. In any and all embodiments, the optimized load shape may be modified for that subset area as already described based on or in response to the determined location or location information. For example, a single appliance or energy consuming device may request or receive a modified optimized load shape signal based on its location and/or based on the fluctuation of demand/load for that entity or local area.

Chapter 7

Conclusions and Future Work

This work provides estimates of the value of residential load flexibility to support the transition to carbon-free electricity without fire. For understanding, carbons keep delivery of necessary and legitimate distributors to renewable utilities mainly postponed. The concept of a daily optimum load shape was developed and applied theoretically and also as a control signal in residential MPC cases with increasing penetration of RES. A data-driven approach was used to inform a simulation framework designed for application in any area in the world subject to the availability of relatively few inputs. The following section briefly summarizes the results and conclusions drawn from this research, followed by a discussion of potential areas of future work.

7.1 Summary of Results and Conclusions

After 30 years of pilot tests and sparse commercial deployments, management of residential demand continues, for the most part, via direct utility control of load from appliances. However, direct load control has not evolved to provide support for integrating RES into the generation mix. While large-scale continuous optimum load shaping is a novel and promising solution for integrating RES, its impact is mostly unknown. This work used simulations of the joint optimization of supply and demand to assess the impact of ARLS and evaluate how the proliferation of Internet-connected thermostats, DHW heaters, and battery charge controllers, could alter the traditional energy supply-meets-demand paradigm such that demand could be shaped to optimally meet supply.

This work began with researching demand response programs and statistical methods to quantify the diversity observed in real-world empirical appliance measurements at varying spatiotemporal scales in order to inform simulation models. To overcome limitations of traditional stochastic methods in quantifying diverse, non-normal, non-stationary distributions, recent developments in spectral methods were applied to capture and simulate load in the frequency and time domains. The experiments in Phase 1 captured energy usage diversity related to unknowns that would be costly to ascertain on a mass scale such as building size and construction, varying numbers of building occupants, occupant behaviors, and age of appliances. Specifically, the energy usage statistics for electric DHW heaters were used to inform the fidelity of the models developed in Phase 2 concerning the timing of DHW use.

In phase 1, a binary conditional algorithm was developed and applied to TCL appliance empirical time series data to estimate price-based instantaneous load add and shed opportunities. Key findings included 1) Simulated changes in electricity pricing resulted in instantaneous load add and shed opportunities which were quantified for individual and groups of single-family homes in the Pacific Northwest of the United States. 2) Wavelet-based spectral analysis was superior in capturing, visualizing, and simulating diverse drivers of the non-Gaussian, non-stationary load.

Phase 2 involved working with GridLAB-D and GridMPC and creating physical models and simulations to estimate flexibility in electrical demand provided by the MPC of air-conditioning, battery storage, and electric DHW heating. A nationwide study of the MPC of air-conditioning included pricing-based control of an electrical distribution feeder. A battery model was developed along with a DHW heater model designed to reflect the energy usage diversity observed in Phase 1. Key findings included 1) Depending on the city, time of day, and 5-minute interval, residential thermal mass-enabled load-shedding opportunities up to 53% of load are possible, and load-adding opportunities up to 189% of load are possible. 2) Air-conditioning setpoint changes have time-lagged effects because the aggregate building responses are slower than the 5-minute price changes.

In Phase 3, in order to estimate the value of ARLS, the flexibility models developed in Phase 2 were explored in the context of the unit commitment of the Texas fleet of 263 generators. Research tasks in Phase 3 included 1) Modeling utility generation, distributed generation, distribution grids, and load across the state of Texas. 2) Jointly optimizing supply and demand by calculating and broadcasting optimum load shapes to appliances governed by MPC. 3) Estimating the maximum possible impact in variable generation costs and $CO_2$ emissions and the subset thereof (if any) attributable to ARLS.

Key findings included 1) Given increasing RES penetration, ARLS raised the effectiveness of the generation-to-load system by decreasing operating costs and $CO_2$ emissions. 2) Electricity retailers could create load flexibility and elasticity by calculating and forecasting optimum load shapes, which encouraged electric loads to favor the lowest cost thermal and renewable generators. 3) Through reception and processing of daily optimum load shapes along with forecast weather, thermostats and controllers for storage-capable end-uses were able to use model predictive control to automatically optimize their own on and off setpoints in order to minimize the deviation from optimal load shapes.

7.2 Contributions

Data-driven analysis of empirical electricity usage data from air-conditioning and appliances can aid in quantifying and simulating diversity in residential electric loads. A significant contribution of this work was the application and quantification of spectral methods to study and simulate appliance energy use behavior based on empirical data. Wavelet-based spectral analysis captured and visualized diverse and unknown drivers of load such occupancy characteristics and the type, age, and time of use of appliances. The performance of WARM-based spectral methods was compared, and results provided insights into quantifying diversity in energy consumption without a priori knowledge of appliance details. The main contribution was that a robust simulation technique like WARM provides the ability to simulate energy use in synthetic subdivisions that is reflective of observed behavior. The WARM can be used to simulate a variety of ensembles mimicking each appliance in order to aggregate statistics of energy usage by house and electrical distribution feeder for potential decision making in managing the grid. In addition to the RBSA metering study in the Pacific Northwest of the United States, WARM and WARM-like simulation techniques could be applied to datasets such as ecobee, Pecan Street and others in order to provide simulations for other climates and geospatial regions. While the WARM can simulate unshaped behavior, it is unclear how to apply WARM to thermodynamic models that simulate shaped behavior.

Model predictive control that reflects the diversity observed in empirical data-driven models can aid in quantifying the end-to-end generation-to-load system benefits of automatic residential load shaping and modulation. A significant contribution of this work was the development and application of load add and shed models that quantify load modulation opportunities based on the diverse appliance energy usage observed in empirical data. Instantaneous load add/shed estimates provided a sense of both the variability and the significant size of opportunities possible, which spurred further research. The application of MPC added realism in estimating load add/shed opportunities in a continuously controlled environment with constraints on occupant comfort. Experiments in iterative approaches to pricing-based MPC provided additional insights to price and load instability issues cited in the literature regarding challenges as high penetrations of price-takers become price-makers.

Combining the MPC of distributed energy resources with production cost models, through co-simulation, can aid in estimating temporal value across a range of climate zones and geographic areas. The need to prevent instability while modulating load inspired the possibility of defining an optimal load shape that jointly optimized supply and demand by encouraging load to follow the lowest cost generation. To the best of the authors knowledge, this co-simulation has not been accomplished by others and helps inform the economic justification of demand flexibility, in particular, flexible buildings. In addition, the MPC of distributed energy resources was found to be complementary in supporting the grid at different times of the day.

7.3 Recommendations 7.3.1 Further Apply the Simulation Framework As-Is

Several opportunities exist to apply the simulation framework as-is.

Model Globally.

Given historical weather data, attributes of residential building stock, and grid taxonomy data already used in the framework, it is likely a straightforward exercise to extend the simulation to provide estimates for other regions of the United States. Statewide and nationwide estimates of reductions in variable generation cost and CO2 emissions could be beneficial for investors and decision and policymakers. Geographies to consider modeling include the serving areas of the California Independent System Operator (CAISO), the Midcontinent Independent System Operator (MISO), the Southwest Power Pool (SPP), the PJM Interconnect, the New York ISO (NYISO), and the New England ISO (ISO-NE), Also, expanding to a North America continental view, depending on data availability, the framework could be applied to the power systems in Mexico and Canada including the Alberta Electric System Operator (AESO), the Ontario Independent System Operator (IESO), and other entities. In addition, modeling all other areas of the world would provide a global view of the opportunities afforded by ARLS. Efforts to do so could commence where time-synchronous historical load and generation data are available.

Model changes in load.

For clarity in results, the annual load was unchanged across all cases and scenarios. A next step is modeling the expected growth in load due to combinations of reasons such as climate change and increased electrification of buildings, industry, and transportation. Increases in seasonal temperatures would increase the load, for example, from air-conditioning. Another factor expected to increase load is the inductive charging of battery-powered devices, which is likely to be commonplace in all sectors and could have a significant effect, especially in transportation.

Model the Impact of Warmer Climates.

A potentially significant driver of change in thermal generator efficiencies is increasing seasonal temperatures. Approximately two-thirds of the energy used by thermal power plants is transferred as heat to the environment by way of heat exchangers. Warmer climates reduce the efficiencies of heat exchangers, thus increasing fuel consumption, heat and thermal emissions of power plants. The net effect would be increased operation of thermal power plants for the same amount of electricity produced, and a worse outcome in the presence of higher electricity needs. Decreases in thermal generation efficiency would be a straightforward addition to the simulation framework.

Model Uncertainty in Generation.

Opportunities to model uncertainty in generation include individual generator unavailability due to planned or unplanned outages, which would likely be a straightforward exercise. On a separate note, for future capacity planning, the impact of minor to significant changes in the generation fleet could also be modeled. Changes in the generation fleet could result from retiring generators, re-firing coal generators with natural gas, and adding new generators.

7.3.2 Expand the Functionality of the Simulation Framework

Several opportunities exist to expand the functionality of the simulation framework. Some opportunities are more straightforward to implement than others. One opportunity may be to expand temporal functionality from daily to multi-day simulation. There are two high-level tasks to expand functionality from daily to multi-day simulation, and both could improve model fidelity. In the temporal context, it is possible to extend the PCMs and GridMPC from daily to multi-day simulation. For the PCMs, the multi-day simulation would allow modeling of more realistic startup constraints on generators, particularly the longer start cycles typical of nuclear generators. Also, this multi-day simulation would ensure midnight discontinuities in load (and thus optimum load shapes) are reflective of typical behavior. For GridMPC, this multi-day simulation would allow for: a) relaxed constraints on battery SOC at the beginning and end of the day, and b) midnight discontinuities that are reflective of typical behavior for battery SOC, cooling zone and DHW temperatures.

Expanding marginal heat rate functionality from a single range to multiple ranges, or to quadratic approximations is another opportunity. In the context of power generation, the PCM constraints, as implemented, specify each generator as having a fixed slope heat rate efficiency. The work, however, makes possible a piecewise approximation of heat rate as a function of output power, which more accurately represents the efficiency over the operating regime of each generator. Additionally, the methods studied enable approximation of heat rate using quadratic functions. As such, the PCM fidelity could improve. Specifically, ARLS could take advantage of more efficient heat rates by modulating load to maximize the efficiency of individual thermal generators.

Expanding transmission functionality from a single node to multiple nodes. In the context of transmission network constraints, the PCMs specify delivery of power to a single transmission node which serves the entire region of study (e.g., all of Texas) with no transmission losses or capacity constraints is another opportunity. The work, however, makes possible the use of a multi-node transmission network to represent spatial interconnection constraints. Though out of the scope of this study, the inclusion of transmission networks, would be useful in modeling smaller portions of the grid and in modeling the value of ARLS in scenarios involving locational marginal pricing (LMP). LMP takes into account the effect of actual operating conditions on the transmission system in determining the price of electricity at different locations and is expected to be increasingly important with growth in load and DERs.

Expanding functionality to add utility-scale storage is another opportunity. Recent developments in utility scale battery storage have delivered profound effects on bulk power system operations, prompting new storage-based ancillary services and significant economic market changes. As operational data become available, the simulation framework could be extended to take advantage of utility-scale battery storage.

Expanding functionality to add other energy sectors and additional degrees of control is another opportunity. Adding commercial and industrial loads to the simulation framework could enable estimating the value of the MPC of the loads in each sector, which together are responsible for ⅔ of the load in Texas. In addition, enabling MPC of space heating within GridMPC would allow for year-round estimates of the value of HVAC control afforded by ARLS. Through HEMS, ARLS could drive distributed control for various energy uses including operating dishwashers, clothes washers and dryers, self-cleaning cycles of electric ranges, and other such tasks where one might not care so much precisely when a job completes as long as it is completed by within a specific period. Due to computational complexity limits, while smaller loads such as home appliances and other IoT devices like mobile phones could and should participate in ARLS, presently, it may not make sense to model each individually.

Expanding functionality to add combinations of load shaping techniques. While not widely deployed, dynamic electricity pricing may become commonplace in multiple sectors is another opportunity. As such, modeling the effect of combining dynamic electricity pricing and daily optimal load shapes could be explored.

Expanding functionality to explore the optimal size and use of residential batteries. The battery system modeled has an energy capacity of 13.5 kWh and an hourly charge rate of 25 percent is another opportunity. The impact on the grid-to-load system of various battery sizes and charge and discharge rates could be explored. Likewise, charge and discharge strategies could be explored in the context of the expected life cycle costs. In addition, ARLS would likely aid in distributed control of the charging of electric vehicle batteries.

Expanding functionality to explore varying specific heat capacities is another opportunity. A sensitivity analysis could be performed to provide insight as to how different amounts of thermal mass and phase change materials could improve the efficiency of generation unit commitment and economic dispatch. Adding mass or phase change materials to buildings and appliances may enable, for example, hot water, chilled water, and refrigeration systems to provide valuable flexibility in residential, commercial, and industrial settings.

Expanding functionality to explore ARLS-enabled ancillary services Experiments could be performed to explore the possibility of providing grid support in the presence of contingencies is another opportunity. There are no known practical obstacles to re-sending optimum load shapes for near real-time execution. It could be a straightforward exercise to model the continuous updating of optimum load shapes.

Expanding functionality to explore spatiotemporal micro-area shaping Load shaping has been simulated for all of Texas is another opportunity. The framework could be replicated and extended to shape multiple smaller regions. For example, with the expectation of a transmission or distribution segment being overloaded, ARLS could modulate load accordingly to avoid spikes in LMPs. The monetary impact of not having to increase transmission and distribution infrastructure could be significant.

Expanding functionality to use different feeder taxonomies and models The prototypical feeders developed were used for modeling U.S. distribution networks is another opportunity. The simulation framework could be expanded to use other prototypical feeders for the U.S. and for other areas of the world.

Expanding functionality to adjust the scaling of aggregate load by season is another opportunity. The simulation framework could be expanded to scale the aggregate city-to-weather zone load based on Winter, Spring, Summer, and Fall seasons. For example, in summer, the load simulation model could better fit the data by using scaling that reflects the high use of air-conditioning. After years developing, deploying and supporting cable broadband, Wi-Fi, and other communications technologies, the timing is better than ever to bring together telecommunications-based distributed control of electricity supply and demand in support of transitioning to carbon-free energy. Over the years, in addition to the unprecedented growth of the Internet of Things, optimization tools and techniques have become available that can assist in orchestrating electrical supply and the demand of industrial, commercial and (hopefully soon) residential loads.

In the future, utilities and consumers can monetarily and environmentally benefit from continuously shaping load by alternatively encouraging or discouraging the usage of electricity. The innovative concepts disclosed in this application is an important step to ending the vast waste of thermal power plants, extinguish the massive fires required by such generators, and is the right timing to develop this working ARLS product.

8. Examples of the Inventive Methodologies Disclosed Herein Shall Now be Discussed.

An optimized load shaping apparatus for optimizing production and consumption of energy includes a processor coupled to a computer readable storage medium, wherein the computer readable storage medium includes a set of executable program instructions, which when executed causes the processor to obtain information signals indicative of a first load shape signal corresponding to a one of a total load, a renewable energy (renewable energy supply or load) corresponding to one or more renewable energy sources and a non-renewable energy (non-renewable energy supply or load) corresponding to one or more non-renewable energy sources of a serving area where energy. It shall be appreciated that obtaining the information signals includes, for example, the information signals being sent to the processor, and/or generated by the processor. In any and all embodiments the processor may distinguish in the first load shape signal between renewable energy. The renewable energy is energy derived from natural resources that are replenishable, infinite or inexhaustible, and non-renewable energy, and non-renewable energy is energy derived from non-replenishable, finite or exhaustible resources. The processor is to remove a first component from the first load shape signal corresponding to the renewable energy from a second component corresponding to the non-renewable energy to obtain a resulting load shape signal, and flatten the resulting load shape signal by apportioning the resulting load shape signal across time intervals to obtain a flattened load shape signal. The processor is to add at least a portion of the first component corresponding to the renewable energy (supply or load) to the flattened load shape signal to create an optimized load shape signal. As an alternative, or in addition to, the processor is to provide in any and all embodiments at least a portion of the optimized load shape signal configured to modulate electric loads of energy-consuming devices that consume energy. Providing the optimized load shape may include transmitting the optimized load shape to a switch, smart switch or energy consuming device on the demand side.

It shall be appreciated that a total load, is the total load for a certain area of the power grid, which may be a subset of the particular power grid considered, including a macro grid or micro grid. It shall also be appreciated that the flattening in any and all embodiments may be through apportionment or by weighting of one or more time periods or one or more types of energy resource as mentioned elsewhere in this disclosure, but also through normalizing or normalization of the load. Further, it shall be appreciated that the renewable energy and non-renewable energy, respectively, is the amount supplied or to be supplied (referred to as simply supply), which when looked at another way is that part of the total load comprising the renewable energy or non-renewable energy. It shall further be appreciated that provide at least a portion of the optimized load shape signal configured to modulate an electric load of one or more energy-consuming devices that consume energy means that the optimized load shape signal is arranged or constructed to offer a different load to the energy-consuming device than the load shape that the energy-consuming device was following previously such as a historic load shape or a load shape based on the user of the energy-consuming devices load habit. It shall be appreciated that the net generation load may be in any or all embodiments provided directly to the processor, or based on previous net generation information or calculations. Further, the processor may not need to distinguish between renewable and non-renewable energy components.

The optimized load shaping apparatus of any and all embodiments provides that the first load shape signal corresponds to an actual load of a serving area obtained from a grid such as a micro-grid or a macro-grid, wherein the micro-grid is a stand-alone or grid connected system with local power supply and consumption, and the macro-grid is not a stand-alone system and is connected outside local power supplies. A local power supply is, for example, a single residence or building that provides its own power either entirely or partially, such as from solar panels, an electric vehicle, or local generators.

It shall be appreciated that the objective of optimizing the load shape is to maximize an efficiency of one or more non-renewable energy generators, and particularly to maximize the use of renewable generators while maximizing the efficiency of non-renewable (including thermal generators). The optimized load shape signal is calculated, either at the supply side, demand side, or at a quasi-supply side such as a distributor of energy, and is employed by energy consuming devices on the demand or consumer side. The resulting use of power on the demand side, either as a single device, group of devices, or in the aggregate, such as on a feeder basis or larger region or environment region or geography, results in a corresponding energy draw upstream on the supply side that translates into usage by those generators. Those generators, particularly the non-renewable generators that can be flexibly driven irrespective of natural events such as the weather or time of day, as a result are deployed on a steady state basis, that is at their maximum efficiency for the demanded load, and are not ramped up and down, causing wear and tear on the equipment as well as saving immense cost of energy in spinning up those assets. The renewable energy generators, those that are not flexible (inflexible) or depend on the environment such as the weather or time of day, are then free or capable to generate energy at their normal operating conditions and times, that is without strains caused by over supply. In other words, since the renewable energy sources provide energy regardless of demand, the present solutions provide for efficient use of the energy that is generated by the renewables, i.e., the energy that is generated regardless because of the environment (sun, wind, ocean power), and does not allow for waste of that renewable energy, which may occur under the traditional supply and demand on load as those users may use power at times other than when renewable sources are creating energy. This can be seen in FIGS. 19 and 20 where the renewable portion is graphically shown to be "driven upward" from FIGS. 21 to 22 and 23 and 24, respectively.

The optimized load shaping processor in any and all embodiments is integrated into a device such as a computer, Graphical User Interface (GUI), cloud-based energy controller, dashboard, smart meter, thermostat, home energy management system, smart phone, data center, cloud, appliance, battery, and electric vehicle/electric vehicle charger, for example.

The optimized load shaping in any and all embodiments bases the first load shape signal on one or more of information such as a forecast signal that forecasts load of the serving area, a pre-defined forecast signal, and/or a model forecast/predicted signal.

The optimized load shaping in any and all embodiments generates the renewable energy from one or more of renewable energy generators such as wind, solar, hydro, geothermal, ocean, chemical, biochemical, closed hydrogen system, and/or battery energy sources. It shall be appreciated that replenishable resources are considered herein as those resources such as traditional resources like wind, solar, hydro, geothermal, and may further include replenishable resources for modern source of energy such as ocean, chemical, biochemical, closed hydrogen systems, and/or battery energy sources. Resources such as coal, gas, oil and nuclear are considered non-replenishable in the sense that their quantity is limited on this earth. A closed energy system, including closed hydrogen systems refers to those energy sources that are replenished by re-energizing the energy source, such as in a closed hydrogen system where hydrogen is burned resulting in water and the water molecule is split back into hydrogen and oxygen in order to obtain hydrogen again as a fuel.

The optimized load shaping processor in any and all embodiments is to flatten the resulting load shape signal for thermal non-renewable generators by apportioning the total energy over a time period to obtain an amount of load to be apportioned to that time period.

The optimized load shaping in any and all embodiments weights at least one or more portions of the optimized load shape signal are weighted up or down, and for any energy generator, depending on the mix of renewable and non-renewable generation available. The result of weighting up or down effects the allowance that a load may be higher or lower for a particular time period, or for a particular generator or type of generator. The weighting may also be set for one or more energy consuming devices on the demand side, such as to encourage or discourage, or allow or disallow, energy consumption. Encouraging or discouraging (or allowing/disallowing) energy consuming devices to operate at a weighted load may be based on credits or tokens that the consumer earns for operating energy consuming devices at the optimized load shape or credits or tokens that are purchased. The credit or token in any and all embodiments is produced corresponding to at least a portion of the optimized load shape signal.

Weighting, credits or tokens in any and all embodiments, provide a manner in which compliance with the OLS can be maintained. It shall be appreciated that compliance can be described as minimizing the difference between the actual load shape and the OLS. When the difference is zero, than the actual load shape has exactly followed the OLS. As mentioned in other sections herein, an optimized load shape signal is generated that best approximates the optimal load shape, bearing in mind that anything optimum in the real world may not be achievable given, for example, imperfect data, freshness of the data, etc.

In other words, the optimized load shaping may select which resources can be operated or should be operated at a higher consumption. As mentioned, in any and all embodiments this could be instances where energy is bought or sold on the market, for example by an (ISO) Independent System Operator. Such operators may make small or large increases in power at that time and shave the other periods in order to adjust for operating conditions, that is, whether generators are online or spinning up. This also allows operators, such as ISOs, to use or generate power when it comes available.

The optimized load shaping in any and all embodiments also encompasses a method for optimizing production and consumption of energy. Obtaining information signals indicative of a first load shape signal corresponding to one of a total load, a renewable energy (corresponding to renewable energy supply or load) corresponding to one or more renewable energy sources and a non-renewable energy (corresponding to renewable energy supply or load) corresponding to one or more non-renewable energy sources, wherein renewable energy is energy derived from natural resources that are replenishable, infinite or inexhaustible, and wherein non-renewable energy is energy derived from non-replenishable, finite or exhaustible resources. It shall be appreciated that the method in any and all embodiments may distinguish between the renewable and non-renewable components, or it may be sent the distinction in the form of, for example, signals. Removing a first component from the first load shape signal corresponding to the renewable energy load from a second component corresponding to the non-renewable energy obtains a resulting load shape signal. Flattening the resulting load shape signal is accomplished by apportioning the resulting load shape signal across time intervals to obtain a flattened load shape signal. Adding at least a portion of the first component corresponding to the renewable energy load to the flattened load shape signal creates an optimized load shape signal. In any, all or none of the embodiments, the method may provide at least a portion of the optimized load shape signal configured to modulate electric loads of energy-consuming devices that consume energy.

In any and all embodiments of the method the first load shape signal corresponds to an actual load of a serving area obtained from a grid such as a micro-grid and a macro-grid, wherein the micro-grid and macro grid are explained above.

In any and all embodiments the method maximizes efficiency of the non-renewable generators, and in particular use of renewables while maximizing the efficiency of thermal generation.

In any and all embodiments the method bases the first load shape signal on one or more of information such as a forecast signal that forecasts load of the serving area, a pre-defined forecast signal, and/or a model forecast signal.

In any and all embodiments the method flattens the resulting load shape signal by apportioning the total energy over a time period to obtain an amount of load to be apportioned to that time period.

In any and all embodiments the method weights at least one or more portions of the optimized load shape signal up or down for any time period, and for any energy generator. The result of weighting up or down effects the allowance that a load may be higher or lower for a particular time period, or for a particular generator or type of generator. The weighting may also be set for one or more energy consuming devices on the demand side, such as to encourage or discourage, or allow or disallow, energy consumption. Encouraging or discouraging (or allowing disallowing) energy consuming devices to operate at a weighted load may be based on credits or tokens that the consumer earns for operating energy consuming devices at the optimized load shape or credits or tokens that are purchased. The credit or token in any and all embodiments is produced corresponding to at least a portion of the optimized load shape signal.

In other words, the optimized load shaping may serve to select which resources can be operated or should be operated at a higher consumption. As mentioned, in any and all embodiments this could be instances where energy is bought or sold on the market, for example by an (ISO) Independent System Operator. Such operators may make small or large increases in load at that time and shave load during other periods in order to adjust for operating conditions, that is, whether generators are online or spinning up. This also allows operators, such as ISOs, to use or generate power when it comes available.

In any and all embodiments the method produces a credit or token corresponding to at least a portion of the optimized load shape signal.

In another example, in any and all embodiments a computer readable storage medium is provided having stored thereon a program having a program code for performing the method and/or any or all of the embodiments.

In another example, an optimized load shape switch apparatus is provided for optimizing production and consumption of energy. A processor coupled to a computer readable storage medium, wherein the computer readable storage medium includes a set of executable program instructions, which when executed causes the processor obtains to create optimum load shape signal that represents a first load shape signal corresponding to a total load of a serving area where energy is provided that has a first component of the first load shape signal corresponding to non-renewable energy load flattened by an apportionment and a second component of the first load shape signal corresponding to renewable energy load added to the first component was flattened. In any and all embodiments, renewable energy is energy derived from natural resources that are replenishable, and wherein non-renewable energy is energy derived from non-replenishable resources. The processor in any and all embodiments may provide a switching signal based on at least a portion of the optimized load shape signal configured to modulate an electric consumption of an energy-consuming device in accordance with the optimized load shape signal.

It shall be appreciated that the inventive solution(s) provided herein may be incorporated into the energy consuming device itself or a smart switch or like device installable upstream to the energy consuming device. Therefore, the optimized load shape switch in any and all embodiments integrates processor into a device such as a computer, smart switch, smart meter, thermostat, smart phone, an internet router, a graphical user interface (GUI), cloud-based energy controller, cloud appliance, data center, dashboard, home energy management system, a battery, an electric vehicle/ electric vehicle charger, an energy transformation device, water boiler, air conditioner, and an appliance, for example.

The optimized load shape switch in any and all embodiments configures the optimized load shape signal to maximize the utilization of one or more non-renewable energy generators, and particularly to maximize the use of renewable generator s while maximizing the efficiency of non-renewable (including thermal generators). The optimized load shape signal is calculated, either at the supply side, demand side, or at a quasi-supply side such as a distributor of energy, and is employed by energy consuming devices on the demand or consumer side. The resulting use of power on the demand side, either as a single device, group of devices, or in the aggregate, such as on a feeder basis or larger region or environment region or geography, results in a corresponding energy draw upstream on the supply side that translates into usage by those generators. Those generators, particularly the non-renewable generators that can be flexibly driven irrespective of natural events such as the weather or time of day, as a result are deployed on a steady state basis, that is at their maximum efficiency for the demanded load, and neither are stated or stopped nor ramped up and down, causing wear and tear on the equipment as well as saving immense cost of energy in spinning up those assets. The renewable energy generators, those that are not flexible (inflexible) or depend on the environment such as the weather or time of day, are then free or capable to generate energy at their normal operating conditions and times, that is without strains caused by over generation or over supply.

The optimized load shape switch processor in any and all embodiments modifies the switching signal based on when the energy-consuming device is online.

The optimized load shape switch processor in any and all embodiments modifies the switching signal further based on a re-apportionment of the optimized load shape signal in accordance when the energy-consuming device is expected to be online.

The optimized load shape switch processor in any and all embodiments modifies the switching signal based on charging and/or discharging of the energy-consuming device.

The optimized load shape switch processor in any and all embodiments generates the optimized load shaping signal based on a forecast signal that forecasts load of the serving area, a pre-defined forecast signal, a model forecast, and predicted signal.

The optimized load shape switch processor in any and all embodiments generates a signal indicating it is compliant with at least a portion of the optimized load shaping signal.

The optimized load shape switch processor in any and all embodiments receives a credit or token for complying with at least a portion of the optimized load shape signal. The optimized load shape switch processor in any and all embodiments modifies the switching signal in accordance with the credit or token. Credits or tokens may encourage and/or discourage (or allowing disallowing) energy consuming devices to operate at a targeted load. This may be based on weighting one or more portions of the optimum load shape signal. Credits or tokens may be earned or purchased by the consumer for operating energy consuming devices at the optimized load shape. The credit or token in any and all embodiments is produced corresponding to at least a portion of the optimized load shape signal.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements. A public utility company (or simply utility) may be considered an organization that maintains the infrastructure for a public service (often also providing a service using that infrastructure). Public utilities are typically subject to forms of public control and a regulation ranging from local community-based groups to statewide government monopolies. A utility in any and all embodiments may include entities or companies that provide infrastructure for the public service, including equipment infrastructure such as thermostats and meters/smart meters and software infrastructure including software and analysis tools, Apps and interfaces, forecasting tools, networks (internet or cloud), or other IT infrastructure.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

I claim:

1. An optimized load shaping apparatus for optimizing production and consumption of energy, the apparatus comprising:
a processor coupled to a non-transitory computer readable storage medium, wherein the computer readable storage medium includes a set of executable program instructions, which when executed causes the processor:
to obtain information signals indicative of a first load shape signal corresponding to a total load of a serving area where energy is provided;
wherein renewable energy is energy derived from one or more natural resources that are replenishable, and non-renewable energy is energy derived from non-replenishable resources;
to remove a first component from the first load shape signal corresponding to the renewable energy from a second component corresponding to the non-renewable energy to obtain a resulting load shape signal;
to flatten the resulting load shape signal by apportioning the resulting load shape signal across time intervals to obtain a flattened load shape signal;
to add at least a portion of the first component corresponding to the renewable energy to the flattened load shape signal to create an optimized load shape signal; and
provide at least a portion of the optimized load shape signal configured to modulate an electric load of one or more energy-consuming devices that consume energy.

2. The optimized load shaping apparatus of claim 1, wherein the first load shape signal corresponds to an actual or forecast load of a serving area obtained from a grid selected from the group consisting of a micro-grid and a macro-grid, wherein the micro-grid is a stand-alone or grid connected system with local power supply and consumption.

3. The optimized load shaping apparatus of claim 1, wherein the optimized load shape signal is configured to maximize an efficiency of one or more non-renewable energy generators.

4. The optimized load shaping apparatus of claim 1, wherein the processor is integrated into a device selected from the group consisting of a computer, Graphical User Interface (GUI), cloud-based energy controller, dashboard, smart meter, thermostat, home energy management system, smart phone, data center, cloud, appliance, battery, and electric vehicle/electric vehicle charger.

5. The optimized load shaping apparatus of claim 1, wherein the first load shape signal is based on one or more of information selected from the group consisting of a forecast signal that forecasts load of the serving area, a pre-defined forecast signal, and a model forecast/predicted signal.

6. The optimized load shaping apparatus of claim 1, wherein renewable energy is generated from one or more resources selected from the group consisting of wind, solar, hydro, geothermal, ocean, and closed energy system sources.

7. The optimized load shaping apparatus of claim 1, wherein non-renewable energy is generated from one or more resources selected from the group consisting of coal, gas, oil, and nuclear.

8. The optimized load shaping apparatus of claim 1, wherein the processor is to flatten the resulting load shape signal by apportioning the total energy over a time period to obtain an amount of load to be apportioned to that time period.

9. The optimized load shaping apparatus of claim 1, wherein at least one or more portions of the optimized load shape signal are weighted up or down.

10. The optimized load shaping apparatus of claim 1, wherein a credit or token is produced corresponding to at least a portion of the optimized load shape signal.

11. A method for optimizing production and consumption of energy, the method comprising:
   obtaining information signals indicative of a total load of a serving area where energy is provided;
   wherein renewable energy is energy derived from one or more natural resources that are replenishable, and wherein non-renewable energy is energy derived from non-replenishable resources;
   removing a first component from the first load shape signal corresponding to renewable energy from a second component corresponding to non-renewable energy to obtain a resulting load shape signal;
   flattening the resulting load shape signal by apportioning the resulting load shape signal across time intervals to obtain a flattened load shape signal;
   adding at least a portion of the first component corresponding to the renewable energy to the flattened load shape signal to create an optimized load shape signal; and
   providing at least a portion of the optimized load shape signal configured to modulate an electric load of one or more energy-consuming devices that consume energy.

12. The method of claim 11, wherein the first load shape signal corresponds to an actual or forecast load of a serving area obtained from a grid selected from the group consisting of a micro-grid and a macro-grid, wherein the micro-grid is a stand-alone or grid connected system with local power supply and consumption.

13. The method of claim 11, wherein the optimized load shape signal is configured to maximize an efficiency of one or more non-renewable energy generators.

14. The method of claim 11, wherein the first load shape signal is based on one or more of information selected from the group consisting of a forecast signal that forecasts load of the serving area, a pre-defined forecast signal, and a model forecast signal.

15. The method of claim 11, wherein flattening the resulting load shape signal includes apportioning the total energy over a time period to obtain an amount of load to be apportioned to that time period.

16. The method of claim 11, further comprising weighting at least one or more portions of the optimized load shape signal up or down.

17. The method of claim 11, further comprising producing a credit or token corresponding to at least a portion of the optimized load shape signal.

18. A non-transitory computer readable storage medium having stored thereon a program having a program code for performing the method of claim 11, when the program is executed on a processor or a programmable hardware component.

19. An optimized load shape switch apparatus for optimizing production and consumption of energy, the apparatus comprising:
   a processor coupled to a non-transitory computer readable storage medium, wherein the computer readable storage medium includes a set of executable program instructions, which when executed causes the processor:
   obtain an optimized load shape signal that represents a first load shape signal corresponding to a total load of a serving area where energy is provided that has a first component of the first load shape signal corresponding to non-renewable energy flattened by an apportionment and a second component of the first load shape signal corresponding to renewable energy added to the first component that is flattened;
   wherein renewable energy is energy derived from one or more natural resources that are replenishable, and wherein non-renewable energy is energy derived from non-replenishable resources; and
   provide a switching signal based on at least a portion of the optimized load shape signal configured to modulate an electric consumption of an energy-consuming device in accordance with the optimized load shape signal.

20. The optimized load shape switch apparatus of claim 19, wherein the processor is integrated into a device selected from the group consisting of a computer, smart switch, smart meter, thermostat, smart phone, an internet router, a graphical user interface (GUI), cloud-based energy controller, cloud appliance, data center, dashboard, home energy management system, a battery, an electric vehicle/electric vehicle charger, an energy transformation device, water boiler, air conditioner, and an appliance.

21. The optimized load shape switch apparatus of claim 19, wherein the optimized load shape signal is configured to maximize an efficiency of one or more non-renewable energy generators.

22. The optimized load shape switch apparatus of claim 19, wherein the processor is to modify the switching signal based on when the energy-consuming device is online.

23. The optimized load shape switch apparatus of claim 22, wherein the processor is to modify the switching signal further based on a re-apportionment of the optimized load shape signal in accordance when the energy-consuming device is online.

24. The optimized load shape switch apparatus of claim 19, wherein the processor is to modify the switching signal based on charging and/or discharging of the energy-consuming device.

25. The optimized load shape switch apparatus of claim 19, wherein the processor is to generate the optimized load shaping signal based on a forecast signal that forecasts load of the serving area, a pre-defined forecast signal, and a model forecast/predicted signal.

26. The optimized load shape switch apparatus of claim 19, wherein the processor is to generate a signal indicating it is compliant with at least a portion of the optimized load shaping signal.

27. The optimized load shape switch apparatus of claim 19, wherein the processor is to receive a credit or token for complying with at least a portion of the optimized load shape signal.

28. The optimized load shape switch apparatus of claim 27, wherein the processor is to modify the switching signal in accordance with the credit or token.

* * * * *